United States Patent [19]
Kanda et al.

[11] Patent Number: 6,011,848
[45] Date of Patent: *Jan. 4, 2000

[54] METHOD AND SYSTEM FOR MESSAGE DELIVERY UTILIZING ZERO KNOWLEDGE INTERACTIVE PROOF PROTOCOL

[75] Inventors: Masayuki Kanda; Kiyoshi Yamanaka; Youichi Takashima, all of Kanagawaken, Japan

[73] Assignee: Nippon Telegraph and Telephone Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/535,199

[22] PCT Filed: Mar. 7, 1995

[86] PCT No.: PCT/JP95/00367

§ 371 Date: Nov. 6, 1995

§ 102(e) Date: Nov. 6, 1995

[87] PCT Pub. No.: WO95/24708

PCT Pub. Date: Sep. 14, 1995

[30] Foreign Application Priority Data

| Mar. 7, 1994 | [JP] | Japan | 6-035797 |
| Sep. 7, 1994 | [JP] | Japan | 6-213374 |
| Sep. 21, 1994 | [JP] | Japan | 6-226282 |

[51] Int. Cl.[7] .............. H04L 9/00; H04K 1/00
[52] U.S. Cl. .............. 380/25; 380/23; 380/21; 380/28; 380/30; 380/49
[58] Field of Search ............ 380/23, 25, 24, 380/30, 28, 49, 21

[56] References Cited

U.S. PATENT DOCUMENTS

| 4,748,668 | 5/1988 | Shamir et al. | 380/30 |
| 4,932,056 | 6/1990 | Shamir | 380/23 |
| 5,136,642 | 8/1992 | Kawamura et al. | 380/21 |
| 5,140,634 | 8/1992 | Guillou et al. | 380/23 |
| 5,245,657 | 9/1993 | Sakurai | 380/25 |
| 5,373,558 | 12/1994 | Chaum | 380/23 |
| 5,483,597 | 1/1996 | Stern | 380/30 |
| 5,553,145 | 9/1996 | Micali | 380/30 |
| 5,581,615 | 12/1996 | Stern | 380/25 |

OTHER PUBLICATIONS

B. Schneier, "Applied Cryptography." pp. 101–111.

Article entitled, "A Method for Obtaining Digital Signature and Public–Key Cryptosystems", by Rivest, Shamir and Adleman, Feb. 1978, Communications of the ACM.

Article entitled, "How to Prove Yourself: Practical Solutions to Identification and Signature Problems", by Fiat and Shamir, Department of Applied Mathematics, The Welzmann Institute of Science, Rehovot 76100, Israel.

(List continued on next page.)

*Primary Examiner*—Gail O. Hayes
*Assistant Examiner*—Hrayr A. Sayadian
*Attorney, Agent, or Firm*—Banner & Witcoff, Ltd.

[57] ABSTRACT

A scheme for message delivery which can guarantee an authenticity of a user, a reliability of message delivery, and an authenticity of the message deliver, while preventing an illegal act, and which can prove them at later time. In this scheme, when the user requests a delivery of a message to the information provider, the information provider carries out a user authentication of the user according to a zero knowledge interactive proof protocol using check bits E, transmits a ciphertext C in which a message M is enciphered according to a secret key cryptosystem by using a work key W, as a part of the check bits E, and delivers the message to the user in units of one bit or a plurality of bits. Then the information provider carries out a record management of a log data H for the zero knowledge interactive proof protocol. In addition, the information provider generates and transmits the check bits E by using at least the work key W, and the user takes out the work key W by using at least the check bits E, and obtains the message M by deciphering the ciphertext C according to the secret key cryptosystem by using the work key W.

22 Claims, 27 Drawing Sheets

OTHER PUBLICATIONS

Article entitled, "How to Prove Yourself: Practical Solutions to Identification and Signature Problems", by Fiat and Shamir, Department of Applied Mathematics, The Welzmann Institute of Science, Rehovot 76100, Israel.

Article entitled, "An Extension of the Fiat–Shamir Scheme Based on Higher Degree Roots", by Ohta and Okamoto, NTT Communications and Information Processing Laboratories, Nippon Telegraph and Telephone Corporation, Aug. 1988.

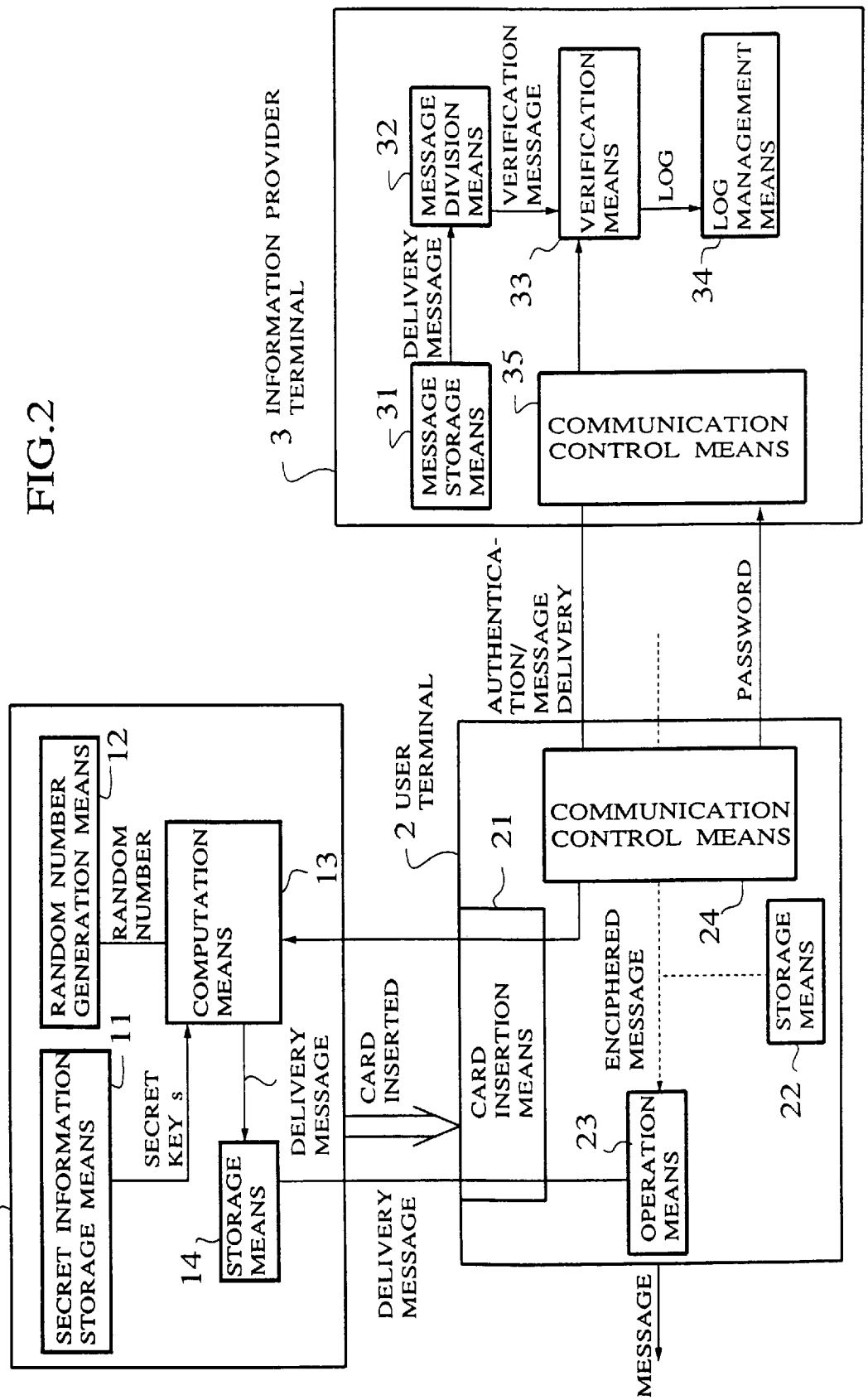

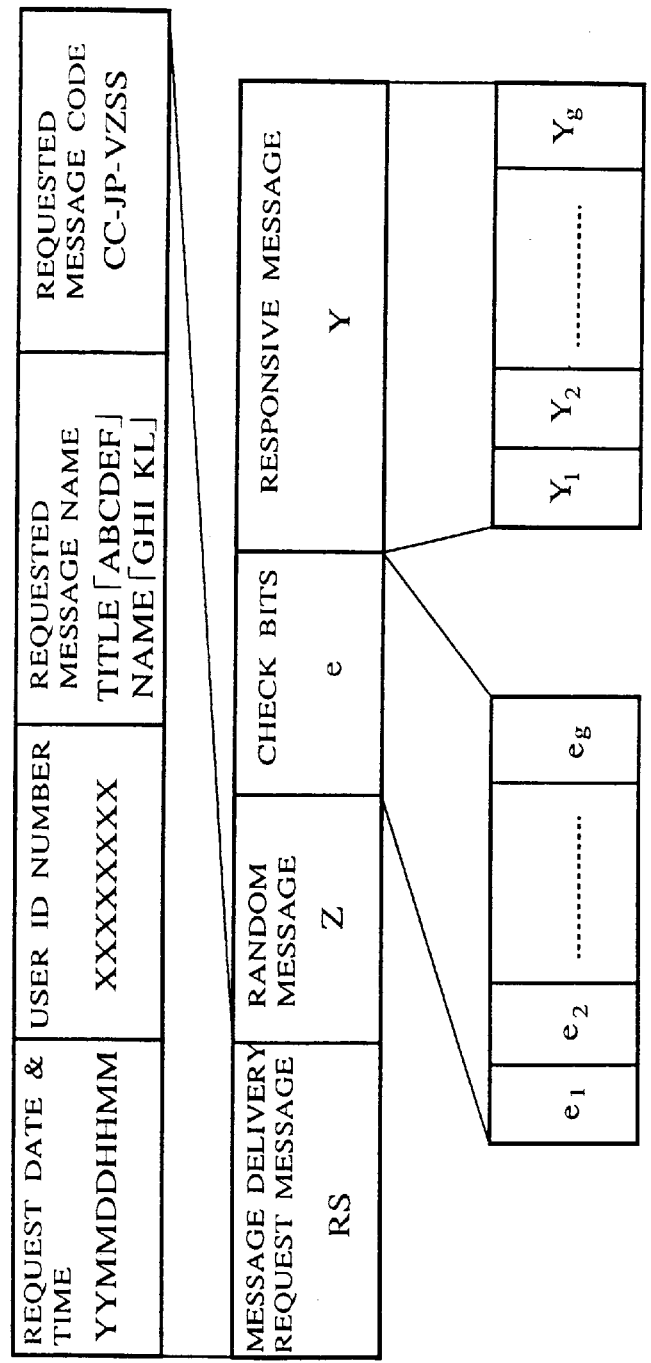

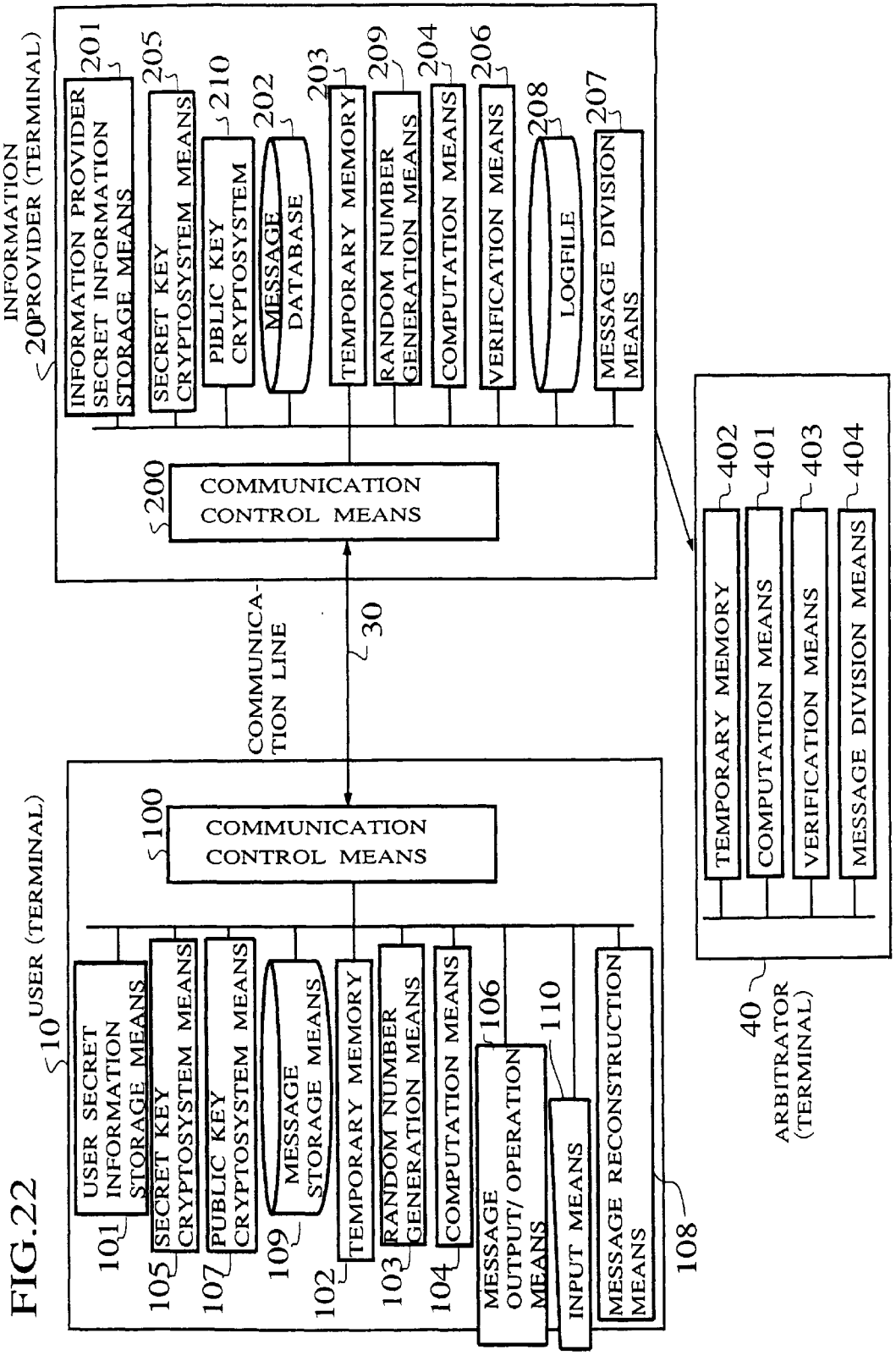

METHOD AND SYSTEM FOR MESSAGE DELIVERY UTILIZING ZERO KNOWLEDGE INTERACTIVE PROOF PROTOCOL

TECHNICAL FIELD

The present invention relates message delivery method and system for making it such that, in a case an information provider provides a message requested by a user by using an electric communication system, the information provider authenticates an authenticity of the user by the user authentication, while surely delivering to the user the message requested by the user, and in response to a lodging of an objection from the user later on that the requested message has not been received, it is possible to prove a fact that the information provider has definitely delivered the requested message to the user and the user has received that, which are particularly useful for a charged information providing service, delivery proof service, etc.

BACKGROUND ART

Conventionally, the representative authentication methods include a user authentication scheme for checking an authenticity of a system user, a message authentication scheme for proving that a message is an authentic one, and a digital signature scheme in which they are combined further and the information producer guarantees that a produced message is an authentic one. Here, the user authentication scheme, the message authentication scheme, and the digital signature scheme will be briefly explained with references to the respective figures.

FIG. 1A is a conceptual diagram of an authentication scheme according to the Fiat Shamir scheme which is the representative example of the user authentication scheme. (A. Fiat and A. Shamir: "How to prove yourself, practical solutions to identification and signature problems", Proc. of Crypto' 86, 1986.5, and U.S. Pat. No. 4,748,668.

According to this Fiat Shamir scheme, when a party (referred hereafter as a prover) which owns a secret information s tries to prove its authenticity to a verifier, it is authenticated as follows, with N (=pq: p and q are mutually different large prime numbers) and I (=$s^2$ (mod N)) as the public information of the prover, and s, p and q as the secret information of the prover.

First, at the beginning, the prover generates a random number R, calculates a preresponsive message X=$R^2$ (mod N), and sends X to the verifier. The verifier who received said X selects 0 or 1 randomly as a check bit e, and sends e to the prover. The prover who received said e calculates a responsive message Y=$Rs^e$ (mod N), and sends Y to the verifier. The prover who received said Y verifies whether a verification formula $y^2$=X×$I^e$ (mod N) holds.

By setting what are up to this point as one round, and repeating this for t rounds, a probability for a third party who does not know the secret information s to clear the verification formula of the verifier becomes ($½^t$). Therefore, when the authentication is finished normally for sufficiently large t, the verifier may very well judge that the verification target (prover) is an authentic prover who owns the secret information s.

Here, this authentication scheme is generally referred as an authentication scheme based on the zero knowledge interactive proof, which has a merit in that the prover notifies only a fact that it owns the secret information s to the verifier, without leaking other contents related to the secret information s at all.

However, in the Fiat Shamir scheme, there has been a problem that the log for the prover and the verifier cannot be used later on as an evidence for a fact that the verifier has authenticated the prover. For this reason, there is a proposition of an authentication scheme in Sakurai (Japanese Patent Application Laid Open No. 5-12321) as a solution method for this problem. According to this authentication scheme, it is said that, an evidence for a fact that the verifier has really authenticated the prover remains even after the verifier has authenticated the prover.

However, what remains as an evidence here is only for a fact that the verifier authenticated the prover through a communication at best, and apart from this authenticated fact, it does not refer to anything as to what kind of communication has been made, such as the communication content in the first place. Also, because it records and maintains all the communication sequences as the evidence of the authenticated fact, there is also a drawback in that an amount of information that must be recorded and maintained by the verifier is large.

Next, FIG. 1B is a conceptual diagram of an authentication according to an authenticator which is one example of a message authentication. According to this authentication scheme, the prover who wishes to transmit a message M produces an authenticator $h_k$(M) for the message M by utilizing the hash function h with a secret key $K_h$ as a parameter, and transmits said authenticator along with said message M to the verifier who is a transmission target. The verifier is secretly sharing the same secret key $K_h$ as the prover in advance, so that it produces the authenticator by using the secret key $K_h$ from the received message similarly as in the above, and checks by matching with the received authenticator. When this matching is succeeded, the authenticity of the received message is guaranteed. This is because the correct authenticator for an arbitrary message cannot be produced without knowing the secret key $K_h$.

However, both of the above described user authentication and message authentication basically have the main object in preventing an illegal act by a third party, and what is guaranteed by a fact that said user authentication has normally finished is a fact that the prover is an authentic owner of the secret information at best, that is only a fact that a third party has not been utilizing it illegally, while what is guaranteed by a fact that a matching check has succeeded in said message authentication is only a fact that an illegal act by a third party such as an alteration of the message has not been made. Therefore, both of the above two authentication schemes are effective only against the illegal act by the third party in principle, and a fact that they have no effectiveness against the illegal act by the prover or the verifier at all is the drawback.

Next, FIG. 1C is a conceptual diagram of an RSA signature scheme (R. L. Rivest, A. Shamir, L. Adleman, "A method for obtaining digital signatures and public-key cryptosystem", Comm. ACM, vol. 21, No. 2, 1978.2) which is one example of the digital signature.

According to the RSA signature scheme, it is authenticated as follows, with e and N (=pq: p and q are mutually different large prime numbers) as the public information of the signer, and d[e×d (mod(p−1)(q−1))=1], p and q as the secret information of the signer.

First, the signer calculates a signed message C=$M^d$ (mod N) in order to guarantee that the message M is certainly what is produced by the signer, and transmits C to the verifier. The verifier who received said C calculates M=$C^e$ (mod N), and judges the authenticity of the obtained message M. At this point, when it is judged that the obtained message M is authentic, it is guaranteed that the received message M is definitely what is produced by the signer.

This is because a correct signed message for an arbitrary message cannot be produced without knowing the secret information d, and in addition, the secret information d is unique to each individual and it differs for each individual, so that the signer himself is also going to be specified. Therefore, such illegal acts in which the third party or the verifier alters the message content, or the signer denies the message content are considered to be difficult.

However, this only has an effect since a point at which the exchange of the messages has normally finished at best, and there is no guarantee for what is before that, i.e., guarantee as to whether the transmitted signed message c has surely reached to the verifier from a viewpoint of the signer, so that once it is claimed that the signed message c has not been received by the verifier, there is no means for the signer to oppose that claim, which is a drawback:

In a case in which the information provider provides a message requested by the user, it is necessary to satisfy the following four conditions, namely:

(1) the user authentication for guaranteeing that it is the authentic user;

(2) the delivery proof for guaranteeing that the information provider has surely provided the message requested by the user, and the user has received the provided message;

(3) the content proof that the provided message is the authentic one, which is capable of preventing the illegal act such as the alteration; and (4) the fact that all of (1) to (3) can be proved later on as the information provider presents evidences such as a log, etc. to an arbitrator according to the need.

However, as explained in the conventional schemes, the Fiat Shamir scheme satisfies (1) alone, the scheme of Sakurai (Japanese Patent Application Laid Open No. 5-12321) satisfies only (1) and a part of (4) (only an evidence for the user authentication), the message authentication satisfies only a part of (3) (only a guarantee that the message is authentic), and the RSA signature scheme satisfies only (3), so that there has been a drawback that the information provider cannot oppose at all against some kind of illegal act, such as an improper claim in which the user says the provided message has not been received despite of the fact that it has been received, as in (2) in particular.

DISCLOSURE OF THE INVENTION

An object of the present invention is to provide a method and a system for message delivery utilizing the zero knowledge interactive proof protocol, capable of satisfying all of the above described four conditions that could not have been satisfied by the conventional scheme, in a case of transmitting a necessary message from an information provider to a user (including a card, a user terminal, etc.).

According to one aspect of the present invention, there is provided a message delivery method in a system containing at least an information provider and a user, when the user requests a delivery of a message to the information provider, characterized by simultaneously carrying out: a step in which the information provider carries out a user authentication of the user according to a zero knowledge interactive proof protocol; a step in which the information provider transmits the message M to be delivered to the user as a part of check bits E in the zero knowledge interactive proof protocol, and delivers the message to the user in units of one bit or a plurality of bits; and a step in which the information provider makes a record management of a log data H for the zero knowledge interactive proof protocol.

Also, according to another aspect of the present invention, there is provided a system containing at least a user terminal and an information provider terminal, which is a message delivery system characterized in that: the user terminal has: a user communication control means for controlling a communication with the information provider terminal, a user secret information storage means for storing a secret information to be kept in secret by the user, a random number generation means for generating random numbers, and a user computation means for generating a preresponsive message and a responsive message to be communicated through said user communication control means according to said secret information and random numbers; and the information provider terminal has: an information provider communication control means for controlling a communication with the user terminal, a message database for storing message to be provided to the user through said information provider communication control means, and a verification means for making an authentication of the user through said information provider communication control means.

Also, according to another aspect of the present invention, there is provided a system containing at least a user terminal and an information provider terminal, which is a message delivery system characterized in that: the user terminal has: a user communication control means for controlling a communication with the information provider terminal, a user secret information storage means for storing a secret information to be kept in secret by the user, a user secret key cryptosystem means for carrying out a secret communication with the information provider terminal through said user communication control means; a random number generation means for generating random numbers, a user computation means for generating a preresponsive message, a responsive message, and a secret key to be communicated through said user communication control means, and a message storage means for storing a message delivered from the information provider through said user communication control means; and the information provider terminal has: an information provider communication control means for controlling a communication with the user terminal, a message database for storing message to be provided to the user through said information provider communication control means, an information provider computation means for generating the secret key and check bits, an information provider secret key cryptosystem means for carrying out a secret communication with the user terminal through said information provider communication control means, and a verification means for making an authentication of the user through said information provider communication control means.

BRIEF DESCRIPTION OF THE DRAWINGS

FIG. 2 is a block diagram showing an exemplary configuration of a message delivery system in the first embodiment of the present invention.

FIG. 20 is a diagram showing a configuration format of a message delivery request message used in the message delivery system shown in FIG. 17.

FIG. 21 is a diagram showing a configuration format of a log used in the message delivery system shown in FIG. 17.

FIG. 22 is a block diagram showing an exemplary configuration of a message delivery system in the eighth embodiment of the present invention.

BEST MODE FOR CARRYING OUT THE INVENTION

In the following, the embodiments of the present invention will be explained with references to the drawings.

FIG. 2 is a figure showing an exemplary configuration of a message delivery system in the first embodiment of the present invention. In FIG. 2, 1 is a card owned by a user, 11 is a secret information storage means for storing a secret information unique to the card, 12 is a random number generation means utilized in the zero knowledge interactive proof protocol, 13 is a computation means for carrying out computations necessary in executing the protocol, and 14 is a storage means for recording messages from an information provider. Here, each of these means is implemented on a tamper resistant device such as an IC, and physically safe.

2 is a fixed type user terminal used by the user, 21 is a card insertion means, 22 is a storage means for storing messages from the information provider, 23 is an operation means for operating the messages, and 24 is a communication control means for making a communication with the information provider.

3 is an information provider terminal for delivering delivery messages to the user, 31 is a message storage means for storing the delivery messages, 32 is a message division means for producing sets of check bits by dividing the delivery message, 33 is a verification means for carrying out a verification of the zero knowledge interactive proof protocol, 34 is a log management means for making a record management of logs and authentication records, and 35 is a communication control means for making a communication with the user terminal.

Figure 1A:
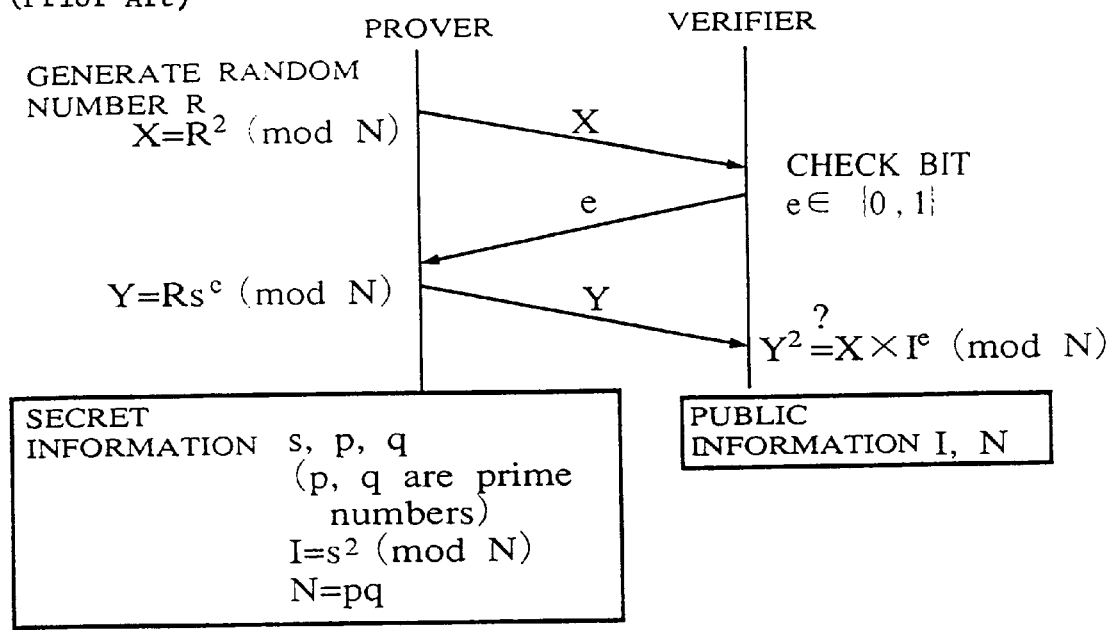
FIG. 1A is a conceptual diagram showing a user authentication scheme according to a conventional Fiat Shamir scheme.
Figure 1B:
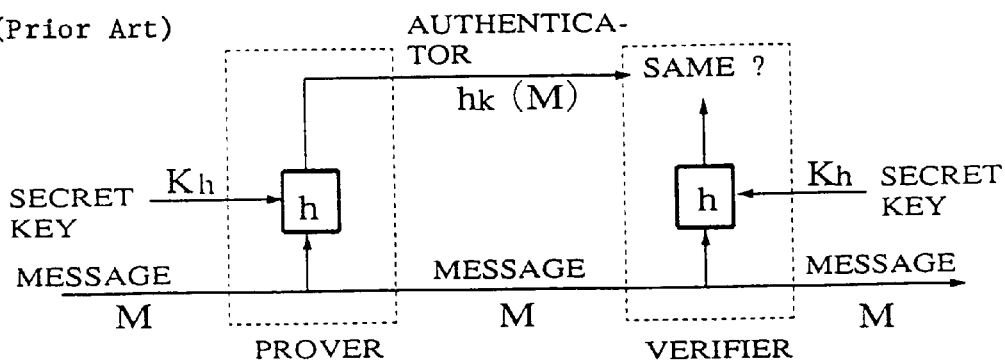
FIG. 1B is a conceptual diagram showing a message authentication scheme according to a conventional authenticator scheme.
Figure 1C:
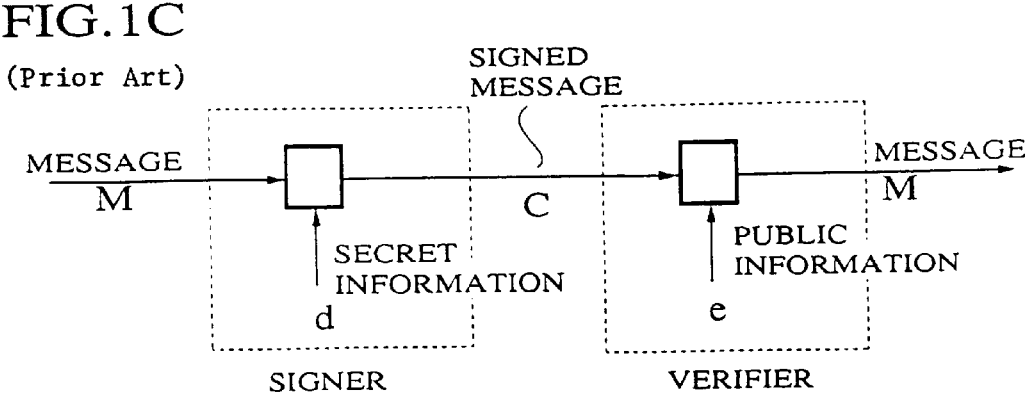
FIG. 1C is a conceptual diagram showing a digital authentication scheme according to a conventional RSA scheme.
Figure 3:
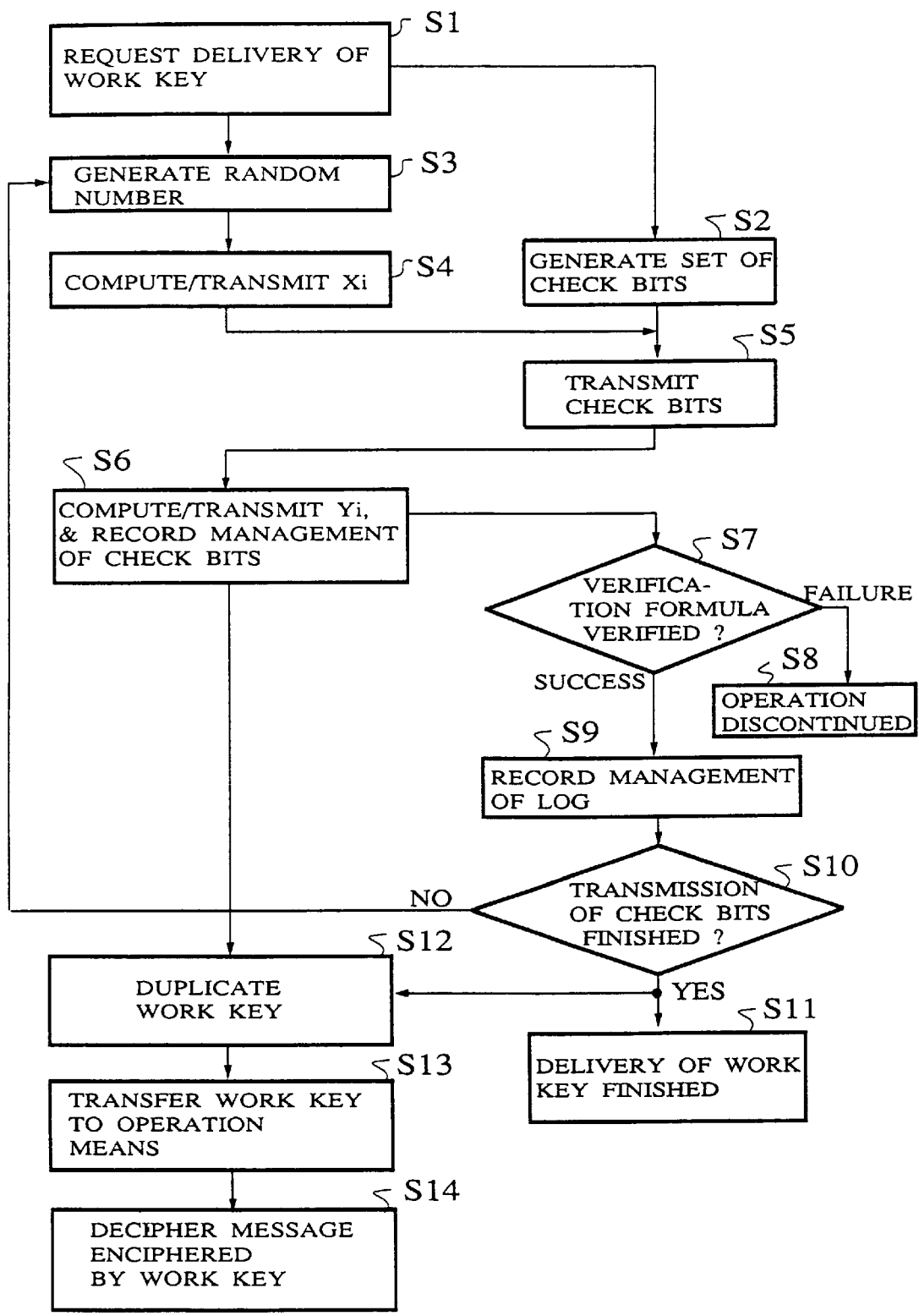
FIG. 3 is a flow chart showing an operation procedure for the message delivery system shown in FIG. 2.

Next, the message delivery method utilizing the zero knowledge interactive proof protocol in the system of FIG. 2 will be explained according to a process flow chart and an exemplary delivery message shown in FIG. 3 and FIG. 4. It is noted that, here, the Fiat Shamir scheme is used as the zero knowledge interactive proof protocol, and as a preparation stage, a reliable center sets up P, Q, N, I, and s for each user, discloses N and I among them as the public information of the user, and stores s as the secret information of the user in the secret information storage means 11 of the card 1 and distributes it to the user. Here, P and Q are mutually different large prime numbers, and N=PQ. Also, I=S2 (mod N) holds.

An exemplary case in which, with respect to the user who is already storing a message W(m) enciphered by a work key W in the storage means 22 of the user terminal 2, said work key W is to be delivered as the delivery message will be explained.

First, after his own card 1 is inserted into the card insertion means 21, the user requests a delivery of the work key W to the information provider (S1).

Figure 4:
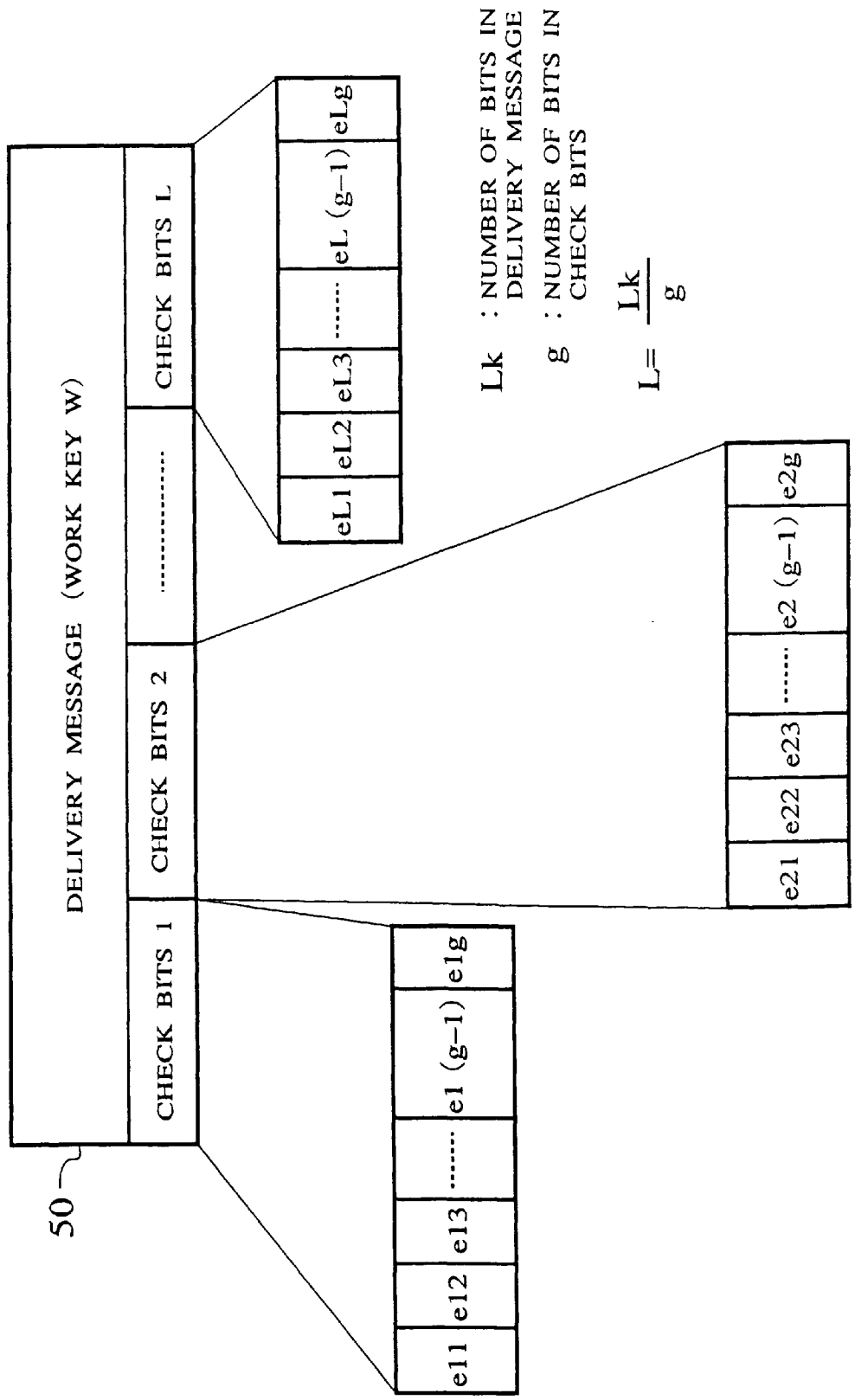
FIG. 4 is a diagram showing an exemplary delivery message used in the message delivery system shown in FIG. 2.

The information provider divides the work key W stored in the message storage means 31 in units of g bits at the message division means 32 as in the delivery message 50 shown in FIG. 4, and produces sets of check bits $e_{ji}$ formed by g bits (S2). Here, when a number of bits in the work key W is set to be $L_W$, $L_W/g$ sets of check bits are going to be produced, where i takes a value from 1 to g, and j takes a value from 1 to $L_W/g$.

Next, the card 1 generates g pieces of random numbers $R_i$ at the random number generation means 12 (S3), calculates $X_i=R_i^2$ (mod N) for each at the computation means 13, and transmits $X_i$ to the information provider via the communication control means 24 (S4).

The information provider who received $X_i$ via the communication control means 35 transmits the J-th check bit $e_{ji}$ to the card 1 via the communication control means 35 (S5).

At the card 1, for each bit i of the check bit $e_{ji}$ received via the communication control means 24, $Y_i=R_i$ if it is 0, or $Y_i=sR_i$ (mod N) using the secret information s stored in the secret information storage means 11 if it is 1, is calculated at the computation means 13, and after the check bit $e_{ji}$ is recorded in the storage means 14, $Y_i$ is transmitted to the information provider via the communication control means 24 (S6).

For each bit i, the information provider verifies whether a verification formula $Y_i^2=X_i$ (mod N) is satisfied if the check bit is 0, or a verification formula $Y_i^2=X_iI$ (mod N) is satisfied if it is 1, at the verification means 33 from said $X_i$, said $Y_i$, and said check bit $e_{ji}$ received via the communication control means 35 (S7). In a case this verification failed, it regards the card 1 as illegal and discontinues the operation subsequent to that (S8), and in a case it succeeded, a record management of said $X_i$, said $Y_i$, and said check bit $e_{ji}$ is made as the log in the log management means 34 (S9). Then, the steps subsequent to the above described S3 are repeated until it finishes transmitting all of $L_W/g$ sets of the check bits $e_{ji}$ produced at the message division means 32 (S10), and eventually the information provider regards that the delivery of the work key W has finished at a point at which the transmission of all of $L_W/g$ sets of the check bits $e_{ji}$ produced at the message division means 32 has finished (S11).

At the card 1, after the work key W is duplicated by combining all of $L_W/g$ sets of the check bits $e_{ji}$ recorded in the storage means 14 (S12), it is transferred to the operation means 23 of the user terminal 2 (S13). At the operation means 23, the message m can be obtained by deciphering the enciphered message W(m) stored in the storage means 22 by using the transferred work key W (S14).

The above explanation is that by which the information provider can certify that the necessary message has surely been delivered to the user and the recorded in the card of the user. For example, when the message m is made to be a charged message such as a writing, W(m) enciphered by the work key W is transmitted to the user in advance, or recorded on a medium such as a CD-ROM and distributed in advance, and as the information provider transmits said work key W by the above described delivery method after that, it is possible for the information provider to utilize the log which is recorded and managed in the log management means 34 at a time of collecting the message fee such as a fee for using the copyright to the user who has definitely purchased the message m. Also, in the electronic mail, the mail content m is enciphered by the work key W and W(m) is transmitted to the delivery target in advance, and later on, as said work key W is transmitted by the above described delivery method from the electronic mail manager to the delivery target, the electronic mail manager can utilize it as the delivery proof, and so on, such that various manners of utilization are possible.

As explained in the above, in this first embodiment, the zero knowledge interactive proof protocol is utilized as the user authentication method by the information provider in the first place, so that in view of the purpose and the conventionally known utilization method of the zero knowledge interactive proof protocol, it is almost impossible to continuously clear the verification by the information provider if the user is not utilizing the authentic card, and it is nearly completely rejected at the authentication stage.

Secondly, at a portion at which the delivery message is delivered from the information provider to the user, the delivery is made by containing the delivery message in the check bits of the zero knowledge interactive proof protocol, so that when the zero knowledge interactive proof protocol is normally finished, it is going to be such that the check bits, that is the delivery message, has definitely been received and recorded, and appropriate processing has been made on the card. Also, in a case the verification of the information provider failed in a middle, the authentication subsequent to that is discontinued, and the remaining check bits are not delivered, so that the delivery message that can be learned by the user is limited only to that prior to the failure of the verification.

Thirdly, the information provider can certify that the normal authentication has been made between the information provider and the user by making a record management of the log (said $X_i$, said $Y_i$, said check bits $e_{ji}$), so that in addition to the second effect, it must be such that the user has received the delivery message and the delivery message is recorded in the storage means 14 of the card. This fact implies that it is possible to judge whether the user is in a state capable of generating the work key W or not by matching the log disclosed by the information provider and the delivery message recorded on the card submitted from the user. Note that, in this case, when there is no submission of the card from the user, it is judged to be in a state capable of generating the work key W.

Therefore, it is impossible for an illegal user to utilize the system, or to illegally exploit all the delivery message. Also, against such an improper claim in which the user says the delivery message has not been received despite of the fact that the authentication has finished normally, it is possible for the information provider to oppose it by disclosing the log while requesting the user to submit the card.

Note that, as it goes without saying, even in the above embodiment, there is no necessity for dividing the entire delivery message and generating the check bits $e_{ji}$, and for example, it is possible to consider the message delivery method in which up to the gn-th bits from the top of the delivery message are set as the check bits $e_{ji}$ (j=1, ..., n), and after the zero knowledge interactive proof protocol using n sets of the check bits $e_{ji}$ is finished, the remaining portion of the delivery message is transmitted collectively. In this case, there is a feature that, by changing a value of n variously, the security level in the zero knowledge interactive proof can be changed while an amount of communication can be reduced. For example, when n is set to be a half of $L_W/g$, an amount of communication also becomes nearly a half.

Also, as for the method for generating the check bits $e_{ji}$, apart from that for generating by simply dividing the delivery message, it is also possible to generate them by attaching a dummy message, or by enciphering them. In this case, by providing a function for restoring the original delivery message by autonomously removing the dummy message from the secret information set up in advance in the card or the stored check bits $e_{ji}$, or deciphering them, it is possible to make it impossible to take out said delivery message unless the zero knowledge interactive proof is finished normally. Consequently, it is possible to eliminate such things as that in which the third party or the user illegally exploits the check bits $e_{ji}$, or carries out such an illegal act in which the authentication is failed on purpose after a majority of the check bits $e_{ji}$ are received, and the remaining portion which has not delivered among the check bits $e_{ji}$ are predicted, such that the third party or the user obtains the delivery message while the information provider judges that the delivery has failed or does not notice that.

Note that, in the message delivery method and system according to the above described first embodiment, all the information necessary for the zero knowledge interactive proof protocol is implemented on the tamper resistant device, and the actual message delivery is also executed by using only those means implemented on the tamper resistant device, so that said information is not going to be leaked to the external, and it is impossible even for the card owner to learn said information. Therefore, it is possible to prevent such illegal acts as that for forging the card itself, or that for rewriting the recorded information on the card.

Next, the second embodiment of the present invention will be explained.

Figure 5:
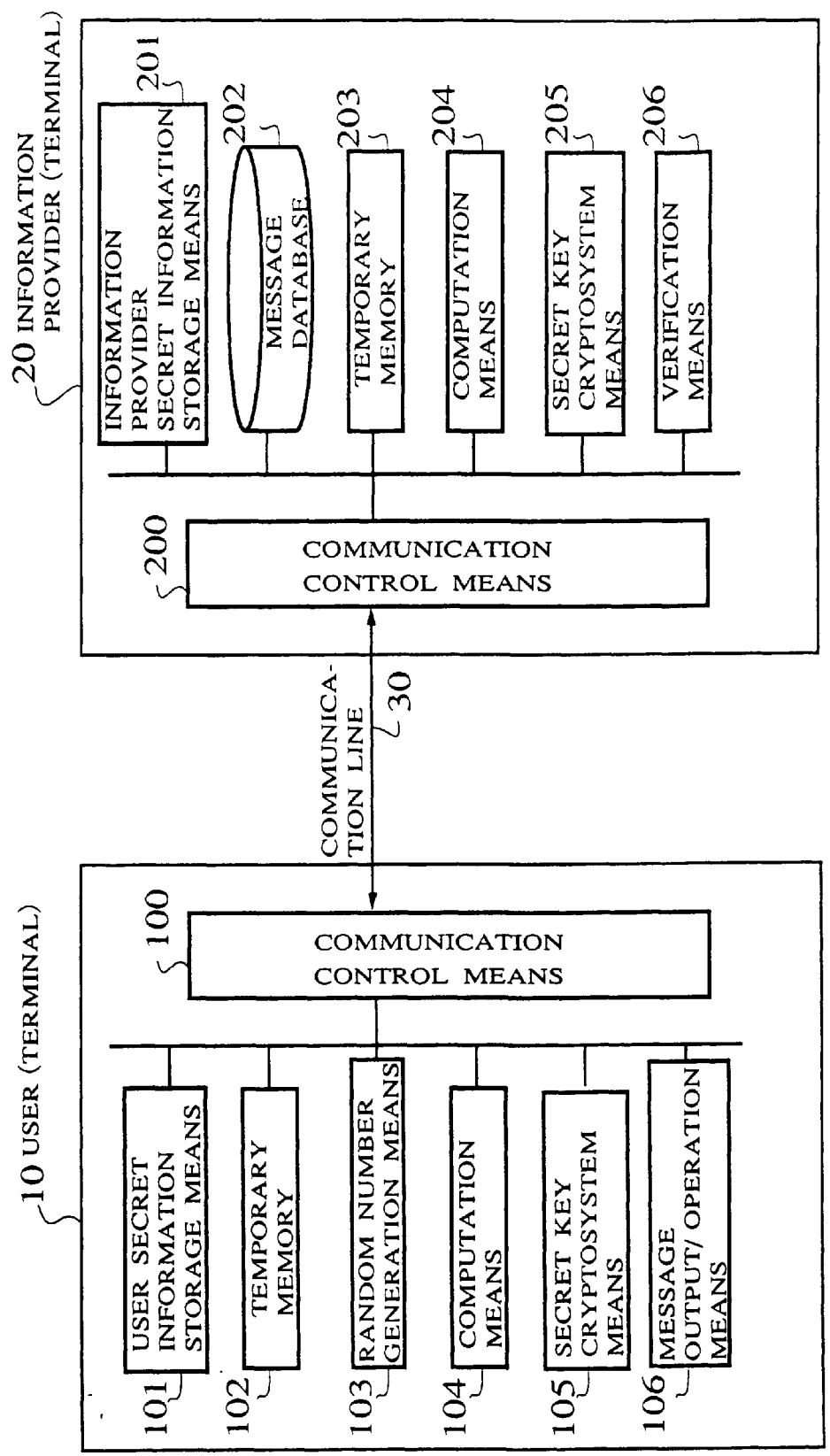
FIG. 5 is a block diagram showing an exemplary configuration of a message delivery system in the second embodiment of the present invention.

FIG. 5 is a block diagram showing a configuration of a message delivery system in the second embodiment of the present invention, in which 10 indicates a terminal (user terminal) of a user who receives messages provided from an information provider terminal 20, where 100 is a communication control means for controlling a communication line 30, 101 is a user secret information storage means for storing a secret information of the user, 102 is a temporary memory for the user to temporarily store a necessary information, 103 is a random number generation means for the user to generate random numbers, 104 is a computation means having a function for the user to carry out necessary computations, 105 is a secret key cryptosystem means for carrying out a secret communication according to the secret key cryptosystem (DES, FEAL, for example), and 106 is a message output/operation means for the user to output or operate the received message.

Also, 20 indicates a terminal (information provider terminal) of the information provider for providing messages, where 200 is a communication control means for controlling the communication line 30, 201 is an information provider secret information storage means for storing a secret information of the information provider, 202 is a message database in which the messages to be provided are stored, 203 is a temporary memory for the information provider to temporarily store a necessary information, 204 is a computation means having a function for the information provider to carry out necessary computations, 205 is a secret key cryptosystem means for carrying out the secret communication according to the secret key cryptosystem, and 206 is a verification means for verifying an authenticity of a communication sequence according to the Fiat Shamir scheme. 30 indicates the communication line for connecting the user and the information provider by means of a communication.

Figure 6:
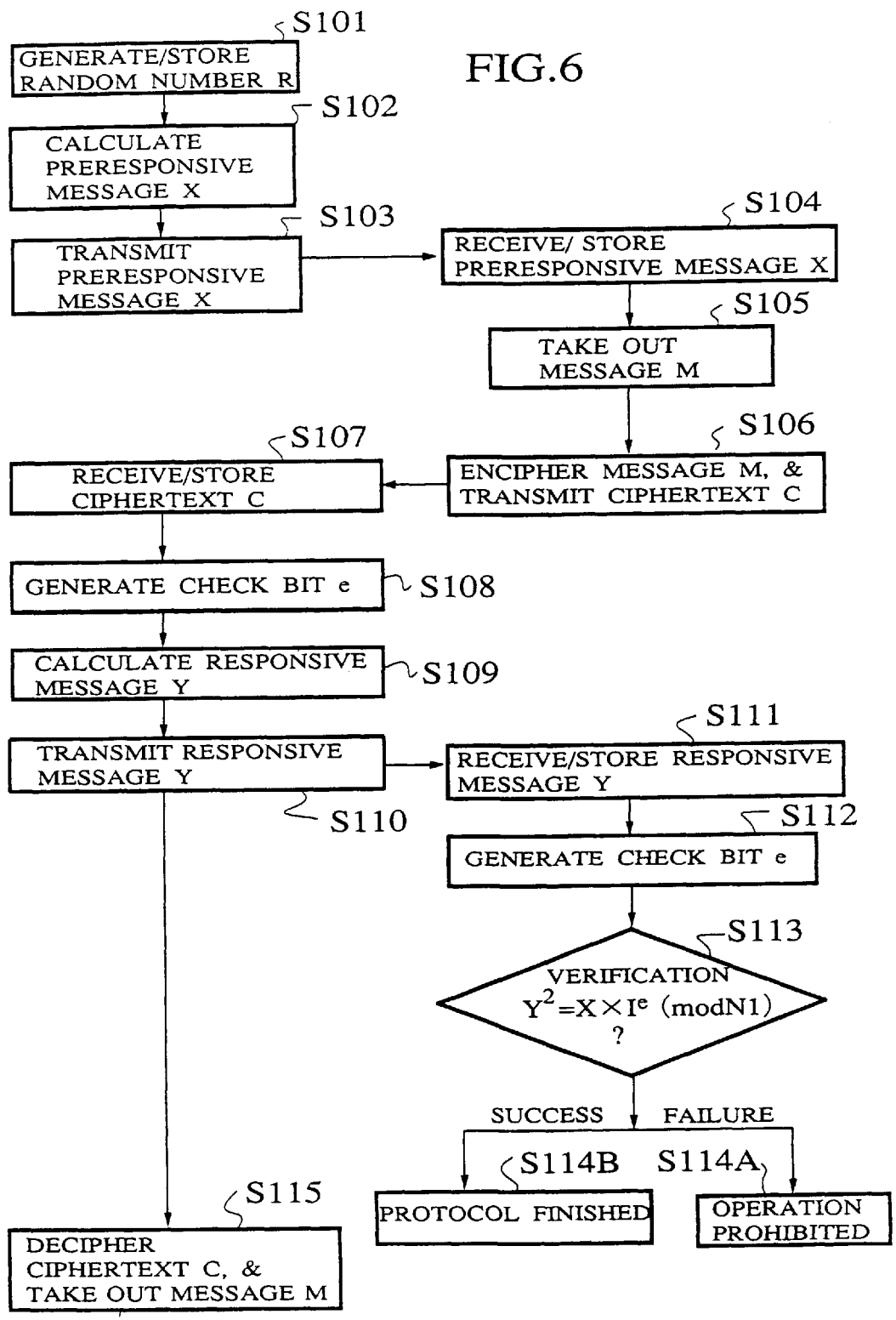
FIG. 6 is a flow chart showing an operation procedure for the message delivery system shown in FIG. 5.

In the following, an operation procedure will be explained according to the flow chart of FIG. 6.

First, as a preparation stage, a reliable center sets up p1, q1, I, and s for each user, discloses N1 and I among them as the public information of the user, and stores s as the secret information of the user in the user secret information storage means 101 and secretly distributes it to the user. Here, p1 and q1 are mutually different large prime numbers, and N1=p1×q1. Also, I=$s^2$ (mod N1) holds.

In addition, a system secret key SK is set up between each information provider and each user, and registered in the user secret information storage means 101 and the information provider secret information storage means 201 in advance. It goes without saying that it is preferable for this system secret key SK to be different for each information provider and each user, but in view of a system design, it may be fine to utilize one type as a secret key of the system as a whole or a plurality of types of system secret keys among a plurality of users.

(1) Delivery certification step

The user terminal 10 generates g pieces of random numbers $R_i$ (i=1, 2, ..., g) by the random number generation means 103, stores them in the temporary memory 102 (S101), and after that, calculates a preresponsive message $X_i = R_i^2$ (mod N1) (i=1, 2, ..., g) by the computation means 104 for each random number (S102), and transmits it to the information provider terminal 20 through the communication line 30 (S103).

The information provider terminal 20 stores the received preresponsive message $X_i$ (i=1, 2, ..., g) in the temporary memory 203 (S104), and after that, takes out a message M to be delivered to the user terminal 10 from the message database 202 (S105), and transmits a ciphertext C=$E_{SK}$(M) which is enciphered by the secret key cryptosystem means 205 with the system secret key SK stored in the information provider secret information storage means 201 as a secret key, to the user terminal 10 through the communication line 30 (S106).

The user terminal 10 stores the received ciphertext C in the temporary memory 102 (S107), and after that, generates the check bits $e_i$=h(C) (i=1, 2, ..., g) according to the hash function h which is a g bit data compression function, by using the ciphertext C at the computation means 104 (S108). For each bit i of the generated check bits $e_i$, $Y_i=R_i$ if $e_i$=0, or $Y_i=sR_i$ (mod N1) if $e_i$=1, is calculated from the random number $R_i$ stored in the temporary memory 102 and the user's secret information s stored in the user secret information storage means 101 (S109), and transmitted as a responsive message $Y_i$ (i=1, 2, ..., g) to the information provider terminal 20 through the communication line 30 (S110).

The information provider terminal 20 stores the received responsive message $Y_i$ (i=1, 2, ..., g) in the temporary memory 203 (S111), and after that, generates the check bits $e_i$=h(C) (i=1, 2, ..., g) according to the hash function which is a g bit data compression function, by using the ciphertext C at the computation means 204 (S112). At the verification means 206, whether a verification formula $Y_i^2=X_i$ (mod N1) if $e_i$=0, or a verification formula $Y_i^2=X_i \times I$ (mod N1) if $e_i$=1, is satisfied or not is verified for each bit i, from the public information I of the user, and the preresponsive message $X_i$, the responsive message $Y_i$, and the check bits $e_i$ stored in the temporary memory 203 (S113). In a case this verification has failed, it regards the user as illegal, and the operation subsequent to that is prohibited (S114A), and in a case it has succeeded, it is judged that the delivery of the message M has finished normally (S114B).

(2) Message take out step

The user terminal 10 deciphers the ciphertext C stored in the temporary memory 102 into the message M=$D_{SK}$(C) by the secret key cryptosystem means 105 with the system secret key SK stored in the user secret information storage means 101 as the secret key, and outputs the message M from the message output/operation means 106 (S115).

A fact that the delivery certification step has finished normally by using the above described message delivery method implies that the user authentication according to the zero knowledge interactive proof protocol has carried out normally, and besides it becomes a proof for a fact that the check bits ei (i=1, 2, ..., g) have been generated correctly. Also, the check bits $e_i$ (i=1, 2, ..., g) are generated from the ciphertext C received by the user terminal 10 by using the hash function which is a data compression function, so that the correct check bits $e_i$ (i=1, 2, ..., g) cannot be generated unless the correct ciphertext C is received. Consequently, the fact that the user can generate the check bits $e_i$ (i=1, 2, ..., g) correctly and the fact that the user has received the ciphertext C (and the message M) normally become equivalent. As obvious from the above explanation, the information provider can certify the fact that the message has been delivered to the user accurately and surely.

Here, the enciphering/deciphering is carried out by utilizing the secret key cryptosystem in the above explanation, but it is obviously fine to utilize the public key cryptosystem instead. Also, it has been explained according to the Fiat Shamir scheme, but the present method is applicable to all the zero knowledge interactive proof protocols which base their safety on a difficulty of the factoring or a difficulty of the discrete logarithmic problem, etc., including the Extended Fiat Shamir scheme (Ohta, Okamoto, "An Extension of the Fiat-Shamir Scheme Based on Higher Degree Roots", the Electronic Information Communication Society, Technical Research Report ISEC88-13).

Next, the third embodiment of the present invention will be explained.

Figure 7:
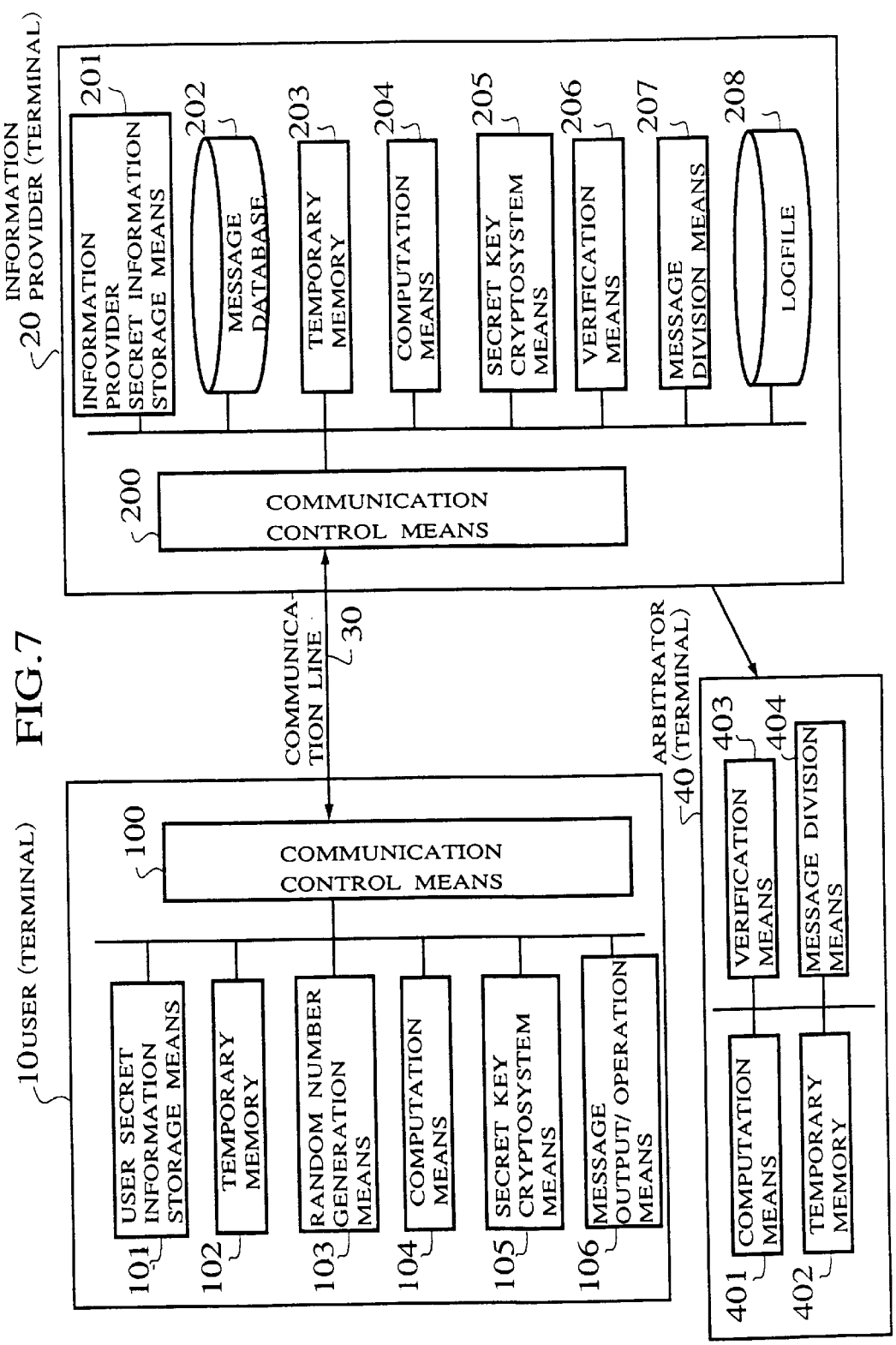
FIG. 7 is a block diagram showing an exemplary configuration of a message delivery system in the third embodiment of the present invention.

FIG. 7 is a block diagram showing a configuration of the message delivery system in the third embodiment of the present invention, in which 10 indicates a terminal (user terminal) of a user who receives messages provided from an information provider terminal 20, where the constituent means are similar to the second embodiment shown in FIG. 5. 20 indicates a terminal (information provider terminal) of an information provider for providing the messages, where the constituent means from 200 to 206 are similar to the second embodiment, while 207 is a message division means for dividing the message into a plurality of blocks in arbitrary bit lengths and storing them, and 208 is a logfile for making a record management of a log as an evidence for proving later on the fact that the message has been delivered to the user. 30 indicates a communication line similarly as in the second embodiment. 40 indicates a terminal (arbitrator terminal) of an arbitrator for Judging later on an authenticity of a log from a neutral standpoint, for the log which is recorded and managed by the information provider in the logfile 208, where 401 is a computation means having a function for the arbitrator to carry out necessary computations, 402 is a temporary memory for the arbitrator to temporarily store a necessary information, 403 is a verification means for verifying an authenticity for the log about which the judgement of the authenticity is requested, and 404 is a message division means for dividing the message into a plurality of blocks in arbitrary bit lengths and storing them.

Figure 8:
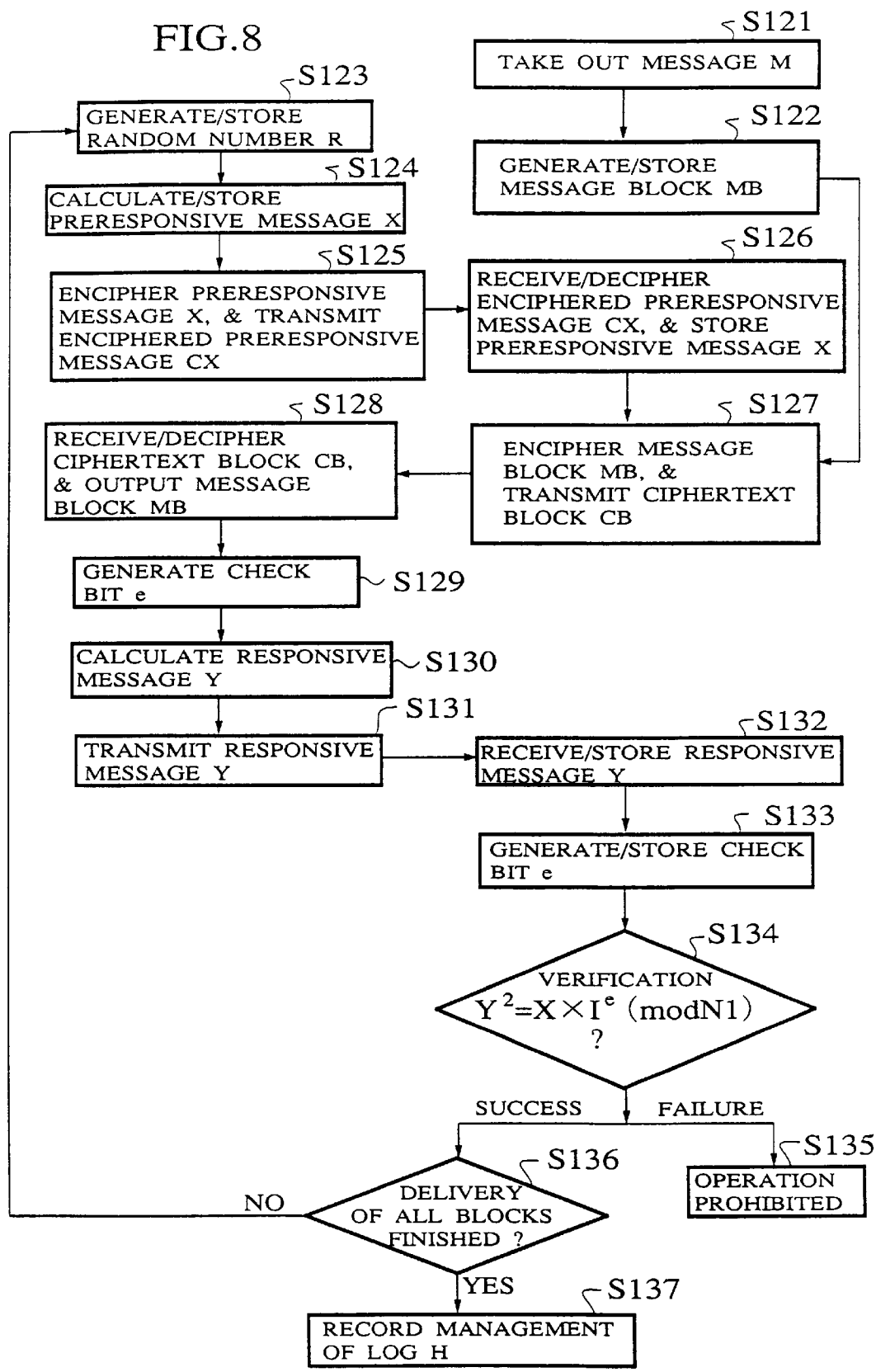
FIG. 8 is a flow chart showing an operation procedure concerning a delivery certification for the message delivery system shown in FIG. 7.
Figure 9:
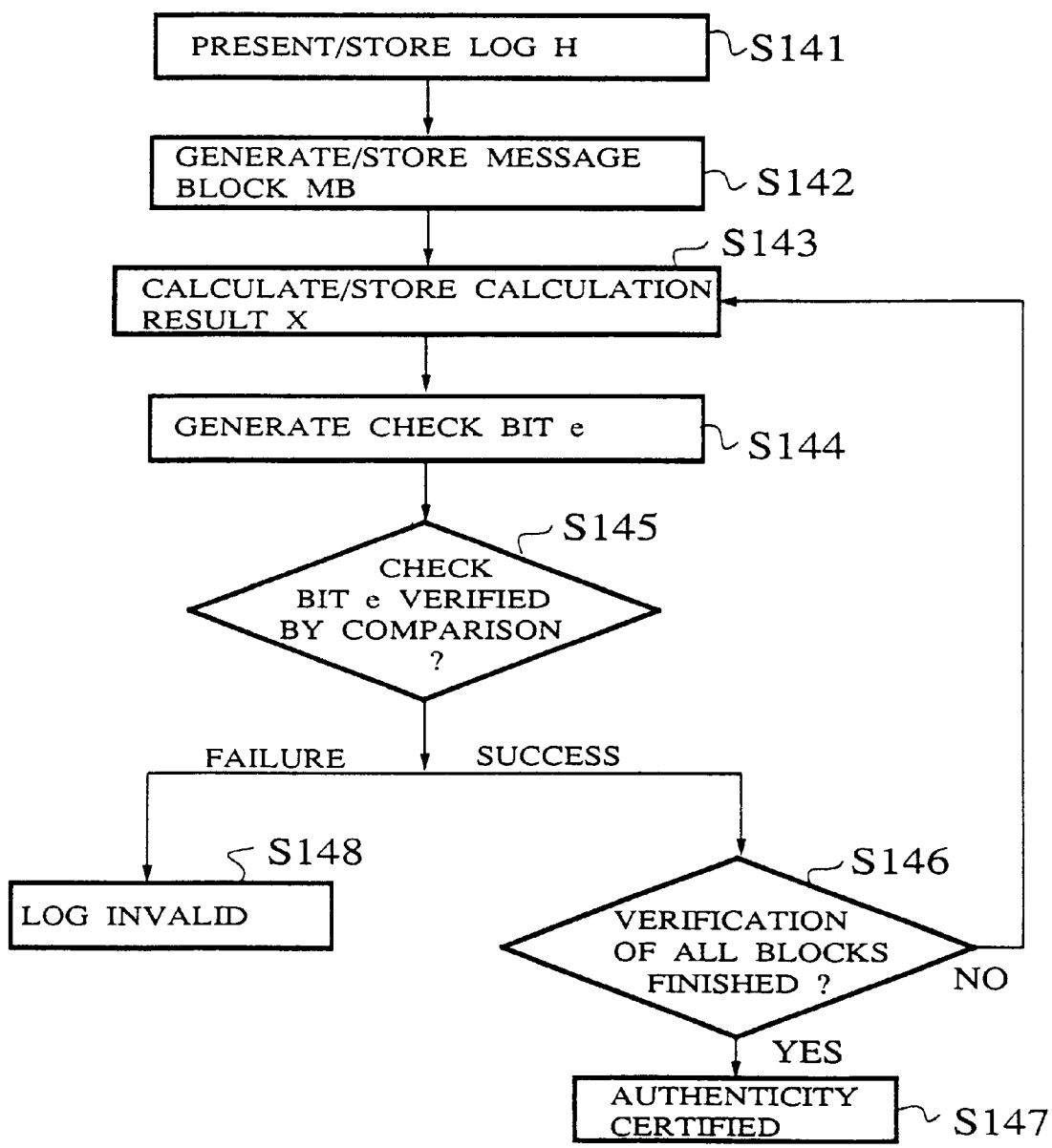
FIG. 9 is a flow chart showing an operation procedure concerning an arbitration for the message delivery system shown in FIG. 7.

In the following, the operation procedure for the delivery certification step will be explained according to the flow chart of FIG. 8, and the operation procedure for the arbitration will be explained according to the flow chart of FIG. 9. Here, the preparation stage is similar to the second embodiment described above.

(1) Delivery certification step

The information provider terminal 20 takes out the message M to be delivered to the user terminal 10 from the message database 202 (S121), divides the message M into a plurality of blocks in sizes of arbitrary bit lengths, and stores them as the message blocks $MB_j$ (j=1, 2, ..., m) at the message division means 207 (S122), Here, for the sake of the simplicity of the explanation, a number of divided blocks is set to be m, and a bit length is set to be constant g for all the blocks.

The processing from here on is for the J-th block, and the following processing is repeatedly carried out sequentially (m times) for each block from the first block to the m-th block.

The user terminal 10 generates g pieces of random numbers $R_{ij}$ (i=1, 2, ..., g) by the random number generation means 103, and then stores them in the temporary memory 102 (S123), and calculates a preresponsive message $X_{ij} = R_{ij}^2$ (mod N1) (i=1, 2, ..., g) by the computation means 104 for each random number, and then stores it in the temporary memory 102 (S124). After that, an enciphered preresponsive message $CX_{ij} = E_{SK}(X_{ij})$ (i=1, 2, ..., g) which is enciphered by the secret key cryptosystem means 105 with the system secret key SK stored in the user secret information storage means 101 as the secret key, is transmitted to the information provider terminal 20 through the communication line 30 (S125).

The information provider terminal 20 deciphers the received enciphered preresponsive message $CX_{ij}$ (i=1, 2, ..., g) into the preresponsive message $X_{ij} = D_{SK}(CX_{ij})$ (i=1, 2, ..., g) by the secret key cryptosystem means 205 with the system secret key SK stored in the information provider secret information storage means 201 as the secret key, and stores it in the temporary memory 203 (S126). After that, a ciphertext block $CB_j = E_{SK}(MB_j)$, in which the message block $MB_j$ stored in the message division means 207 is enciphered by the secret key cryptosystem means 205 with the system secret key SK stored in the information provider secret information storage means 201 as the secret key, is transmitted to the user terminal 10 through the communication line 30 (S127).

The user terminal 10 deciphers the received ciphertext block $CB_j$ into the message block $MB_j = D_{SK}(CB_j)$ (i=1, 2, ..., g) by the secret key cryptosystem means 105 with the system secret key SK stored in the user secret information storage means 101 as the secret key, and outputs the message block $MB_j$ from the message output/operation means 106 (S128).

In addition, at the same time as outputting the message block $MB_j$, the check bits $e_{ij} = h(MB_j \| X_{1j} \| X_{2j} \| \ldots \| X_{gj})$ (i=1, 2, ..., g) are generated according to the one-way random hash function h, by using the message block $MB_j$ and the preresponsive message $X_{ij}$ (i=1, 2, ..., g) stored in the temporary memory 102 at the computation means 104 (S129), and for each bit i of the generated check bits $e_{ij}$, $Y_{ij} = R_{ij}$ if $e_{ij}=0$, or $Y_{ij} = sR_{ij}$ (mod N1) if $e_{ik}=1$, is calculated from the random number $R_{ij}$ stored in the temporary memory 102 and the user's secret information s stored in the user secret information storage means 101 (S130), and transmitted as a responsive message $Y_{ij}$ (i=1, 2, ..., g) to the information provider terminal 20 through the communication line 30 (S131).

The information provider terminal 20 stores the received responsive message $Y_{ij}$ (i=1, 2, ..., g) in the temporary memory 203 (S132), and after that, generates the check bits $e_{ij}=h(MB_j\|X_{1j}\|X_{2j}\| \ldots \|X_{gj})$ (i=1, 2, ..., g) according to the one-way random hash function h, by using the preresponsive message $X_{ij}$ (i=1, 2, ..., g) stored in the temporary memory 203 and the message block $MB_j$ stored in the message division means 207 at the computation means 204, and stores them in the temporary memory 203 (S133).

Then, at the verification means 206, whether a verification formula $Y_{ij}^2=X_{ij}$ (mod N1) if $e_{ij}=0$, or a verification formula $Y_{ij}^2=X_{ij}\times I$ (mod N1) if $e_{ij}=1$, is satisfied or not is verified for each bit i, from the public information I of the user, and the preresponsive message $X_{ij}$, the responsive message $Y_{ij}$, and the check bits $e_{ij}$ stored in the temporary memory 203 (S134). In a ease this verification has failed, it regards the user as illegal, and the execution of the protocol is immediately discontinued (S135), and in a case it has succeeded, the above processing is repeated until all the blocks are finished (S136). Then, in a case the verification has succeeded for all the blocks from the first block to the m-th block, the message M, the check bits $e_{ij}$, and the responsive message $Y_{ij}$ (i=1, 2, ..., g: j=1, 2, ..., m) are recorded and managed in the logfile 208 as the log H (S137).

(2) Arbitration

In a case the user claims later on that the message M has not been received, the information provider terminal 20 presents the log H recorded and managed in the logfile 208, and stores it in the temporary memory 402 of the arbitrator terminal 40 (S141).

The arbitrator terminal 40 divides the message M into a plurality of message blocks $MB_j$ (j=1, 2, ..., m) and stores them, for the message M in the log stored in the temporary memory 402, at the message division means 404 (S142).

For each block (J-th block), $X_{ij}=Y_{ij}^2$ (mod N1) if $e_{ij}=0$, or $X_{ij}=Y_{ij}^2/I$ (mod N1) if $e_{ij}=1$, is calculated at the computation means 401 for each bit i, from the public information I of the user terminal 10, and the check bits $e_{ij}$ and the responsive message $Y_{ij}$ in the log H stored in the temporary memory 402, and the calculation result $X_{ij}$ (i=1, 2, ..., g) is stored in the temporary memory 402 (S143).

Next, the check bits $e_{ij}=h(MB_j\|X_{1j}\|X_{2j}\| \ldots \|X_{gj})$ (i=1, 2, ..., g) are generated according to the one-way random hash function h of the computation means 401, from the message block $MB_j$ stored in the message division means 404 and the calculation result $X_{ij}$ (i=1, 2, ..., g) stored in the temporary memory 402 (S144).

After that, at the verification means 403, whether they coincide with the check bits $e_{ij}$ (i=1, 2, ..., g) in the log H stored in the temporary memory 402 or not is checked (S145). When they coincide for all the blocks (m blocks from the first block to the m-th block) (S146), it implies that the authenticity of the log H is guaranteed (S147), and otherwise the log H becomes invalid (S148).

A fact that the delivery certification step has finished normally by using the above described message delivery method implies that the user authentication according to the zero knowledge interactive proof protocol has been carried out normally, and besides it becomes a proof for the fact that the check bits $e_{ij}$ (i=1, 2, ..., g: j=1, 2, ..., m) have been generated correctly. Also, the check bits $e_{ij}$ (i=1, 2, ..., g: j=1, 2, ..., m) are generated from the message blocks $MB_j$ (j=1, 2, ..., m) received by the user and the preresponsive message $X_{ij}$ (i=1, 2, ..., g: j=1, 2, ..., m) generated by the user, by using the one-way random hash function h, so that the correct check bits $e_{ij}$ (i=1, 2, ..., g: j=1, 2, ... m) cannot be generated unless the correct message blocks $MB_j$ (j=1, 2, ..., m) are received. Consequently, the fact that the user can generate the check bits $e_{ij}$ (i=1, 2, ..., g: j=1, 2, ... m) correctly and the fact that the user has received the message blocks $MB_j$ (i=1, 2, ..., m) normally become equivalent. Therefore, the information provider can certify the fact that the message has been delivered to the user accurately and surely.

Here, an example in which the enciphering/deciphering is carried out by utilizing the secret key cryptosystem has been explained in the above explanation, but it is obviously fine to utilize the public key cryptosystem instead. Also, it has been explained according to the Fiat Shamir scheme, but the present method can deal with all the zero knowledge interactive proof protocols which base their safety on a difficulty of the factoring or a difficulty of the discrete logarithmic problem, etc., including the Extended Fiat Shamir scheme (Ohta, Okamoto, "An Extension of the Fiat-Shamir Scheme Based on Higher Degree Roots", the Electronic Information Communication Society, Technical Research Report ISEC88-13).

Next, in relation to the log H comprising the check bits $e_{ij}$, the responsive message $Y_{ij}$ (i=1, 2, ..., g: j=1, 2, ..., m), and the message M, they are mutually related by the verification formula in the zero knowledge interactive proof protocol and the one-way random hash function, so that it is impossible to forge the log H by illegally altering a part, etc. Therefore, by making a record management of the log H, it can be presented to a neutral third party such as the arbitrator later on as an evidence for the fact that the user has surely received the message M.

In addition, the communication between the information provider terminal and the user terminal is repeatedly carried out as many times as a number m of divided blocks of the message M, so that in a case the verification of the information provider failed in a middle, the communication subsequent to that is discontinued, and the remaining message blocks are not transmitted. Namely, the message blocks that can be learned by the user are limited only to those prior to the failure of the verification, so that it becomes impossible for the user who caused the failure of the verification of the information provider to receive the entire message M correctly as a result. Consequently, not to mention a case in which the illegal user who does not know the secret information s of the user transmits the illegal responsive message $Y_{ij}$ (i=1, 2, ..., g), it is possible to eliminate a case in which such an illegal act as not transmitting the responsive message itself is made, such that the user illegally obtains the entire message M despite of the fact that the information provider cannot make a record management of the log H for proving the fact that the information provider has delivered the message M to the user.

Also, in the above explanation, the bit length of the divided blocks has been set to be constant g for each block, but it may also be quite fine to change the bit length size block by block, as in a case of 1 bit for the first block, 2 bits for the second blocks, 4 bits for the third blocks, etc. for example.

The above explanation is that by which it is possible to prove the fact that the information provider has delivered the message M to the user accurately and surely, and various manners of utilization are possible. For example, in a case of delivering a charged message such as a writing as the message M, or in a case of delivering a key for deciphering the enciphered software as the message M after the software, etc. enciphered in advance is distributed for free or for some charge by means of a CD-ROM, etc., as the information provider delivers the message M to the user according to the above described message delivery method, the log H recorded and managed by the information provider can be utilized as a proof information at a time of collecting the message fee such as a fee for using the copyright or the sale price of the software, and so on.

Next, the fourth embodiment of the present invention will be explained.

Figure 10:
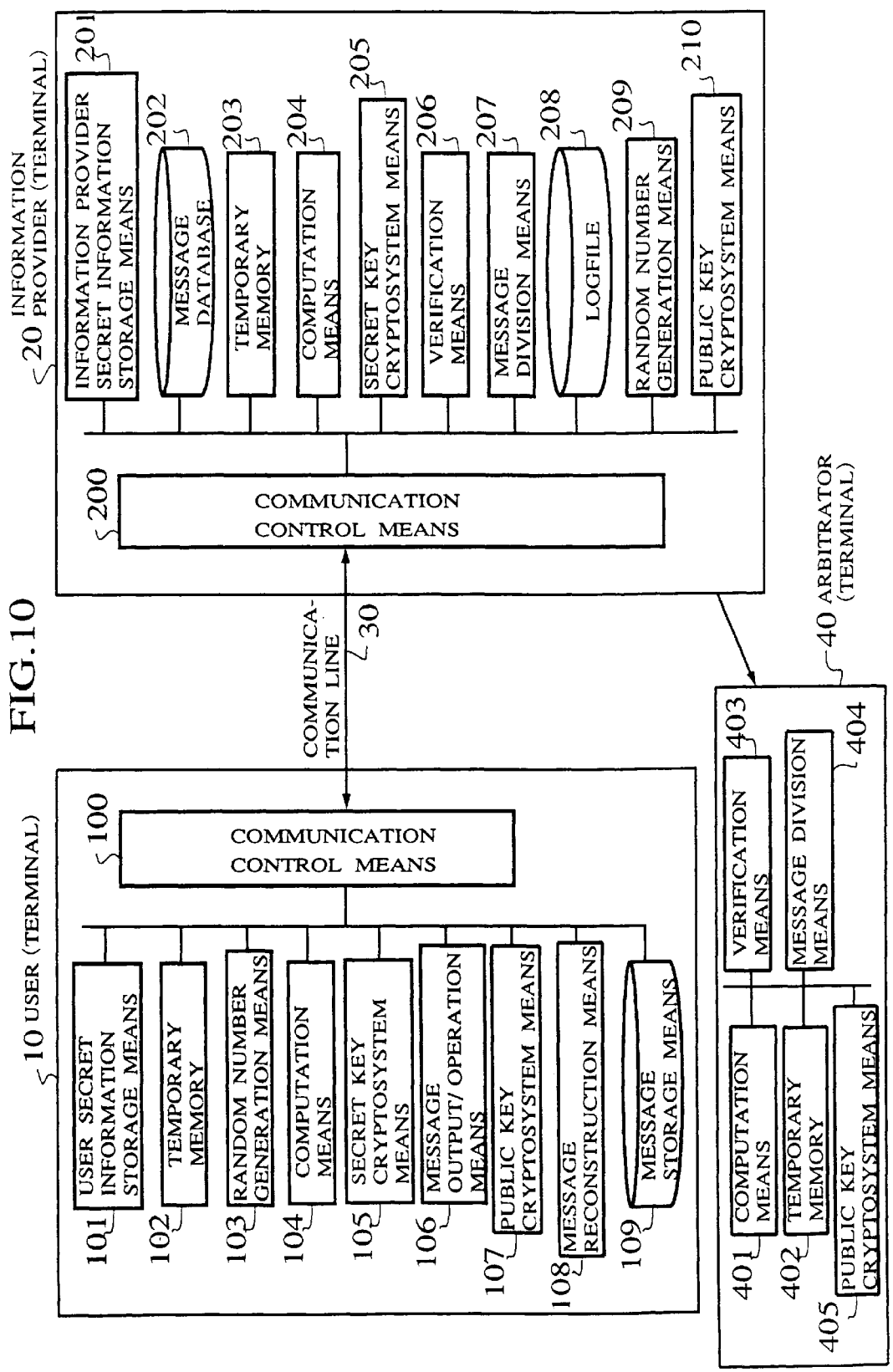
FIG. 10 is a block diagram showing an exemplary configuration of a message delivery system in the fourth embodiment of the present invention.

FIG. 10 is a block diagram showing a configuration of the message delivery system in the fourth embodiment of the present invention, in which 10 indicates a terminal (user terminal) of a user who receives messages provided from an information provider terminal 20, where the configurations from 100 to 106 are similar to the second embodiment, while 107 is a public key cryptosystem means for carrying out the secret communication according to the public key cryptosystem (RSA, ElGamal, for example), 108 is a message reconstruction means for reconstructing the divided block messages into an original message, and 109 is a message storage means for storing the message received from the information provider. 20 indicates a terminal (information provider terminal) of an information provider for providing the messages, where the configurations from 200 to 208 are similar to the third embodiment, while 209 is a random number generation means for the information provider to generate random numbers, and 210 is a public key cryptosystem means for carrying out the secret communication according to the public key cryptosystem. 30 indicates a communication line similarly as in the second embodiment. 40 indicates a arbitrator terminal, where configurations from 401 to 404 are similar to the third embodiment, while 405 is a public key cryptosystem means for carrying out the encryption according to the public key cryptosystem.

Figure 11:
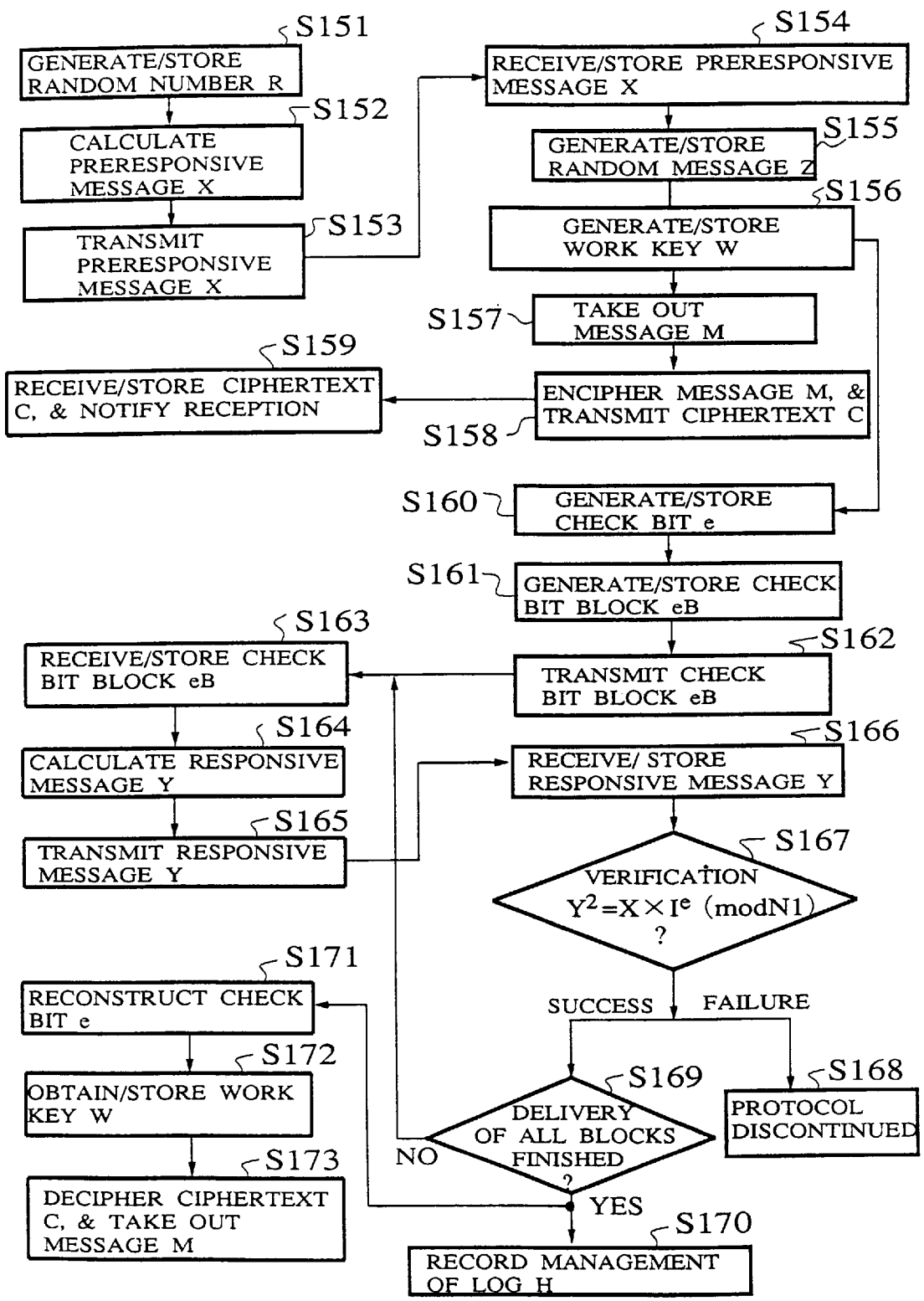
FIG. 11 is a flow chart showing an operation procedure concerning a delivery certification and a message take out for the message delivery system shown in FIG. 10.
Figure 12:
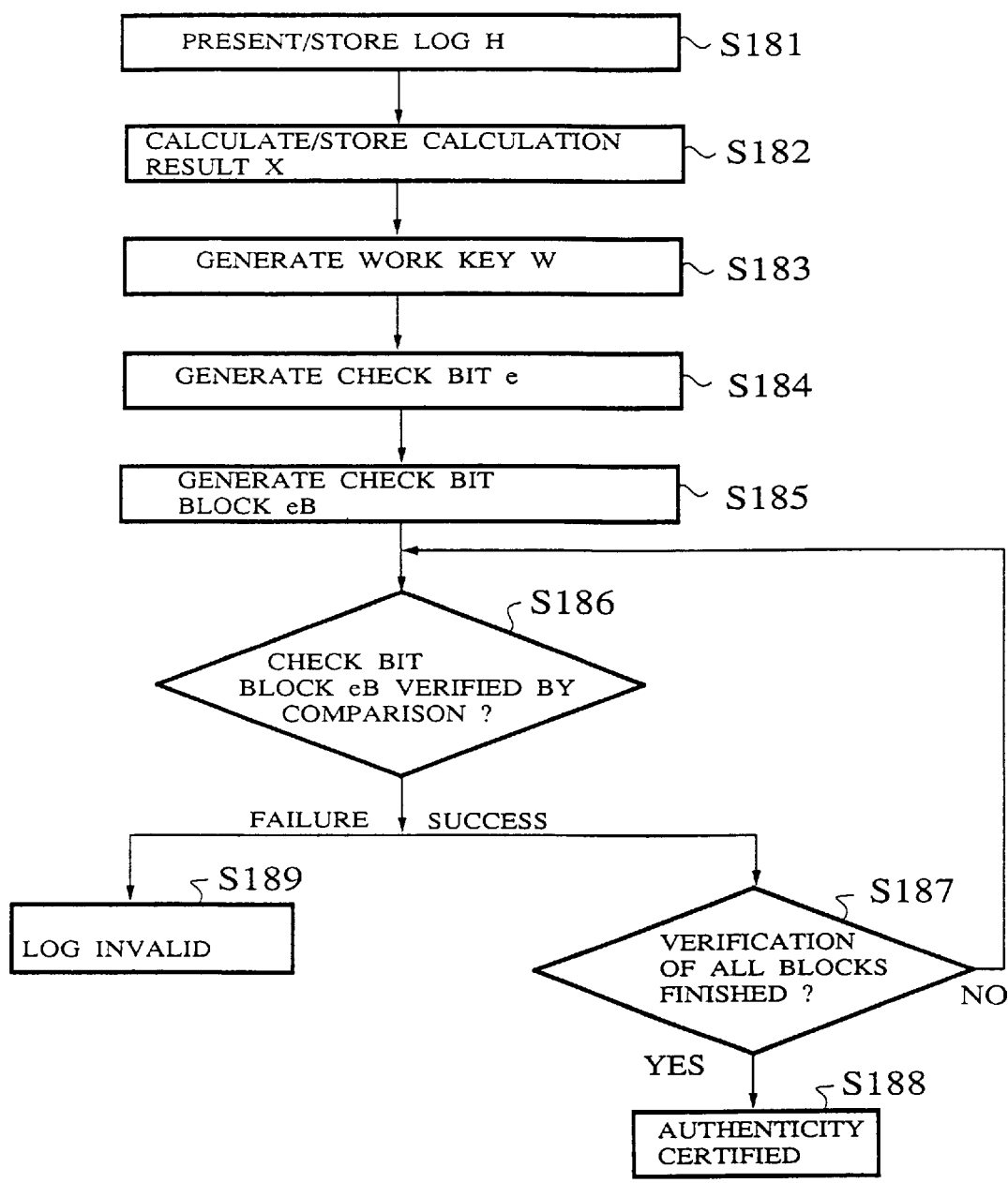
FIG. 12 is a flow chart showing an operation procedure concerning an arbitration for the message delivery system shown in FIG. 10.

In the following, the operation procedure for the delivery certification step and the message take out step will be explained according to the flow chart of FIG. 11, and the operation procedure for the arbitration will be explained according to the flow chart of FIG. 12.

First, as a preparation stage, a reliable center sets up p1, q1, I, s, p2, q2, PU, and SU for each user, discloses N1, N2, I, and PU among them as the public information (public key) of the user, and stores s and SU as the secret information (secret key) of the user in the user secret information storage means 101 and secretly distributes it to the user. Here, each set of (p1, q1) and (p2, q2) is a set of mutually different large prime numbers, and N1=p1×q1, N2=p2×q2. Also, I=S2 (mod N1), PU×SU=1 (mod (p2−1)(q2−1)) hold. Note that it may be p1=p2, q1=q2.

(1) Delivery certification step

The user terminal 10 generates g×m pieces of random numbers $R_k$ (J=1, 2, ..., g: k=1, 2, ..., m) by the random number generation means 103, and then stores them in the temporary memory 102 (S151). For each random number, a preresponsive message $X_{jk}=R_{jk}^2$ (mod N1) (j=1, 2, ..., g: k=1, 2, ..., m) is calculated by the computation means 104 (S152), and transmitted to the information provider through the communication line 30 (S153).

The information provider terminal 20 stores the received preresponsive message $X_j$ k (j=1, 2, ..., g: k=1, 2, ..., m) in the temporary memory 203 (S154), and generates the random message X randomly by the random number generation means 209 and stores it in the temporary memory 203 (S155).

Next, the work keys $W_j=h(Z\|X_{11}\|X_{21}\| \ldots \|X_{gm})$ (j=1, 2, ..., g) in g bits size are generated according to the one-way random hash function h of the computation means 204, from the preresponsive message $X_{jk}$ (j=1, 2, ..., g: k=1, 2, ..., m) and the random message Z, and stored in the temporary memory 203 (S156). Here, in general, a value of g is greater than or equal to a key length of the secret key used in the secret key cryptosystem means 105 and the secret key cryptosystem means 205. After that, the message M to be delivered is taken out from the message database 202 (S157), and after it is enciphered into the ciphertext $C=E_W$ (M) by the secret key cryptosystem means 205 with the work key $W_j$ (j=1, 2, ..., g) as the secret key, the ciphertext C is transmitted to the user terminal 10 through the communication line 30 (S158).

After the ciphertext C is received/stored in the message storage means 109, the user terminal 10 notifies the fact of receiving to the information provider terminal 20 through the communication line 30 (S159).

The information provider terminal 20 generates the check bits $e_i=h(W_1\|W_2\| \ldots \|W_g)^{PU}$ (mod N2) (i=1, 2, ..., L) by enciphering the work keys $W_j$ (j=1, 2, ..., g) stored in the temporary memory 203 by using the public information PU of the user by the public key cryptosystem means 210 (S160). Here, L is equal to a bit length of N2.

Next, the check bits $e_i$ (i=1, 2, ..., L) is divided into a plurality of blocks at the message division means 207, and stored as the check bit blocks (S161). Here, for the sake of simplifying the explanation, a number of divided blocks is set to be m, a bit length is set to be constant g for all the blocks, and the divided check bits are expressed as the check bit blocks $eB_{jk}$ (j=1, 2, ..., g: k=1, 2, ..., m). Namely, $eB_{jk}=e_{(j+g(k-1))}$, and it is going to be $eB_{11}=e_1$, $eB_{g1}=e_g$, $eB_{12}=e_{g1}$, and $eB_{Lm}=e_L$, for example.

The processing from here on is for the k-th block, and the following processing is repeatedly carried out sequentially (m times) for each block from the first block to the m-th block.

The information provider terminal 20 transmits the check bit blocks $eB_{jk}$ (j=1, 2, ..., g) stored in the message division means 207 to the user terminal 10 through the communication line 30 (S162).

The user terminal 10 stores the received check bit blocks $eB_{jk}$ (j=1, 2, ..., g) in the temporary memory 102 (S163), and after that, for each bit j of the received check bit blocks $eB_{jk}$, $Y_{jk}=R_{jk}$ if $eB_{jk}=0$, or $Y_{jk}=sR_{jk}$ (mod N1) if $eB_{jk}=1$, is calculated at the computation means 104 from the random number $R_{jk}$ stored in the temporary memory 102 and the user's secret information s stored in the user secret information storage means 101 (S164), and transmitted as a responsive message $Y_{jk}$ (j=1, 2, ..., g) to the information provider terminal 20 through the communication line 30 (S165).

The information provider terminal 20 stores the received responsive message $Y_{jk}$ (j=1, 2, ..., g) in the temporary memory 203 (S166), and after that, at the verification means 206, whether a verification formula $Y_{jk}^2=X_{jk}$ (mod N1) if $e_{jk}=0$, or a verification formula $Y_{jk}^2=X_{jk}\times I$ (mod N1) if $e_{jk}=1$, is satisfied or not is verified for each bit i, from the public information I of the user, and the preresponsive message $X_{jk}$, the responsive message $Y_{jk}$, and the check bits $e_{jk}$ stored in the temporary memory 203 (S167). In a case this verification has failed, it regards the user as illegal, and the execution of the protocol is immediately discontinued (S168), and in a case it has succeeded, the above processing is repeated until all the blocks are finished (S169). Then, in a case the verification has succeeded for all the blocks from the first block to the m-th block, the random message Z, the check bits $e_{jk}$, and the responsive message $Y_{jk}$ (i=1, 2, ..., g: j=1, 2, ..., m) are recorded and managed in the logfile 208 as the log H (S170).

(2) Message take out step

The user terminal 10 reconstructs the check bits e; (i=1, 2, ..., L) at the message reconstruction means 108, from the check bit blocks $eB_{jk}$ (j=1, 2, ..., g: k=1, 2, ..., m) stored in the temporary memory 102 (S171), and after the work key $W_j=(e_1\|e_2\| \ldots \|e_L)^{SU}$ (mod N2) (j=1, 2, ..., g) is obtained by deciphering them at the public key cryptosystem means 107 by using the secret information SU of the user stored in the user secret information storage means 101, they are stored in the message storage means 109 (S172).

Finally, by deciphering the ciphertext C stored in the message storage means 109 by the secret key cryptosystem means 105 with the work key $W_j$ (j=1, 2, ..., g) stored in the message storage means 109 as the secret key, the message $M=D_W(C)$ can be obtained from the message output/operation means 106 (S173).

(3) Arbitration

In a case the user claims later on that the message M has not been received, the information provider terminal 20 presents the log H recorded and managed in the logfile 208, and stores it in the temporary memory 402 of the arbitrator terminal 40 (S181).

For each block (k-th block), the arbitrator terminal 40 calculates $X_{jk}=Y_{jk}^2$ (mod N1) if $e_{jk}=0$, or $X_{jk}=Y_{jk}^2/I$ (mod N1) if $e_{jk}^2=1$, at the computation means 401 for each bit i, from the check bits $e_{jk}$ and the responsive message $Y_{jk}$ in the log H stored in the temporary memory 402, and stores the calculation result $X_{jk}$ (j=1, 2, ..., g) in the temporary memory 402 (S182).

Next, the work keys $W_j=h(Z\|X_{11}\|X_{21}\| \ldots \|X_{gm})$ (j=1, 2, ..., g) of g bits size are generated according to the one-way random hash function h of the computation means 401, by using the calculation result $X_{jk}$ (j=1, 2, ..., g) and the random message Z stored in the temporary memory 402 (S183), and the check bits $e_i=h(W_1\|W_2\| \ldots \|W_g)^{PU}$ (mod N2) (i=1, 2, ..., L) are generated by enciphering them at the public key cryptosystem means 405 by using the public information PU of the user (S184).

After that, at the message division means 404, the check bits $e_i$ (i=1, 2, ..., L) is divided into a plurality of blocks, and the check bit blocks $eB_{jk}$ (j=1, 2, ..., g: k=1, 2, ..., m) are generated (S185), and finally, for each block (k-th block), at the verification means 403, whether they coincide with the check bits $e_{jk}$ (j=1, 2, ..., g) in the log H stored in the temporary memory 402 or not is checked (S186). When they coincide for all the blocks (m blocks from the first block to the m-th block) (S187), it implies that the authenticity of the log H is proven and the fact that the user has received the message M is guaranteed (S188), and otherwise the log H is considered as invalid (S189).

By using the above described message delivery method, the message M itself is transmitted to the user by being enciphered into the ciphertext C first, so that at a point at which the user received the ciphertext C, the message M is not going to be obtained. Then, at a point at which the zero knowledge interactive proof protocol is finished normally, it implies that the user authentication according to the zero knowledge interactive proof protocol has been made normally, and besides it becomes a proof for the fact that the user has correctly received the check bits $e_{jk}$ (j=1, 2, ..., g: k=1, 2, ..., m).

Also, the work key $W_j$ (j=1, 2, ..., g) is generated as the user deciphers the check bits $e_{jk}$ (j=1, 2, ..., g: k=1, 2, ..., m), and the message M can be obtained by deciphering the ciphertext C by using the generated work key $W_j$ (j=1, 2, ..., g). Consequently, the fact that the user has received the check bits $e_{jk}$ (j=1, 2, ..., g: k=1, 2, ..., m) correctly and the fact that the user has received the message M normally become equivalent. Therefore, the information provider can certify the fact that the message has been delivered to the user accurately and surely.

Here, the enciphering/deciphering is carried out by utilizing the public key cryptosystem in the above explanation, but it is obviously fine to utilize the secret key cryptosystem instead. Also, it has been explained according to the Fiat Shamir scheme, but the present method is applicable to all the zero knowledge interactive proof protocols which base their safety on a difficulty of the factoring or a difficulty of the discrete logarithmic problem, etc., including the Extended Fiat Shamir scheme (Ohta, Okamoto, "An Extension of the Fiat-Shamir Scheme Based on Higher Degree Roots", the Electronic Information Communication Society, Technical Research Report ISEC88-13).

Next, in relation to the log H comprising the check bits $e_{jk}$, the responsive message $Y_{jk}$ (i=1, 2, ..., g: j=1, 2, ..., m), and the random message Z, they are mutually related by the verification formula in the zero knowledge interactive proof protocol and the one-way random hash function, so that it is impossible to forge the log H by illegally altering a part, etc. Therefore, by making a record management of the log H, it can be presented to a neutral third party such as the arbitrator later on as an evidence for the fact that the user has surely received the work key $W_j$ (j=1, 2, ..., g).

In addition, the communication between the information provider terminal and the user terminal is repeatedly carried out as many times as a number m of divided blocks of the work key $W_j$ (j=1, 2, ..., g), so that in a case the verification of the information provider failed in a middle, the communication subsequent to that is discontinued, and the remaining check bits are not transmitted. Namely, the check bits that can be learned by the user are limited only to those prior to the failure of the verification, so that the user who caused the failure of the verification of the information provider can only obtain a part of the information necessary for deciphering the ciphertext C, and as a result, it becomes impossible to generate the correct work key $W_j$ (j=1, 2, ..., g). Consequently, not to mention a case in which the illegal user who does not know the secret information s of the user transmits the illegal responsive message $Y_{jk}$ (i=1, 2, ..., g: k=1, 2, ..., m), it is possible to eliminate a case in which such an illegal act as not transmitting the responsive message itself is made, such that the user illegally receives the check bits $e_{jk}$ (J=1, 2, ..., g: k=1, 2, ..., m) necessary in obtaining the message M and illegally deciphers/obtains the message M despite of the fact that the information provider cannot make a record management of the log H for proving the fact that the information provider has delivered the message M to the user. Also, in the above explanation, the bit length of the divided blocks has been set to be constant g for each block, but it may also be quite fine to change the bit length size block by block, as in a case of 1 bit for the first block, 2 bits for the second blocks, 4 bits for the third blocks, etc. for example.

The above explanation is that by which it is possible to prove the fact that the information provider has delivered the message M of a large capacity to the user accurately and surely, and various manners of utilization are possible. For example, in a case the message M is a charged message in the "on demand service" for the writings, etc., as the information provider delivers the message M to the user according to the above described message delivery method, the log H recorded and managed by the information provider can be utilized as a proof information at a time of collecting the message fee such as a fee for using the copyright, and so on.

As explained in the above, in the message delivery method utilizing the zero knowledge interactive proof protocol of the second to fourth embodiments of the present invention, firstly, the operation of the protocol itself is equivalent to the zero knowledge interactive proof protocol as the user authentication, so that similarly as the zero knowledge interactive proof protocol, it is almost impossible for the illegal user to clear the verification of the information provider. Secondly, in a case the delivery certification step is normally finished, it is equivalent to the fact that the zero knowledge interactive proof protocol is finished normally, so that the information provider can judge that the user has correctly received the message.

Also, by enciphering the message and transmitting it as the ciphertext, it is also possible to prevent the wiretapping of the message by the third party, and also to make it impossible for the third party to obtain even an information effective in decoding the message.

Also, according to the second embodiment of the present invention, it is possible to execute the processing for deciphering the ciphertext in separation from the delivery certification step.

Also, according to the second and third embodiments of the present invention, it is possible to make a size of the check bits smaller by generating the check bits from the message (or the ciphertext that can be deciphered by the user) by using the hash function, etc. for example, so that an amount of communication and a processing time in the delivery certification step can be reduced.

Also, according to the third embodiment of the present invention, by generating the check bits by using the oneway random function, it is made impossible to forge the log comprising the message (or the ciphertext that can be deciphered by the user), the responsive message, and the check bits.

Also, in a case the protocol of the information provider failed in a middle of the delivery certification step due to the utilization by the illegal user, etc. for example, the execution of the protocol is immediately discontinued, and the blocks subsequent to the failure of the verification are not going to be transmitted to the user, so that as a result, it is possible to eliminate a case of illegally obtaining the entire message (or the ciphertext that can be deciphered by the user).

Also, according to the fourth embodiment of the present invention, in a case of transmitting a message of a large capacity, firstly, the message is enciphered first by the work key generated by the information provider and then delivered to the user, so that it is impossible for the user to take out the message itself before the user authentication is made. Secondly, by carrying out the delivery certification with only the work key as the check bits, it is possible to reduce the processing time for the delivery certification and an amount of communication considerably. Thirdly, when the delivery certification step is normally finished, it can be certified that the user has correctly received the check bits, and it is guaranteed that the work key is obtained at the message take out step, so that the message can be taken out definitely for the first time at this point. Consequently, due to these effects, in a case the message delivery method is finished, after the message is provided in an enciphered state to the legitimate user, the information provider can certifies the fact that, after the message is provided in the enciphered state to the legitimate user, the information necessary for the user to decipher the enciphered message has delivered to the user, and the user has received it surely, so that the information provider can judge that the message has delivered to the user surely.

Also, by generating the work key by using the one-way random function, it is possible to make it such that the work key convenient for the information provider cannot be generated illegally. Also, by using the one-way random function similarly, it becomes impossible to forge the log comprising the random message, the check bits, and the responsive message, so that the information provider can acquire a valid evidence which can prove later on the fact that, after the requested message is provided in an enciphered state to the legitimate user, the information necessary for the user to decipher the enciphered message has delivered to the user, and the user has received it surely.

Also, by carrying out the secret communication for the check bits, the equivalent effects as in a case of carrying out the secret communication for the work key as well can be obtained, so that the wiretapping of the work key by the third party is prevented, and the it also becomes impossible for the third party to obtain an information effective in decoding the work key.

Also, it is possible to execute the processing for deciphering the check bits in separation from the delivery certification step.

Also, in a case the verification of the information provider failed in a middle of the delivery certification step due to the utilization by the illegal user, etc. for example, the execution of the protocol is immediately discontinued, and the blocks subsequent to the failure of the verification are not going to be transmitted to the user. Consequently, the user who caused the failure of the verification of the information provider can obtain only a part of the information necessary for deciphering the enciphered message, and as a result, it becomes impossible to generate the message itself or the work key, so that it is possible to eliminate a case in which the illegal user illegally obtains the requested message.

Also, according to the third and fourth embodiments of the present invention, it is possible to make a record management of the log which cannot be forged as an evidence for the fact that the message has actually been delivered, and it becomes possible to present it according to the need. In addition, an amount of information that must be recorded and managed as the evidence for the fact that the information provider has delivered the message can be reduced considerably compared with a scheme of Sakurai (Japanese Patent Application Laid Open No. 5-12321).

Also, in a case there arises a need to carry out the arbitration regarding a presence or an absence of the information providing between the information provider and the user, as the information provider presents the log to the neutral arbitration organization such as a court, and the arbitration organization checks the authenticity of that log as a valid evidence, which one of a claim of the information provider and a claim of the user is a proper one can be judged. Namely, the arbitrator can certify later on the fact that the information provider has transmitted the message (or the ciphertext that can be deciphered by the user) to the user, and the user has surely received it, so that it is possible to prevent such an improper claim in which the user says the message has not been received, despite of the fact that the user has received the message (or the ciphertext that can be deciphered by the user).

Also, according to these embodiments, it becomes a system in which the information provider can certify that the information provider has delivered the requested message to the user surely, and the user has received it surely. Also, it is possible to use the zero knowledge interactive proof protocol independently as a user authentication method by which the information provider authenticates the user according to the need.

Also, it becomes a system which is made such that the secret communication can be made between the information provider and the user.

Also, according to the fourth embodiment of the present invention, it becomes a system which is made such that the message provided from the information provider is stored and the user can utilize the message according to the need.

Also, it becomes a system which has a function for generating the work key such that the message delivery using the work key can be carried out.

Also, according to the third and fourth embodiments of the present invention, it becomes a system which is made such that the log as a valid evidence can be presented according to the need.

Also, it becomes a system in which the execution of the protocol is immediately discontinued when it is detected as the illegal user, such that it is possible to eliminate a case in which the illegal user illegally obtains the requested message.

Also, it becomes a system which is made such that, by a neutral arbitration organization such as a court, it is possible to check the authenticity of the log as a valid evidence, and judge which one of a claim of the information provider and a claim of the user is a proper one.

Next, the fifth embodiment of the present invention will be explained.

Figure 13:
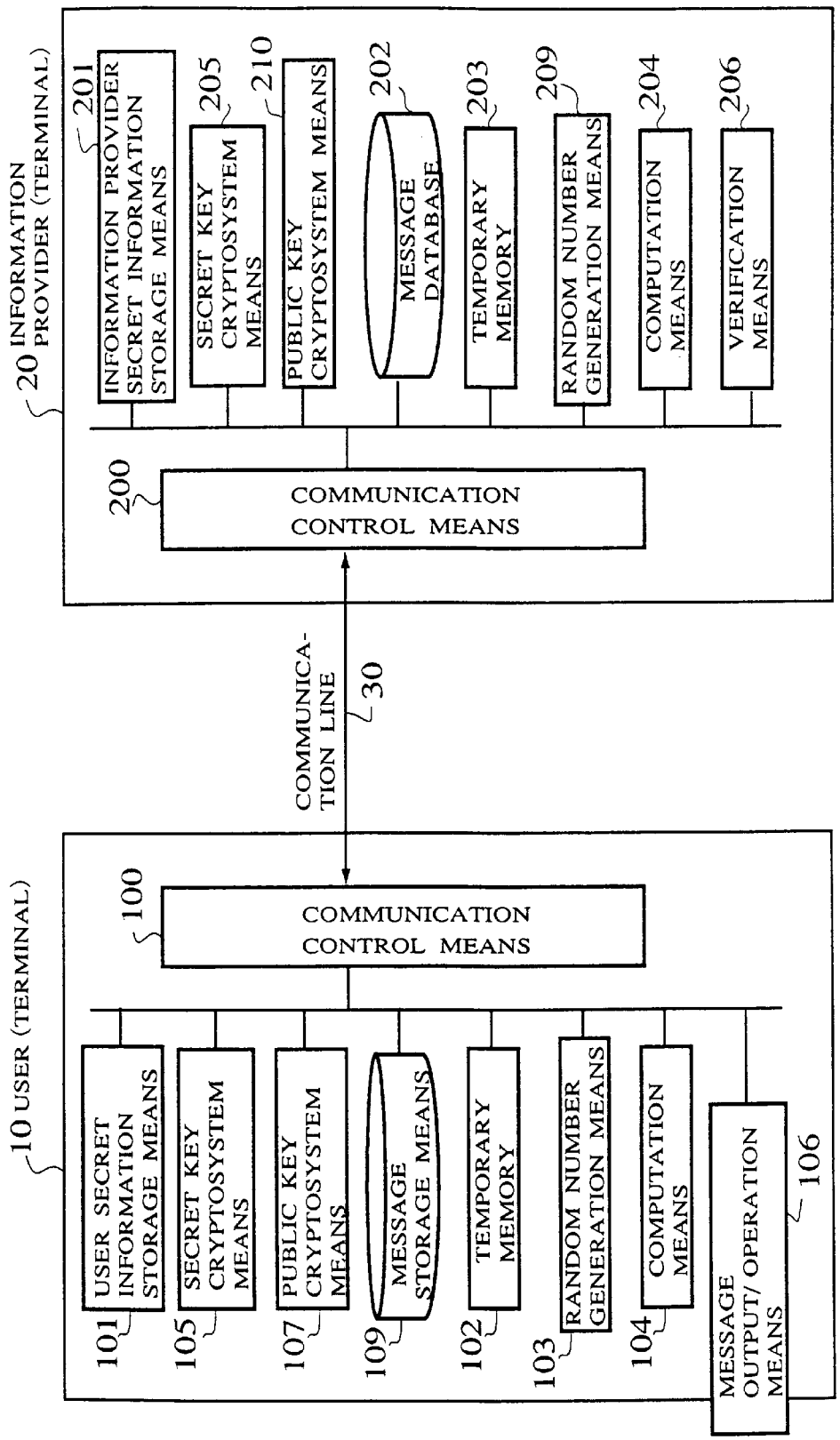
FIG. 13 is a block diagram showing an exemplary configuration of a message delivery system in the fifth embodiment of the present invention.

FIG. 13 is a block diagram showing a configuration of a message delivery system in the fifth embodiment of the present invention, in which 10 indicates a user (terminal) who requires a delivery of messages with respect to an information provider, where 100 is a communication control means for controlling a communication line 30, 101 is a user secret information storage means for storing a secret information of the user produced by a center, 105 is a secret key cryptosystem means for carrying out a secret communication according to the secret key cryptosystem (DES, FEAL, for example), 197 is a public key cryptosystem means for carrying out a secret communication according to the public key cryptosystem (RSA, for example), 109 is a message storage means for storing the message delivered from the information provider, 102 is a temporary memory for the user to temporarily store a necessary information, 103 is a random number generation means for the user to generate random numbers, 104 is a computation means for carrying out necessary computations, and 106 is a message output/operation means for the user to output or operate the requested message.

Also, 20 indicates the information provider (terminal) for providing messages, where 200 is a communication control means for controlling the communication line 30, 201 is an information provider secret information storage means for storing a secret information of the information provider produced by the center, 205 is a secret key cryptosystem means for carrying out the secret communication according to the secret key cryptosystem, 210 is a public key cryptosystem means for carrying out the secret communication according to the public key cryptosystem, 202 is a message database in which the messages to be provided are stored, 203 is a temporary memory for the information provider to temporarily store a necessary information, 209 is a random number generation means for the information provider to generate random numbers, 204 is a computation means for carrying out necessary computations, and 206 is a verification means for verifying an authenticity of a communication sequence according to the Fiat Shamir scheme. 30 indicates the communication line for connecting the user and the information provider by means of a communication.

Figure 14:
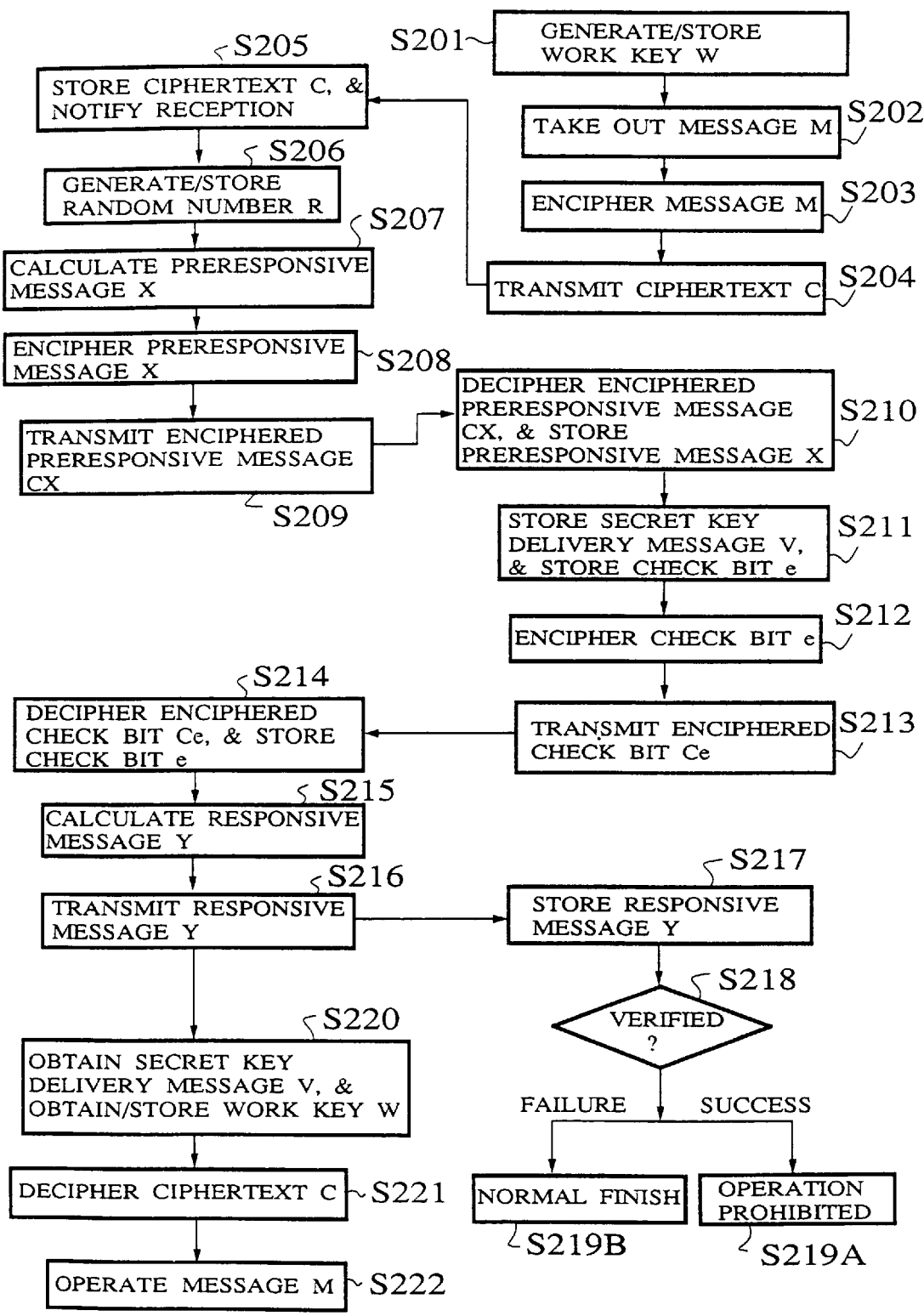
FIG. 14 is a flow chart showing an operation procedure for the message delivery system shown in FIG. 13.

In the following, an operation procedure for the message delivery step, the delivery certification step, and the message take out step will be explained according to the flow chart of FIG. 14.

First, as a preparation stage, a reliable center sets up p1, q1, I, s, p2, q2, PU, and SU for each user, discloses N1, N2, I, and PU among them as the public information (public key) of the user, and stores s and SU as the secret information (secret key) of the user in the user secret information storage means 101 and secretly distributes it to the user. Here, each set of (p1, q1) and (p2, q2) is a set of mutually different large prime numbers, and N1=p1×q1, N2=p2×q2. Also, I=$s^2$ (mod N1), PU×SU=1 (mod (p2−1)(q2−1)) hold. Note that it may be p1=p2, q1=q2.

In addition, p, q, PC, and SC are set up for each information provider, N and PC among them are disclosed as the public information (public key) of the information provider, and SC is stored as the secret information (secret key) of the information provider in the information provider secret information storage means 201, and it is secretly distributed to the information provider. Here, p and q are mutually different large prime numbers, and N=pq. Also, PC×SC=1 (mod(p−1)(q−1)) holds.

(1) Message deliver step

The information provider generates the work key Wi (i=1, 2, . . . , g) of g bits size by the random number generation means 209, and stores it in the temporary memory 203 (S201). Here, in general, a value of g is greater than or equal to a key length of the secret key used in the secret key cryptosystem means 105 and 205. Note that, although the work key $W_i$ (i=1, 2, . . . , g) is generated here by the random number generation means 209, it may be fine in practice to generate it by using a function or to use a specific secret key uniformly.

Next, the message M to be delivered to the user is taken out from the message database 202 (S202), and after it is enciphered into the ciphertext C=$E_W$(M) by the secret key cryptosystem means 205 with the work key $W_i$ (i=1, 2, . . . , g) as the secret key (S203), the ciphertext C is transmitted to the user through the communication line 30 (and the communication control means 100 and 200) (S204).

After the ciphertext C is received/stored at the message storage means 109, the user notifies the fact of receiving to the information provider through the communication line 30 (S205).

(2) Delivery Certification step

The user generates g pieces of random numbers $R_i$ (i=1, 2, . . . , g) by the random number generation means 103, and after storing them in the temporary memory 102 (S206), calculates a preresponsive message $X_i=R_i^2$ (mod N1) (i=1, 2, . . . , g) for each random number by the computation means 104 (S207), enciphers it into the enciphered preresponsive message $CX_i=X_i^{Pc}$ (mod N) (i=1, 2, . . . , g) by the public key cryptosystem means 107 by using the public key PC of the information provider (S208), and transmits it to the information provider through the communication line 30 (S209).

The information provider deciphers the received enciphered preresponsive message $CX_i$ into the preresponsive message $X_i=CX_i^{SC}$ (mod N) (i=1, 2, . . . , g) by the public key cryptosystem means 210 by using the secret key SC stored in the information provider secret information storage means 201, and then stores it in the temporary memory 203 (S210).

Next, after the work keys $W_i$ (i=1, 2, ..., g) stored in the temporary memory 203 are stored in the temporary memory 203 as the secret key delivery message $V_i$ and the check bits $e_i$ (i=1, 2, ..., g) (S211), they are enciphered into the enciphered check bits $Ce_i=(e_1\|e_2\|\ldots\|e_g)^{PU}$ (mod N2) (i=1, 2, ..., |N2|) by the public key cryptosystem means 210 by using the public key PU of the user (S212), and they are transmitted through the communication line 30 (S213). Here, |N2| indicates a number of bits of N2.

The user deciphers the received enciphered check bits $Ce_i$ (i=1, 2, ..., g) into the check bits $e_i=(Ce_1\|Ce_2\|\ldots\|Ce_{|N2|})^{SU}$ (mod N2) (i=1, 2, ..., g) by the public key cryptosystem means 107 by using the secret key SU stored in the user secret information storage means 101, and then stores them in the temporary memory 102 (S214).

Next, at the computation means 104, for each bit i of the check bits $e_i$, $Y_i=R_i$ if $e_i=0$, or $Y_i=sR_i$ (mod N1) if $e_i=1$, is calculated from the random number Ri stored in the temporary memory 102 and the user's secret information s stored in the user secret information storage means 101 (S215), and transmitted as a responsive message $Y_i$ (i=1, 2, ..., g) to the information provider through the communication line 30 (S216).

The information provider stores the received responsive message $Y_i$ (i=1, 2, ..., g) in the temporary memory 203 (S217), and then, at the verification means 206, whether a verification formula $Y_i^2=X_i\times I$ (mod N1) if $e_i=0$, or a verification formula $Y_i^2=X_i\times I$ (mod N1) if $e_i=1$, is satisfied or not is verified for each bit i, from the public information I of the user, and the preresponsive message $X_i$, the responsive message $Y_i$, and the check bits $e_i$ stored in the temporary memory 203 (S218). In a case this verification has failed, it regards the user as illegal, and the operation subsequent to that is prohibited (S219A), and otherwise it is finished normally (S219B).

(3) Message take out step

The user takes out the secret key delivery message $V_i$ and the work key $W_i$ (i=1, 2, ..., g) from the check bits $e_i$ (i=1, 2, ..., g) stored in the temporary memory 102 at the computation means 104, and stores them in the message storage means 109 (S220).

Finally, the ciphertext C stored in the message storage means 109 is deciphered by the secret key cryptosystem means 105 with the work key $W_i$ (i=1, 2, ..., g) stored in the message storage means 109 as the secret key (S221), and the requested message $M=D_W(C)$ can be obtained from the message output/operation means 106 (S222).

By using the above described message delivery method, the message M is transmitted to the user by being enciphered into the ciphertext C first, so that at a point at which the user received the ciphertext C, the message M is not going to be obtained. Then, at a point at which the zero knowledge interactive proof protocol is finished normally, it implies that the user authentication according to the zero knowledge interactive proof protocol has been made normally, and besides it can be seen that the user has received the check bits $e_i$ (i=1, 2, ..., g) normally, and the appropriate processing has been made.

Also, the user can generate the work key $W_i$ (i=1, 2, ..., g) and obtain the message M by deciphering the ciphertext C of the message requested by the user if the user has correctly received the check bits $e_i$ (i=1, 2, ..., g) so that the fact that the user has received the check bits $e_i$ (i=1, 2, ..., g) normally and the fact that the user has received the requested message normally become equivalent. Therefore, the information provider can certify the fact that the requested message has been delivered to the user accurately and surely.

Here, as for portions in which the enciphering/deciphering is carried out by utilizing the public key cryptosystem in the above explanation, it is obviously fine to utilize the secret key cryptosystem. Also, it has been explained according to the Fiat Shamir scheme, but the present method is applicable to all the zero knowledge interactive proof protocols which base their safety on a difficulty of the factoring or a difficulty of the discrete logarithmic problem, etc., including the Extended Fiat Shamir scheme (Ohta, Okamoto, "An Extension of the Fiat-Shamir Scheme Based on Higher Degree Roots", the Electronic Information Communication Society, Technical Research Report ISEC88-13).

Next, the sixth embodiment of the present invention will be explained.

Figure 15:
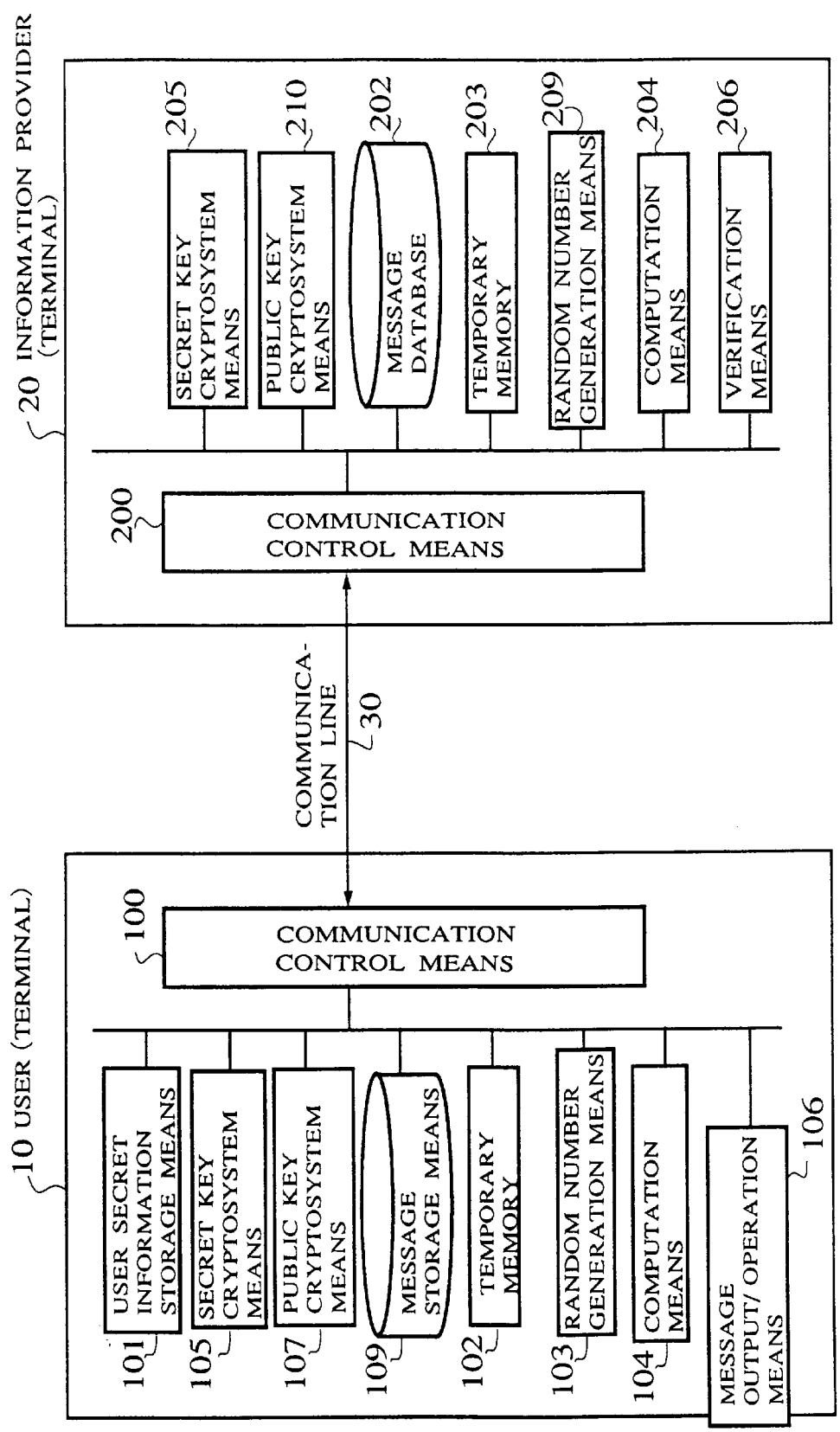
FIG. 15 is a block diagram showing an exemplary configuration of a message delivery system in the sixth embodiment of the present invention.

FIG. 15 is a block diagram showing a configuration of the message delivery system in the sixth embodiment of the present invention, where the system configuration is similar to the configuration of the fifth embodiment, except that the information provider secret information storage means 201 in the information provider (terminal) 20 is unnecessary.

Figure 16:
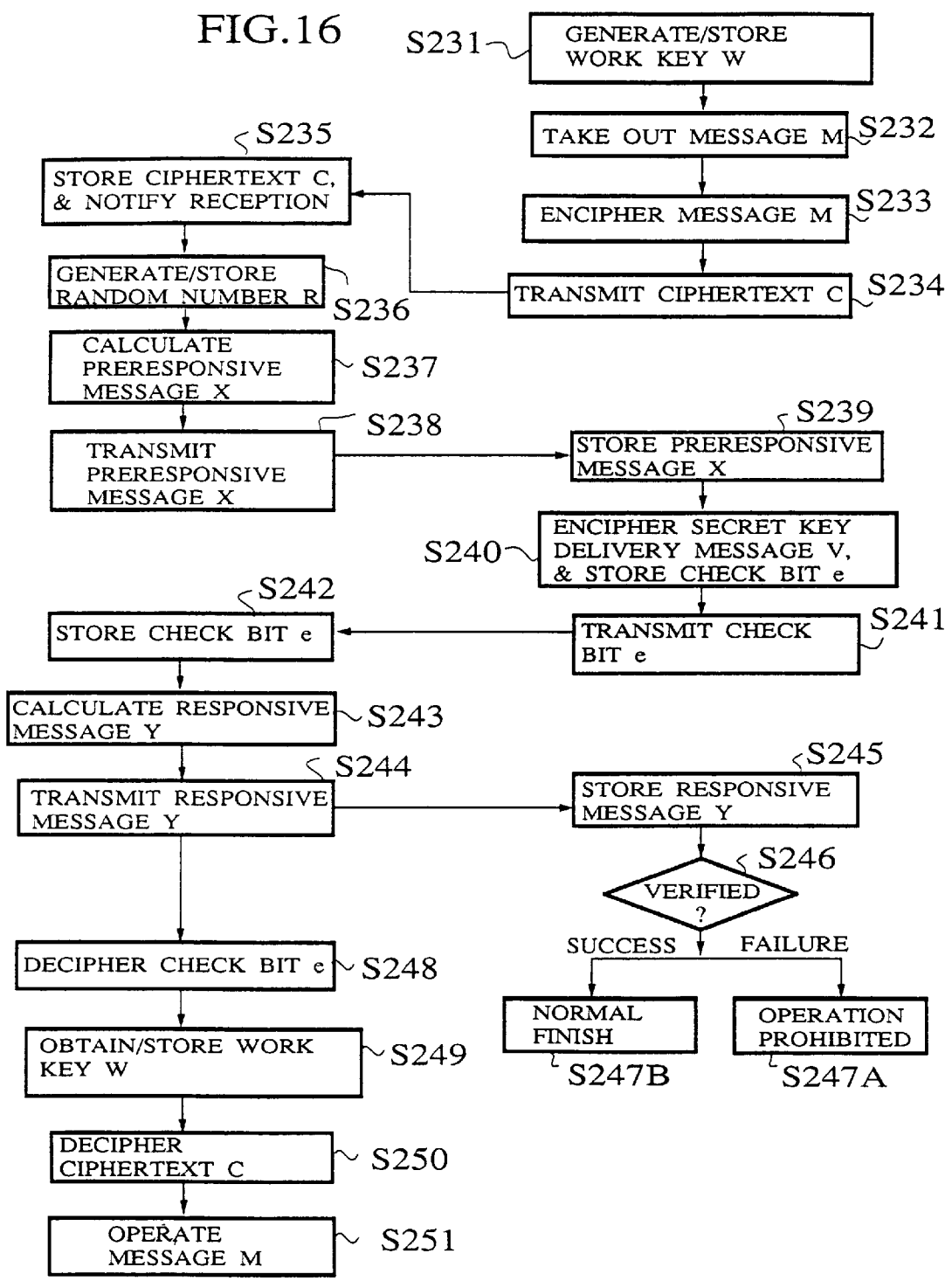
FIG. 16 is a flow chart showing an operation procedure for the message delivery system shown in FIG. 15.

In the following, the operation procedure for the message delivery step, the delivery certification step, and the message take out step will be explained according to the flow chart of FIG. 16.

First, as a preparation stage, a reliable center sets up p1, q1, I, s, p2, q2, PU, and SU for each user, discloses N1, N2, I, and PU among them as the public information (public key) of the user, and stores s and SU as the secret information (secret key) of the user in the user secret information storage means 101 and secretly distributes it to the user. Here, each set of (p1, q1) and (p2. q2) is a set of mutually different large prime numbers, and N1=p1×q1, N2=p2×q2. Also, I=S2 (mod N1), PU×SU=1 (mod (p2−1)(q2−1)) hold. Note that it may be p1=p2, q1=q2.

(1) Message delivery step

It is similar as the fifth embodiment (S231 to 235).

(2) Delivery certification step

The user generates |N2| pieces of random numbers $R_i$ (i=1, 2, ..., |N2|) by the random number generation means 103, and after storing them in the temporary memory 102 (S236), calculates a preresponsive message $X_i=R_i^2$ (mod N1) (i=1, 2, ..., |N2|) for each random number by the computation means 104 (S237), and transmits it to the information provider through the communication line 30 (S238). Here, |N2| indicates a number of bits of N2.

The information provider stores the received preresponsive message $X_i$ (i=1, 2, ..., |N2|) in the temporary memory 203 (S239). Next, after the check bits $e_i=(V_1\|V_2\|\ldots\|V_g)^{PU}$ (mod N2) (i=1, 2, ..., |N2|) are generated by enciphering the work keys $W_i$ stored in the temporary memory 203 as the secret key delivery message $V_i$ (i=1, 2, ..., g) by the pubic key cryptosystem means 210 by using the public key PU of the user, they are stored in the temporary memory 203 (S240). After that, the check bits $e_i$ (i=1, 2, ..., |N2|) are transmitted through the communication line 30 (S241).

The user stores the received check bits ei (i=1, 2, ..., |N2|) in the temporary memory 102 (S242), and then, at the computation means 104, for each bit i of the check bits $e_i$, $Y_i=R_i$ if $e_i=0$, or $Y_i=sR_i$ (mod Nl) if $e_i=1$, is calculated from the random number $R_i$ stored in the temporary memory 102 and the user secret information s stored in the user secret information storage means 101 (S243), and transmitted it as a responsive message $Y_i$ (i=1, 2, ..., g) to the information provider through the communication line 30 (S244).

The information provider stores the received responsive message $Y_i$ (i=1, 2, ..., |N2|) in the temporary memory 203 (S245), and then, at the verification means 206, whether a verification formula $Y_i^2=X_i$ (mod N1) if $e_i=0$, or a verification formula $Y_i^2=X_i \times I$ (mod N1) if $e_i=1$, is satisfied or not is verified for each bit i, from the public information I of the user, and the preresponsive message $X_i$, the responsive message $Y_i$, and the check bits $e_i$ stored in the temporary memory 203 (S248). In a case this verification has failed, it regards the user as illegal, and the operation subsequent to that is prohibited (S247A), and otherwise it is finished normally (S247B).

(3) Message take out step

The user deciphers the check bits $e_i$ (i=1, 2, ..., |N2|) stored in the temporary memory 102 into the secret key delivery message $V_i=(e_1 \| e_2 \| \ldots \| e_{|N2|})^{SU}$ (mod N2) (i=1, 2, ..., g) by the public key cryptosystem means 107 by using the secret key SU stored in the user secret information storage means 101 (S248), and then takes out the work keys $W_i$ (i=1, 2, ..., g) at the computation means 104, and stores them in the message storage means 109 (S249).

Finally, the ciphertext C stored in the message storage means 109 is deciphered by the secret key cryptosystem means 105 with the work keys $W_i$ (i=1, 2, ..., g) stored in the message storage means 109 as the secret key (S250), and the requested message $M=D_W(C)$ can be obtained from the message output/operation means 106 (S251).

By using the above described message delivery method, the completely equivalent effects as the fifth embodiment can be obtained. Also, in comparison with the fifth embodiment, a size of an amount of information that must be stored in the temporary memory, etc. becomes larger, but a number of times by which the public key cryptosystem having a slow processing speed is to be utilized can be only one, so that a shortening of the processing time can be expected.

Here, as for portions in which the enciphering/deciphering is carried out by utilizing the public key cryptosystem in the above explanation, it is obviously fine to utilize the secret key cryptosystem. Also, it has been explained according to the Fiat Shamir scheme, but the present method is applicable to all the zero knowledge interactive proof protocols which base their safety on a difficulty of the factoring or a difficulty of the discrete logarithmic problem, etc., including the Extended Fiat Shamir scheme (Ohta, Okamoto, "An Extension of the Fiat-Shamir Scheme Based on Higher Degree Roots", the Electronic Information Communication Society, Technical Research Report ISEC88-13).

Next, the seventh embodiment of the present invention will be explained.

Figure 17:
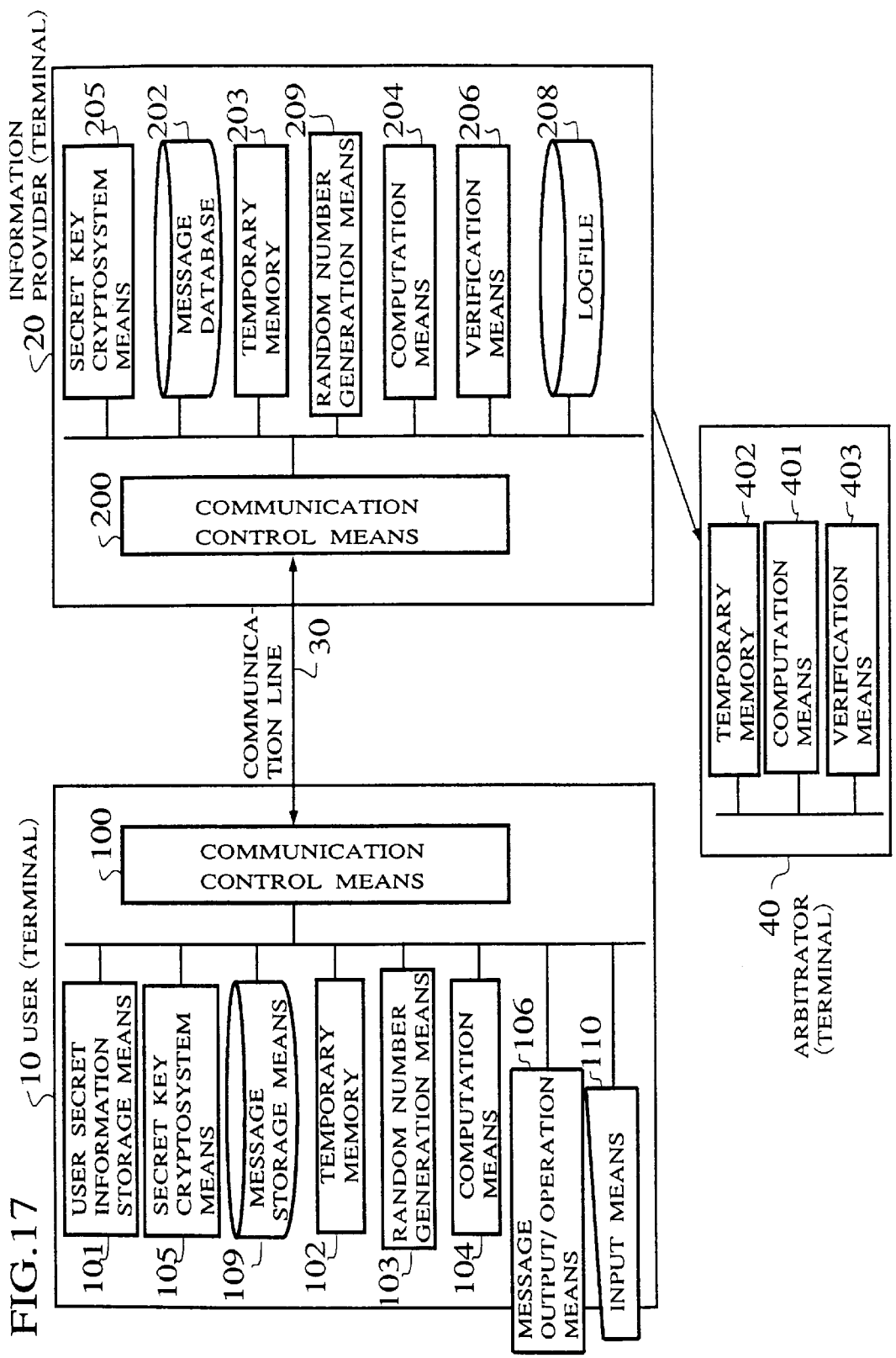
FIG. 17 is a block diagram showing an exemplary configuration of a message delivery system in the seventh embodiment of the present invention.

FIG. 17 is a block diagram showing a configuration of a message delivery system in the seventh embodiment of the present invention, in which 10 indicates a user (terminal) whose constituent means from 100 to 109 are similar to the sixth embodiment, while 110 is an input means for producing a message delivery request message. 20 indicates the information provider (terminal) whose constituent elements from 200 to 206 and 209 are similar to the sixth embodiment, while 208 is a logfile for making a record management of a log H as an evidence for proving later on the fact that the message has been delivered to the user. 30 indicates the communication line for connecting the user and the information provider by means of a communication. 40 indicates an arbitrator (terminal) for Judging later on an authenticity of the log H from a neutral standpoint, for the log H which is recorded and managed by the information provider in the logfile 208, where 402 is a temporary memory for the arbitrator to temporarily store a necessary information, 401 is a computation means for carrying out necessary computations, and 403 is a verification means for verifying an authenticity for the log H about which the judgement of the authenticity is requested.

Figure 18:
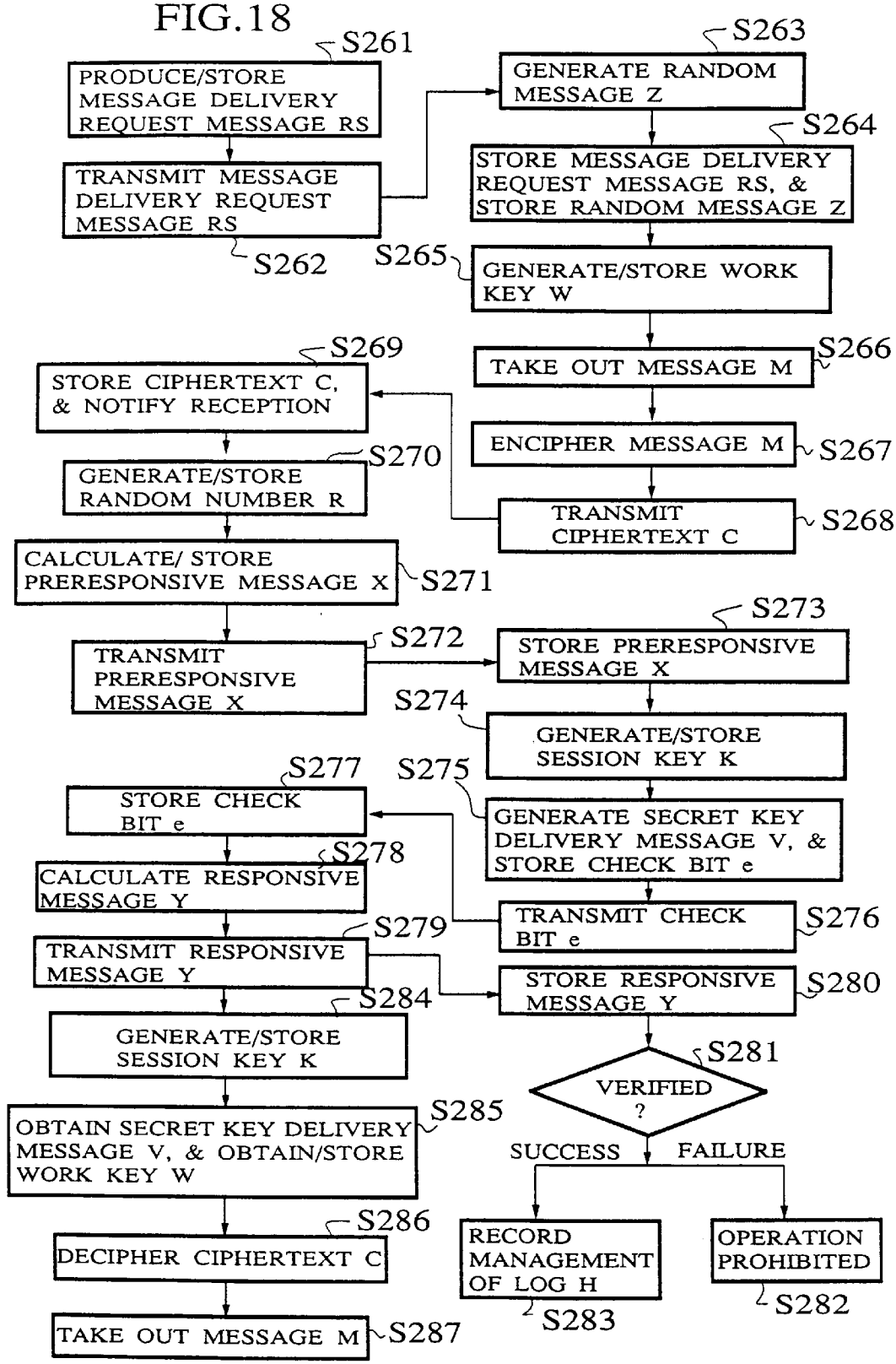
FIG. 18 is a flow chart showing an operation procedure concerning a message delivery, a delivery certification and a message take out for the message delivery system shown in FIG. 17.
Figure 19:
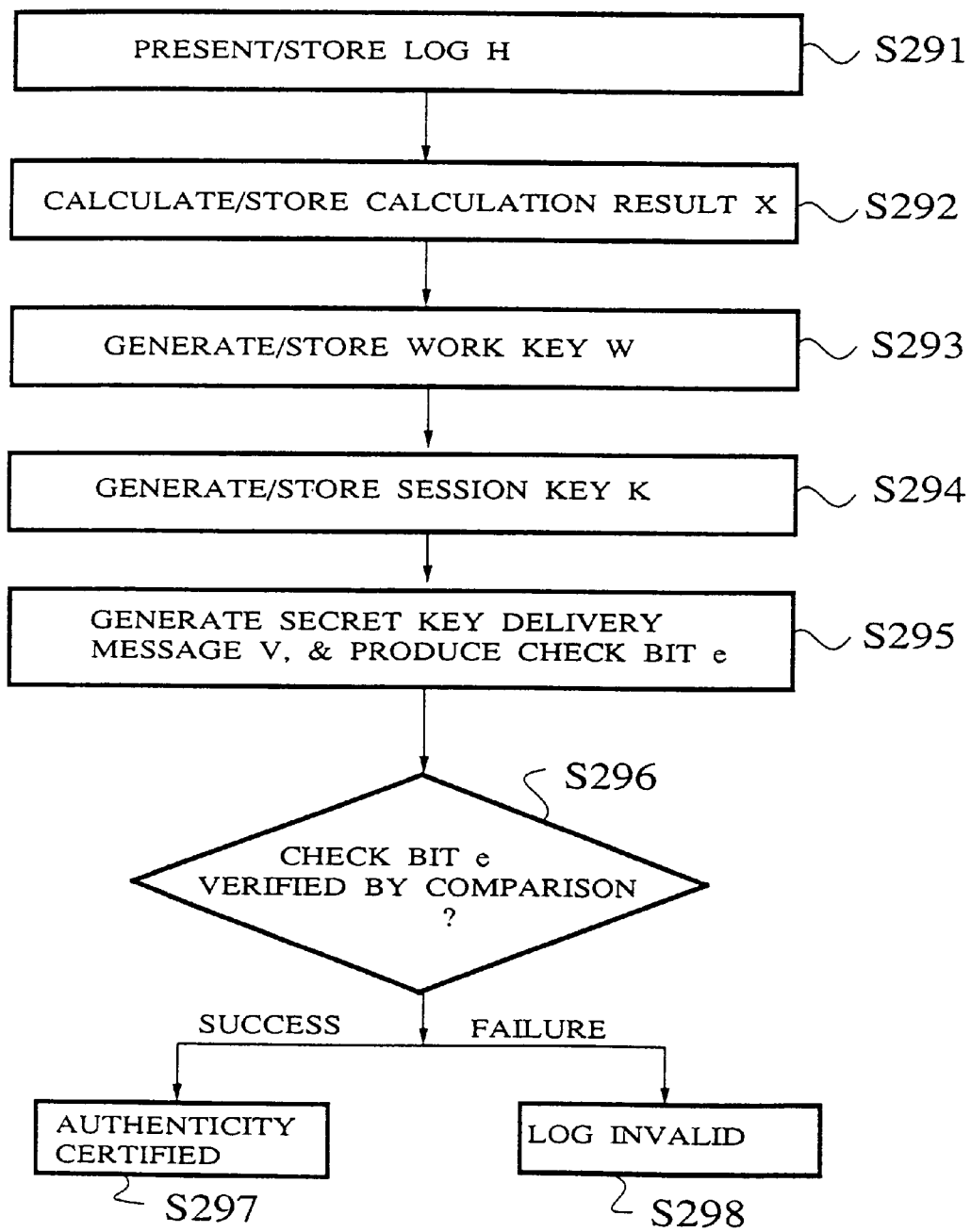
FIG. 19 is a flow chart showing an operation procedure concerning an arbitration for the message delivery system shown in FIG. 17.

In the following, an operation procedure for the message delivery step, the delivery certification step, and the message take out step will be explained according to the flow chart of FIG. 18, and the operation procedure for the arbitration will be explained according to the flow chart of FIG. 19.

First, as a preparation stage, a reliable center sets up p1, q1, I, and s for each user, discloses N1 and I among them as the public information of the user, and stores s as the secret information of the user in the user secret information storage means 101 and secretly distributes it to the user. Here, p1 and q1 are mutually different large prime numbers, and N1=p1×q1. Also, I=S2 (mod N1) holds.

(1) Message deliver step

The user produces a message delivery request message RS about the message he wishes the information provider to provide, from the input means 110, and stores it in the temporary memory 102 (S261), and then transmits it to the information provider through the communication line 30 (S262). Here, the message delivery request message RS is formed by a request date and time, a user ID number, a requested message name, a requested message code, etc., as shown in FIG. 20. Note that FIG. 20 indicates the configuration format of the message delivery request message RS.

Here, the message delivery request message RS is transmitted from the user to the information provider, but in practice, it may be fine to make it such that the user transmits the requested message code alone to the information provider, and each of the information provider and the user produces the same message delivery request message RS independently.

The information provider generates the random message Z randomly from the random number generation means 209 (S263), and after the message delivery request message RS and the generated random message Z are stored in the temporary memory 203 (S264), generates the work key $W_i$=f1 (RS, Z) (i=1, 2, ..., g) of g bits size according to the first one-way random hash function f1 in the computation means 204 from the message delivery request message RS and the random message Z, and stores it in the temporary memory 203 (S265). Here, in general, a value of g is greater than or equal to a key length of the secret key used in the secret key cryptosystem means 105 and 205. Next, according to the requested message code in the message delivery request message RS, the message M corresponding to that code is taken out from the message database 202 (S266), and after it is enciphered into the ciphertext $C=E_W(M)$ by the secret key cryptosystem means 205 with the work key $W_i$ (i=1, 2, ..., g) as the secret key (S267), the ciphertext C is transmitted to the user through the communication line 30 (S268).

After the ciphertext C is received/stored at the message storage means 109, the user notifies the fact of receiving to the information provider through the communication line 30 (S269).

(2) Delivery Certification step

The user generates g pieces of random numbers $R_i$ (i=1, 2, ..., g) by the random number generation means 103, and then stores them in the temporary memory 102 (S270), calculates a preresponsive message $X_i=R_i^2 \pmod{N1}$ ($i=1, 2, \ldots, g$) for each random number by the computation means 104, and stored it In the temporary memory 102 (271), and transmits the preresponsive message $X_i$ ($i=1, 2, \ldots, g$) to the information provider through the communication line 30 (S272).

The information provider stores the received preresponsive message $X_i$ ($i=1, 2, \ldots, g$) in the temporary memory 203 (S273), and then generates the session key $K_i=f2(RS, (X_1\|X_2\|\ldots\|X_g))$ ($i=1, 2, \ldots, g$) of g bits size according to the second one-way random hash function f2 in the computation means 204 from the message delivery request message RS and the preresponsive message $X_i$ ($i=1, 2, \ldots, g$) stored in the temporary memory 203, and stores it in the temporary memory 203 (S274). Here, it may obviously be fine for f1 and f2 to be the same function.

Next, from the work keys $W_i$ and the session key $K_i$ ($i=1, 2, \ldots, g$) stored in the temporary memory 203, the secret key delivery message $V_i$ ($i=1, 2, \ldots, g$) is generated according to the third function f3 in the computation means 204, and stored as the check bits $e_i$ ($i=1, 2, \ldots, g$) in the temporary memory 203 (S275), and then the check bits $e_i$ ($i=1, 2, \ldots, g$) are transmitted to the user through the communication line 30 (S276). Here, as the third function f3, there is $V_i=f3(W_i, K_i)=W_i \oplus K_i$ ($i=1, 2, \ldots, g$) for example. Note that $\oplus$ indicates an exclusive OR.

The user stores the received check bits $e_i$ ($i=1, 2, \ldots, g$) in the temporary memory 102 (S277), and then, at the computation means 104, for each bit i of the check bits $e_i$, $Y_i=R_i$ if $e_i=0$, or $Y_i=sR_i \pmod{N1}$ if $e_i=1$, is calculated from the random number $R_i$ stored in the temporary memory 102 and the user's secret information s stored in the user secret information storage means 101 (S278), and transmitted as a responsive message $Y_i$ ($i=1, 2, \ldots, g$) to the information provider through the communication line 30 (S279).

The information provider stores the received responsive message $Y_i$ ($i=1, 2, \ldots, g$) in the temporary memory 203 (S280), and then, at the verification means 206, whether a verification formula $Y_i^2=X_i \pmod{N1}$ if $e_i=0$, or a verification formula $Y_i^2=X_i \times I \pmod{N1}$ if $e_i=1$, is satisfied or not is verified for each bit i, from the public information I of the user, and the preresponsive message $X_i$, the responsive message $Y_i$, and the check bits $e_i$ stored in the temporary memory 203 (S281). In a case this verification has failed, it regards the user as illegal, and the operation subsequent to that is prohibited (S282), and in a case it has succeeded, the message delivery request message RS, the random message Z, the check bits $e_i$, and the responsive message $Y_i$ ($i=1, 2, \ldots, g$) stored in the temporary memory 203 are recorded and managed as the log H in the logfile 208, as shown in FIG. 21 (S283). Note that FIG. 21 is showing a configuration format of the log H.

(3) Message take out step

The user generates the session key $K_i=f2(RS, (X_1\|X_2\|\ldots\|X_g))$ ($i=1, 2, \ldots, g$) of g bits size according to the second one-way random hash function f2 in the computation means 104 from the message delivery request message RS and the preresponsive message $X_i$ ($i=1, 2, \ldots, g$) stored in the temporary memory 102, and stores it in the temporary memory 102 (S284). Next, from the check bits $e_i$ ($i=1, 2, \ldots, g$) stored in the temporary memory 102, the secret key delivery message $V_i$ ($i=1, 2, \ldots, g$) is generated, and the work key $W_i$ ($i=1, 2, \ldots, g$) is taken out according to an inverse function f3' of the third function f3 in the computation means 104 from the generated secret key delivery message $V_i$ and the session key $K_i$ ($i=1, 2, \ldots, g$) and stored in the message storage means 109 (S285). Here, with respect to the third function f3 of $V_i=f3(W_i, K_i)=W_i \oplus K_i$ ($i=1, 2, \ldots, g$) for example, the third inverse function f3' is $W_i=f3'(V_i, K_i)=V_i \oplus K_i$ ($i=1, 2, \ldots, g$). Note that $\oplus$ indicates an exclusive OR.

Finally, the ciphertext C stored in the message storage means 109 is deciphered by the secret key cryptosystem means 105 with the work key $W_i$ ($i=1, 2, \ldots, g$) stored in the message storage means 109 as the secret key (S286), and the requested message $M=D_W(C)$ can be obtained from the message output/operation means 106 (S287).

(4) Arbitration

In a case the user claims later on that the requested message has not been received, or denies the request of the message delivery itself, the information provider presents the log H recorded and managed in the logfile 208, and stores it in the temporary memory 402 of the arbitrator (S291).

The arbitrator calculates $X_i=Y_i^2 \pmod{N1}$ if $e_i=0$, or $X_i=Y_i^2/I \pmod{N1}$ if $e_i=1$, at the computation means 401 for each bit i, from the public information I of the user, and the check bits $e_i$ and the responsive message $Y_i$ in the log H stored in the temporary memory 402, and stores it in the temporary memory 402 (S292).

Next, the work key $W_i=f1(RS, Z)$ ($i=1, 2, \ldots, g$) is generated according to the first one-way random hash function f1 in the computation means 401 from the message delivery request message RS and the random message Z in the log H stored in the temporary memory 402, while the session key $K_i=f2(RS, (X_1\|X_2\|\ldots\|X_g))$ ($j=1, 2, \ldots, g$) is generated according to the second one-way random hash function f2 in the computation means 401 from the message delivery request message RS and the calculation result $X_i$ ($i=1, 2, \ldots, g$), and stored in the temporary memory 402 (S294). Then, from the work keys $W_i$ and the session key $K_i$ ($i=1, 2, \ldots, g$), the secret key delivery message $V_i$ ($i=1, 2, \ldots, g$) is generated according to the third function f3 in the computation means 401, and as the check bits $e_i$ ($i=1, 2, \ldots, g$), whether they coincide with the check bits $e_i$ ($i=1, 2, \ldots, g$) in the log H stored in the temporary memory 402 or not is checked at the verification means 403 (S296). When they coincide, it implies that the authenticity of the log H is proven (S297), and the fact that the user has requested the message delivery and received the requested message is guaranteed. Otherwise the log H is considered as invalid (S298).

By using the above described message delivery method, the message M is transmitted to the user by being enciphered into the ciphertext C first, so that at a point at which the user received the ciphertext C, the message M is not going to be obtained. Then, at a point at which the zero knowledge interactive proof protocol is finished normally, it implies that the user authentication according to the zero knowledge interactive proof protocol has been made normally, and besides it becomes a proof for the fact that the user has normally received the check bits $e_i$ ($i=1, 2, \ldots, g$).

Also, apart from the check bits $e_i$ ($i=1, 2, \ldots, g$), the work key $W_i$ ($i=1, 2, \ldots, g$) is generated from the message delivery request message RS and the preresponsive message $X_i$ produced by the user himself, and the user can obtain the requested message M by deciphering the ciphertext C, so that the fact that the user has received the check bits $e_i$ ($i=1, 2, \ldots, g$) normally and the fact that the user has received the requested message normally become equivalent. Therefore, the information provider can certify the fact that the message has been delivered to the user accurately and surely.

Also, it has been explained according to the Fiat Shamir scheme, but the present method is applicable to all the zero knowledge interactive proof protocols which base their safety on a difficulty of the factoring or a difficulty of the discrete logarithmic problem, etc., including the Extended Fiat Shamir scheme (Ohta, Okamoto, "An Extension of the Fiat-Shamir Scheme Based on Higher Degree Roots", the Electronic Information Communication Society, Technical Research Report ISEC88-13).

Next, in relation to the log H comprising the message delivery request message RS, the random message Z, the check bits ei, and the responsive message $Y_i$ (i=1, 2, ..., g), they are mutually related by the verification formula in the zero knowledge interactive proof protocol and the first and second one-way random hash functions, so that it is impossible to forge the log H by illegally altering a part, etc. Therefore, by making a record management of the log H, it can be presented to a neutral third party such as the arbitrator later on, as an evidence for the fact that the user has surely received the work key $W_i$ (i=1, 2, ..., g) for making it possible for the user to obtain the requested message M by deciphering the ciphertext C.

The above explanation is that by which it is possible to prove the fact that the user has made a request for the message delivery to the information provider, and the information provider has delivered the requested message to the user accurately and surely, and various manners of utilization are possible. For example, in a case the message M is a charged message such as the writings, etc., as the information provider transmits the message M to the user according to the above described message delivery method, the log H recorded and managed by the information provider can be utilized as a proof information at a time of collecting the message fee such as a fee for using the copyright, and so on.

Next, the eighth embodiment of the present invention will be explained.

FIG. 22 is a block diagram showing a configuration of a message delivery system in the eighth embodiment of the present invention, in which 10 indicates a user (terminal) where configurations from 100 to 107 and 109 are similar to the fifth embodiment, while 110 is an input means for producing a message delivery request message, and 108 is a message reconstruction means for reconstructing the divided block messages into an original message. 20 indicates the information provider (terminal) where configurations from 200 to 206, 209, and 210 are similar to the fifth embodiment, while 208 is a logfile for making a record management of a log H as an evidence for proving later on the fact that the message has been delivered to the user, and 207 is a message division means for dividing the message into a plurality of blocks in arbitrary bit lengths and storing them. 30 indicates the communication line for connecting the user and the information provider by means of a communication. 40 indicates an arbitrator (terminal) where configurations from 401 to 403 are similar to the seventh embodiment, while 404 is a message division means for dividing the message into a plurality of blocks in arbitrary bit lengths and storing them.

Figure 23:
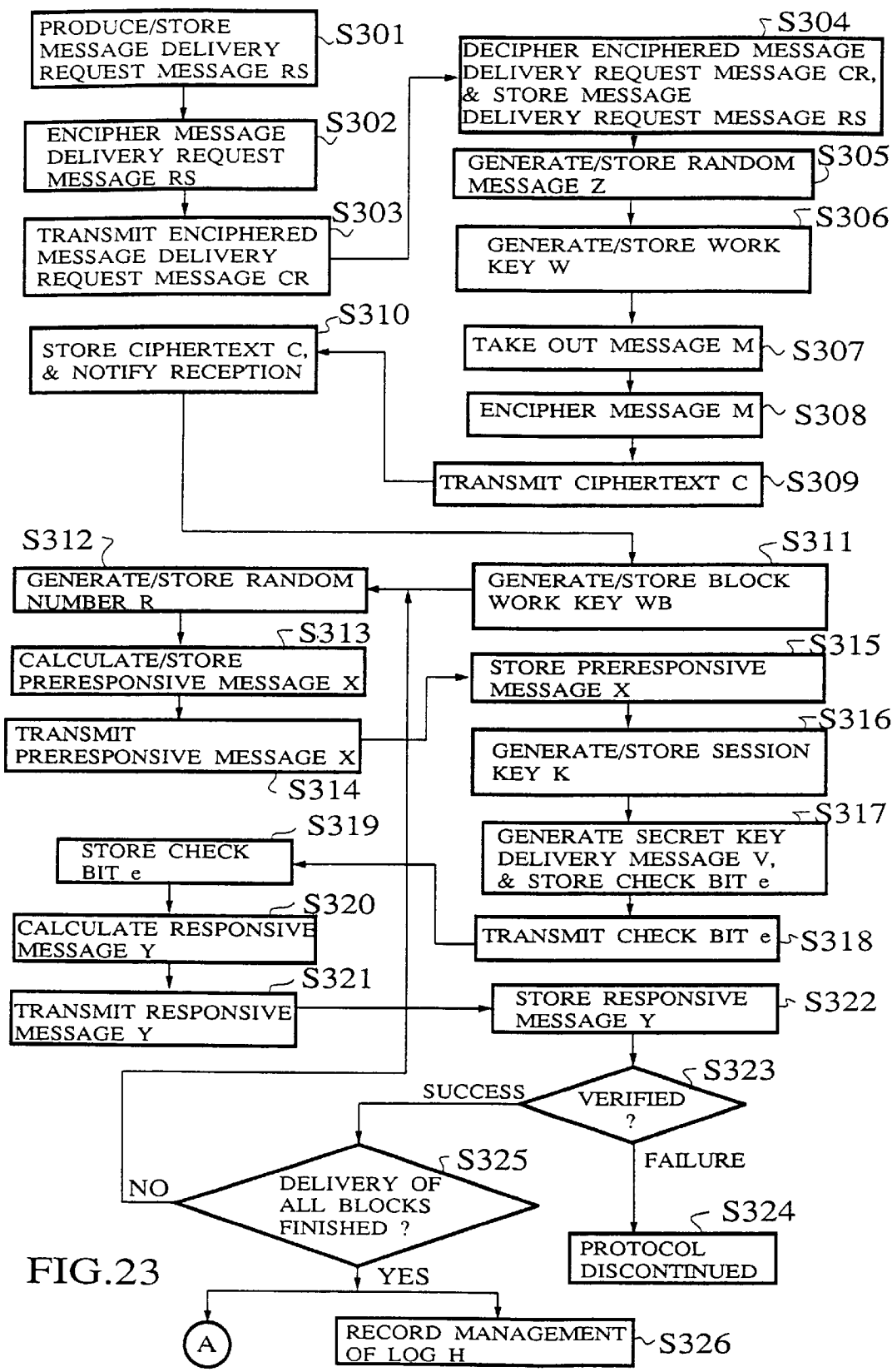
FIG. 23 is a flow chart showing a first half of an operation procedure concerning a message delivery, a delivery certification and a message take out for the message delivery system shown in FIG. 22.
Figure 24:
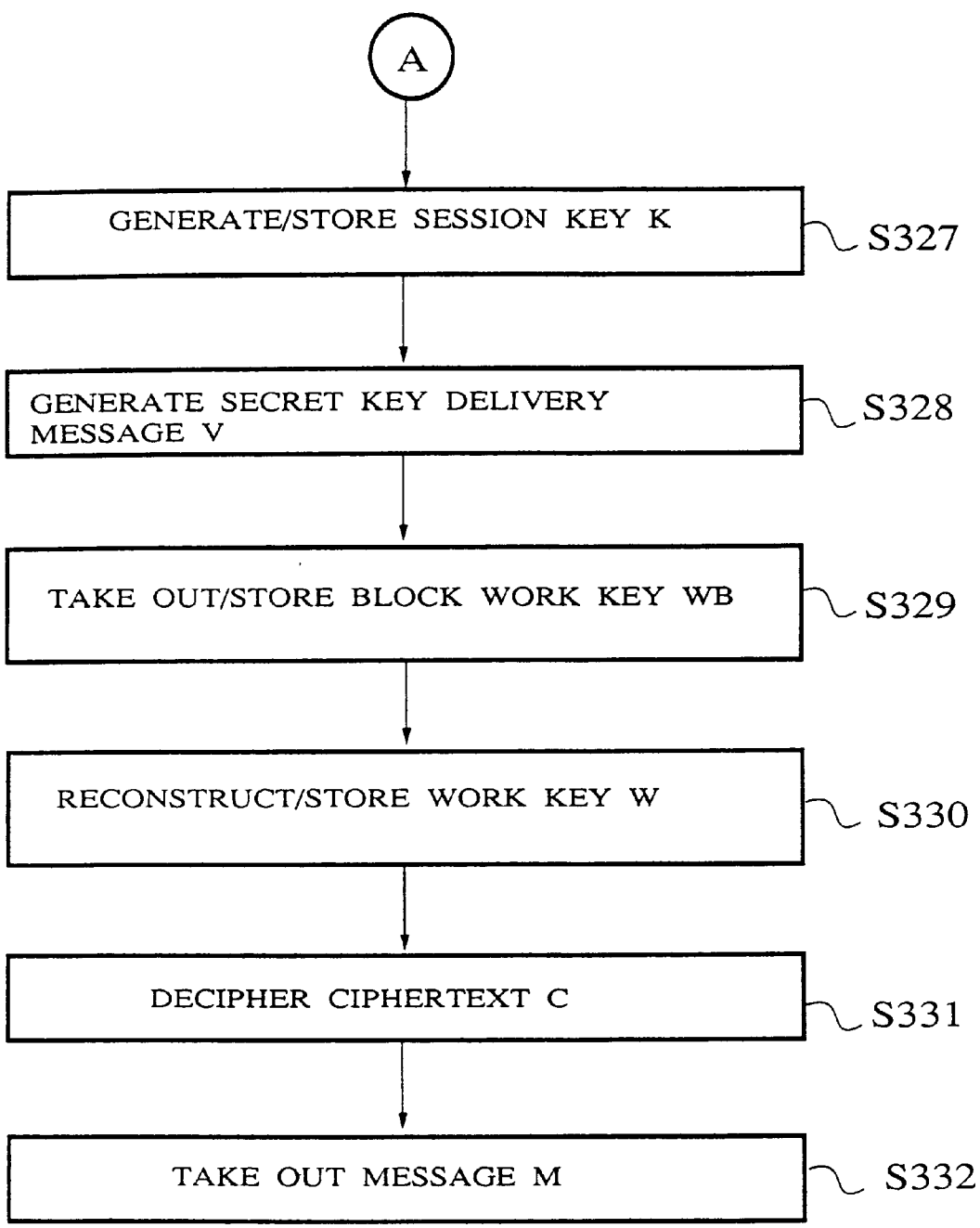
FIG. 24 is a flow chart showing a second half of an operation procedure concerning a message delivery, a delivery certification and a message take out for the message delivery system shown in FIG. 22.
Figure 25:
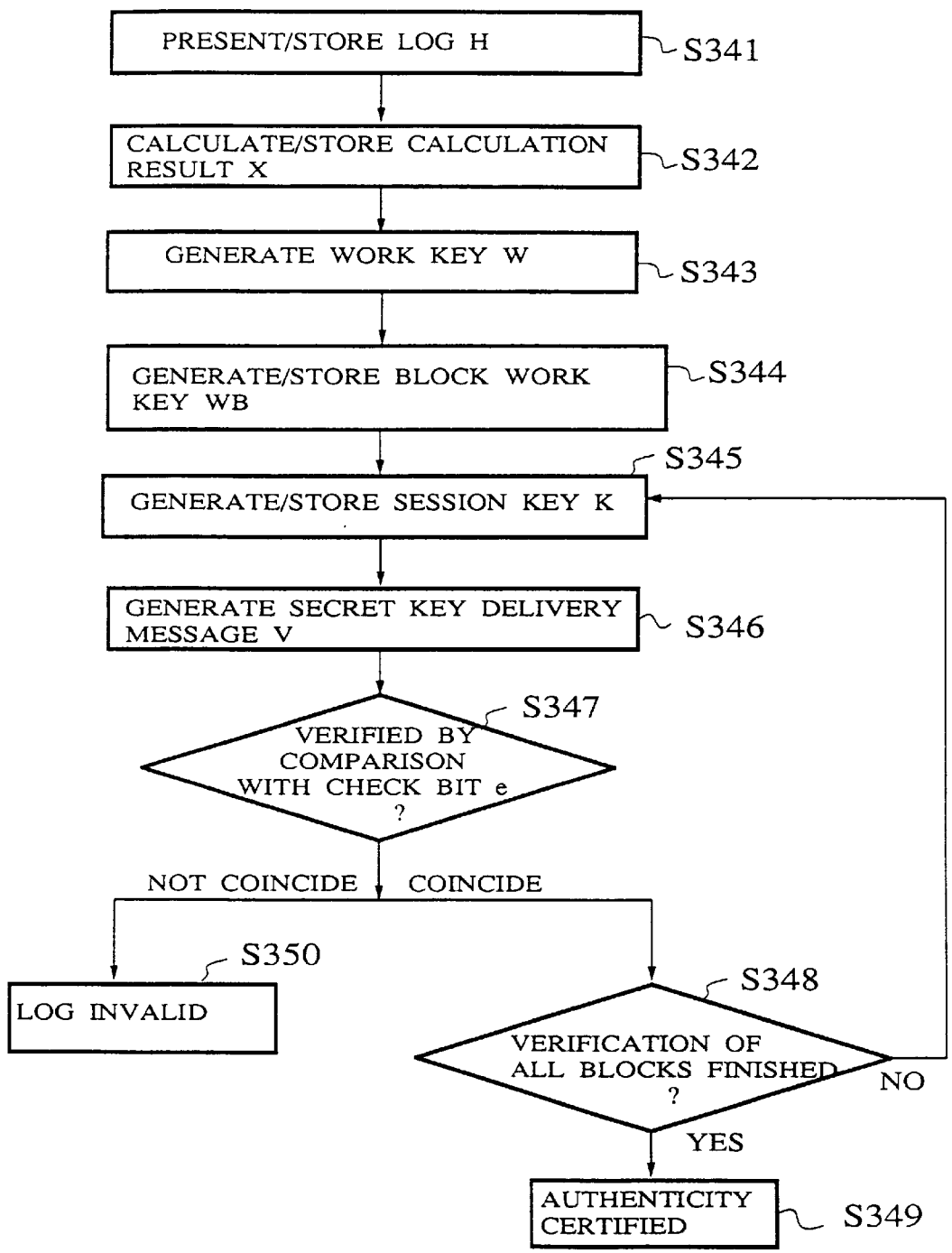
FIG. 25 is a flow chart showing an operation procedure concerning an arbitration for the message delivery system shown in FIG. 22.

In the following, an operation procedure for the message delivery step, the delivery certification step, and the message take out step will be explained according to the flow chart of FIG. 23, and the operation procedure for the arbitration will be explained according to the flow chart of FIG. 24.

First, as a preparation stage, a reliable center sets up p1, q1, I, and s for each user, discloses N1 and I among them as the public information of the user, and stores s as the secret information of the user in the user secret information storage means 101 and secretly distributes it to the user. Here, p1 and q1 are mutually different large prime numbers, and N1=p1×q1. Also, I=$s^2$ (mod N1) holds.

In addition, p, q, PC, and SC are set up for each information provider, N and PC among them are disclosed as the public information (public key) of the information provider, and SC is stored as the secret information (secret key) of the information provider in the information provider secret information storage means 201, and it is secretly distributed to the information provider. Here, p and q are mutually different large prime numbers, and N=pq. Also, PC×SC=1 (mod(p−1)(q−1)) holds.

(1) Message deliver step

The user produces a message delivery request message RS about the message he wishes the information provider to provide, from the input means 110, and stores it in the temporary memory 102 (S301), and then enciphers it into the enciphered message delivery request message CR=$RS^{PC}$ (mod N) by the public key cryptosystem means 107 by using the public key PC of the information provider (S302), and transmits it to the information provider through the communication line 30 (S303). Here, the message delivery request message RS is formed by a request date and time, a user ID number, a requested message name, a requested message code, etc., similarly as in the seventh embodiment.

The information provider deciphers the received enciphered message delivery request message CR into the message delivery request message RS=$CR^{PC}$ (mod N) by the public key cryptosystem means 210 by using the secret key SC stored in the information provider secret information storage means 201, and then stores it in the temporary memory 203 (S304), while generating the random message Z randomly from the random number generation means 209, and then storing it in the temporary memory 203 (S305).

Next, the work key $W_i$=f1(RS, Z) (i=1, 2, ..., g) of g bits size is generated according to the first one-way random hash function f1 in the computation means 204 from the message delivery request message RS and the random message Z, and stored in the temporary memory 203 (S306). Here, in general, a value of g is greater than or equal to a key length of the secret key used in the secret key cryptosystem means 105 and 205. After that, according to the requested message code in the message delivery request message RS, the message M corresponding to that code is taken out from the message database 202 (S307), and after it is enciphered into the ciphertext C=$E_W$(M) by the secret key cryptosystem means 205 with the work key $W_i$ (i=1, 2, ..., g) as the secret key (S308), the ciphertext C is transmitted to the user through the communication line 30 (S309).

After the ciphertext C is received/stored at the message storage means 109, the user notifies the fact of receiving to the information provider through the communication line 30 (S310).

(2) Delivery Certification step

The information provider terminal 20 divides the work key $W_i$ (i=1, 2, ..., g) stored in the temporary memory 203 into a plurality of blocks in sizes of arbitrary bit lengths at the message division means 207, and stores them as the block work keys. Here, for the sake of the simplicity of the explanation, a number of divided blocks is set to be m, a bit length is set to be constant L for all the blocks, and the divided work keys are expressed as the block work keys $WB_{ij}$ (i=1, 2, ..., L: j=1, 2, ..., m). Namely, $WB_{ij}=W_{(i+L(j-1))}$, and it is going to be $WB_{11}=W_1$, $WB_{L1}=W_L$, $WB_{12}=W_{L+1}$, and $WB_{Lm}=W_g$, for example.

The processing from here on is for the j-th block, and the following processing is repeatedly carried out sequentially (m times) for each block from the first block to the m-th block.

First, the user generates L pieces of random numbers $R_{ij}$ (i=1, 2, ..., L) by the random number generation means 103 and then stores them in the temporary memory 102 (S312), calculates a preresponsive message $X_{ij}=R_{ij}^2 \pmod{N1}$ (i=1, 2, ..., L) by the computation means 104 for each random number and then stores it in the temporary memory 102 (S313), and transmits the preresponsive message $X_{ij}$ (i=1, 2, ..., L) to the information provider through the communication line 30 (S314).

The information provider stores the received preresponsive message $X_{ij}$ (i=1, 2, ..., L) in the temporary memory 203 (S315), and then generates the session key $K_{ij}=f2(RS, (X_{1j}\|X_{2j}\| \ldots \|K_{Lj}))$ (i=1, 2, ..., L) of L bits size according to the second one-way random hash function f2 in the computation means 204 from the message delivery request message RS and the preresponsive message $X_{ij}$ (i=1, 2, ..., L) stored in the temporary memory 203 and stores it in the temporary memory 203 (S316). Here, it may obviously be fine for f1 and f2 to be the same function.

Next, from the block work keys $WB_{ij}$ (1=1, 2, ..., L) stores in the message division means 207 and the session key $K_{ij}$ (i=1, 2, ..., L) stored in the temporary memory 203, the secret key delivery message $V_{ij}$ (i=1, 2, ..., L) is generated according to the third function f3 in the computation means 204, and stored as the check bits $e_{ij}$ (i=1, 2, ..., L) in the temporary memory 203 (S317), and then the check bits $e_{ij}$ (i=1, 2, ..., L) are transmitted to the user through the communication line 30 (S318). Here, as the third function f3, there is $V_{ij}=f3(W_{ij}, K_{ij})=W_{ij} \oplus K_{ij}$ (i=1, 2, ..., L) for example. Note that $\oplus$ indicates an exclusive OR.

The user stores the received check bits $e_{ij}$ (i=1, 2, ..., g) in the temporary memory 102 (S319), and then, at the computation means 104, for each bit i of the check bits $e_{ij}$, $Y_{ij}=R_{ij}$ if $e_{ij}=0$, or $Y_{ij}=sR_{ij} \pmod{N1}$ if $e_{ij}=1$, is calculated from the random number $R_{ij}$ stored in the temporary memory 102 and the user's secret information s stored in the user secret information storage means 101 (S320), and transmitted as a responsive message $Y_{ij}$ (i=1, 2, ..., L) to the information provider through the communication line 30 (S321).

The information provider stores the received responsive message $Y_{ij}$ (i=1, 2, ..., L) in the temporary memory 203 (S322), and then, at the verification means 206, whether a verification formula $Y_{ij}^2=X_{ij} \pmod{N1}$ if $e_{ij}=0$, or a verification formula $Y_{ij}^2=X_{ij} \times I \pmod{N1}$ if $e_{ij}=1$, is satisfied or not is verified for each bit i, from the public information I of the user, and the preresponsive message $X_{ij}$, the responsive message $Y_{ij}$, and the check bits $e_{ij}$ stored in the temporary memory 203 (S323). In a case this verification has failed, it regards the user as illegal, and the execution of the protocol is immediately discontinued (S324), and in a case it has succeeded, the above processing is repeated until all the blocks are finished (S325). Then, in a case the verification has succeeded for all the blocks from the first block to the m-th block, the message delivery request message RS, the random message Z, the check bits $e_{ij}$, and the responsive message $Y_{ij}$ (i=1, 2, ..., L) stored in the temporary memory 203 are recorded and managed as the log H in the logfile 208 (S326).

(3) Message take out step

For each block, the user generates the session key $K_{ij}=f2(RS, (X_{1j}\|X_{2j}\| \ldots \|X_{Lj}))$ (i=1, 2, ..., L: j=1, 2, ..., m) of L bits size according to the second one way random hash function f2 in the computation means 104 from the message delivery request message RS and the preresponsive message $X_{ij}$ (i=1, 2, ..., L: j=1, 2, ..., m) stored in the temporary memory 102, and stores it in the temporary memory 102 (S327).

Next, from the check bits $e_{ij}$ (i=1, 2, ..., L: j=1, 2, ..., m) stored in the temporary memory 102, the secret key delivery message $V_{ij}$ (i=1, 2, ..., L: j=1, 2, ..., m) is generated (S328), and the block work key $WB_{ij}$ (i=1, 2, ..., L: j=1, 2, ..., m) is taken out according to an inverse function f3' of the third function f3 in the computation means 104 from the generated secret key delivery message $V_{ij}$ and the session key $K_{ij}$ (i=1, 2, ..., L: j=1, 2, ..., m) and stored in the message reconstruction means 108 (S329). Here, with respect to the third function f3 of $V_{ij}=f3(W_{ij}, K_{ij})=W_{ij} \oplus K_{ij}$ (i=1, 2, ..., L: j=1, 2, ..., m) for example, the third inverse function f3' is $W_{ij}=f3'(V_{ij}, K_{ij})=V_{ij} \oplus K_{ij}$ (i=1, 2, ..., L: j=1, 2, ..., m). Note that $\oplus$ indicates an exclusive OR.

After that, the work key $W_i$ (i=1, 2, ..., g) is reconstructed by using the block work keys $WB_{ij}$ (i=1, 2, ..., L: j=1, 2, ..., m) by the message reconstruction means 108 and stored in the message storage means 109 (S330).

Finally, the ciphertext C stored in the message storage means 109 is deciphered by the secret key cryptosystem means 105 with the work key $W_i$ (i=1, 2, ..., g) stored in the message storage means 109 as the secret key (S331), and the requested message $M=D_W(C)$ can be obtained from the message output/operation means 106 (S332).

(4) Arbitration

In a case the user claims later on that the requested message has not been received, or denies the request of the message delivery itself, the information provider presents the log H recorded and managed in the logfile 208, and stores it in the temporary memory 402 of the arbitrator (S341).

The arbitrator calculates $X_{ij}=Y_{ij}^2 \pmod{N1}$ if $e_{ij}=0$, or $X_{ij}=Y_{ij}^2/I \pmod{N1}$ if $e_{ij}=1$, at the computation means 401 for each bit i, from the public information I of the user, and the check bits $e_{ij}$ and the responsive message $Y_{ij}$ in the log H stored in the temporary memory 402, and stores it in the temporary memory 402 (S342). Next, the work key $W_i=f1(RS, Z)$ (i=1, 2, ..., g) is generated according to the first one-way random hash function fl in the computation means 401 from the message delivery request message RS and the random message Z in the log H stored in the temporary memory 402 (S343), and then it is divided into the block work keys $WB_{ij}$ (i=1, 2, ..., L: j=1, 2, ..., m) and stored at the message division means 404 (S344).

For each block (J-th block), the session key $K_{ij}=f2(RS, (RS, (X_{1j}\|X_{2j}\| \ldots \|X_{Lj}))$ (i=1, 2, ..., L) is generated according to the second one-way random hash function f2 in the computation means 401 from the message delivery request message RS and the calculation result $X_{ij}$ (i=1, 2, ..., L) stored in the temporary memory 402, and stored in the temporary memory 402 (S345). Then, from the block work keys $W_{ij}$ stored in the message division means 404 and the session key $K_{ij}$ (i=1, 2, ..., L) stored in the temporary memory 402, the secret key delivery message $V_{ij}$ (i=1, 2, ..., L) is generated according to the third function f3 in the computation means 401 (S346), and as the check bits $e_{ij}$ (i=1, 2, ..., L), whether they coincide with the check bits $e_{ij}$ (i=1, 2, ..., L) in the log H stored in the temporary memory 402 or not is checked at the verification means 403 (S347). When they coincide for all blocks (m blocks from the first block to the m-th block), it implies that the authenticity of the log H is proven (S349), and the fact that the user has requested the message delivery and received the requested message is guaranteed. Otherwise the log H is considered as invalid (S350).

By using the above described message delivery method, the effects similar to the seventh embodiment can be obtained, and besides the secret communication is made for the message delivery request message RS between the information provider and the user, so that even if the third part wiretaps the communication sequence, it is impossible to obtain the message delivery request message RS and the session key $K_j$ (i=1, 2, . . . , L: J=1, 2, . . . , m) from the wiretapped communication sequence. Also, the work key $W_i$ (i=1, 2, . . . , g) is obtained from the check bits $e_{ij}$ and the session key $K_{ij}$ (i=1, 2, . . . , L: j=1, 2, . . . , m), so that it becomes equivalent to the fact that the third party cannot obtain the work key $W_i$ (i=1, 2, . . . , g), and it becomes possible to prevent the third party from illegally obtaining the message M by deciphering the ciphertext C.

In addition, the communication between the information provider and the user is repeatedly carried out as many times as a number m of divided blocks of the work key $W_i$ (i=1, 2, . . . , g), so that in a case the verification of the information provider failed in a middle, the communication subsequent to that is discontinued, and the remaining check bits are not transmitted. Namely, the check bits that can be learned by the user are limited only to those prior to the failure of the verification, so that the user who caused the failure of the verification of the information provider can only obtain a part of the information necessary for deciphering the ciphertext C, and as a result, it becomes impossible to generate the correct work key $W_i$ (i=1, 2, . . . , g).

Consequently, not to mention a case in which the illegal user who does not know the secret information s of the user transmits the illegal responsive message $Y_{ij}$ (i=1, 2, . . . , L: J=1, 2, . . . , m), it is possible to eliminate a case in which such an illegal act as not transmitting the responsive message itself is made, such that the user illegally receives the check bits $e_{ij}$ (i=1, 2, . . . . , L: j=1, 2, . . . , m) necessary in obtaining the requested message M and illegally deciphers/obtains the message M despite of the fact that the information provider cannot make a record management of the log H for proving the fact that the information provider has delivered the requested message M to the user.

Also, in the above explanation, the bit length of the divided blocks has been set to be constant L for each block, but it may also be quite fine to change the bit length size block by block, as in a case of 1 bit for the first block, 2 bits for the second blocks, 4 bits for the third blocks, etc. for example.

Finally, among the secret communication in the above explanation, as for the secret communication according to the public key cryptosystem, it is obviously fine to use the secret communication according to the secret key cryptosystem instead. Also, it has been explained according to the Fiat Shamir scheme, but the present method is applicable to all the zero knowledge interactive proof protocols which base their safety on a difficulty of the factoring or a difficulty of the discrete logarithmic problem, etc., including the Extended Fiat Shamir scheme (Ohta, Okamoto, "An Extension of the Fiat-Shamir Scheme Based on Higher Degree Roots", the Electronic Information Communication Society, Technical Research Report ISEC88-13).

As explained in the above, according to the fifth to eighth embodiments of the present invention, in the message delivery method utilizing the zero knowledge interactive proof protocol, firstly, at the message delivery step, the message requested by the user is delivered to the user by being enciphered by the information provider, so that it is impossible for the user to take out the requested message itself at this point. Secondly, the operation of the protocol carried out at the delivery certification step itself is equivalent to the zero knowledge interactive proof protocol as the user authentication, so that similarly as in the zero knowledge interactive proof protocol, it is almost impossible for the illegal user to clear the verification of the information provider. Thirdly, in a case the delivery certification step is normally finished, it is equivalent to the fact that the zero knowledge interactive proof protocol is finished normally, so that the information provider can judge that the user has correctly received the check bits and applied the appropriate processing. Fourthly, at the message take out step, if the check bits can be received correctly, the user can produce the secret key delivery message and the work key, so that the requested message can be taken out by deciphering the message enciphered by said work key at this point. Consequently, due to these effects, in a case all the steps of the message delivery method are finished, the information provider can certify the fact that, after the requested message is provided in the enciphered state to the legitimate user, the information necessary for the user to decipher the enciphered message has delivered to the user, and the user has received it surely, so that the information provider can Judge that the message requested by the user has delivered to the user surely.

Also, according to the fifth and sixth embodiments of the present invention, by carrying out the secret communication for the check bits, the equivalent effects as in a case of carrying out the secret communication for the work key as well can be obtained, so that these secret keys are not going to be learned even when the third party wiretaps the communication path. In addition, it is also possible to make it such that even an information effective in decoding the work key cannot be obtained.

Also, according to the seventh and eighth embodiments of the present invention, it is possible to make it such that the work key convenient for the information provider cannot be generated illegally.

Also, as it is impossible to forge the log, the information provider can acquire a valid evidence which can prove later on the fact that, after the requested message is provided in an enciphered state to the legitimate user, the information necessary for the user to decipher the enciphered message has delivered to the user, and the user has received it surely.

Also, it becomes possible to present the log as a valid evidence according to the need. In addition, an amount of information that must be recorded and managed as the evidence for the fact that the information provider has delivered the message can be reduced considerably compared with a scheme of Sakurai (Japanese Patent Application Laid Open No. 5-12321).

Also, in a case there arises a need to carry out the arbitration regarding a presence or an absence of the information providing between the information provider and the user, a neutral arbitration organization such as a court can Judge which one of a claim of the information provider and a claim of the user is a proper one by checking the authenticity of the log as a valid evidence, Also, according to the eighth embodiment of the present invention, by making the secret communication for the message delivery request message, it is possible to prevent the wiretapping of the message delivery request message by the third party, and to protect the privacy of the user, concerning what kind of message has been requested, etc.

Also, as for the session key and the work key, they are scrambled by the information secret among the information provider and the user alone, so that these secret keys are not going to be learned even when the third party wiretaps the communication path, and even an information effective in decoding the secret key cannot be obtained. Therefore, it is impossible for the third party to illegally obtain the message requested by the user.

Also, in a case the verification of the information provider failed in a middle of the delivery certification step due to the utilization by the illegal user, etc. for example, the execution of the protocol is immediately discontinued, and the blocks subsequent to the failure of the verification are not going to be transmitted to the user. Consequently, the user who caused the failure of the verification of the information provider can obtain only a part of the information necessary for deciphering the enciphered message, and as a result, it becomes impossible to generate the session key or the work key, so that it is possible to eliminate a case in which the illegal user illegally obtains the requested message.

Also, according to these embodiments, it becomes a system in which the information provider can certify that the information provider has delivered the requested message to the user surely, and the user has received it surely. Also, it is possible to use the zero knowledge interactive proof protocol independently as a user authentication method by which the information provider authenticates the user according to the need.

Also, it becomes a system which is made such that the random message can be utilized at a time of generating the work key.

Also, according to the fifth and eighth embodiments of the present invention, it becomes a system which has the information provider secret information storage means in which the information provider can store the information which is to be kept in secret.

Also, according to the fifth, sixth, and eighth embodiments of the present invention, it becomes a system which is made such that the secret communication according to the public key cryptosystem can be made between the information provider and the user.

Also, according to the seventh and eighth embodiments of the present invention, it becomes a system which has the input means for producing the message delivery request message easily on the user terminal.

Also, it becomes a system which has the function for generating the session key and the secret key delivery message, such that the message delivery utilizing the work key and the session key can be carried out.

Also, it becomes a system which is made such that the log as a valid evidence can be presented according to the need.

Also, it becomes a system which is made such that, by a neutral arbitration organization such as a court, it is possible to check the authenticity of the log as a valid evidence, and Judge which one of a claim of the information provider and a claim of the user is a proper one.

Also, according to the eighth embodiment of the present invention, it becomes a system in which the execution of the protocol is immediately discontinued when it is detected as the illegal user, such that it is possible to eliminate a case in which the illegal user illegally obtains the requested message.

Next, the ninth embodiment of the present invention will be explained.

Figure 26:
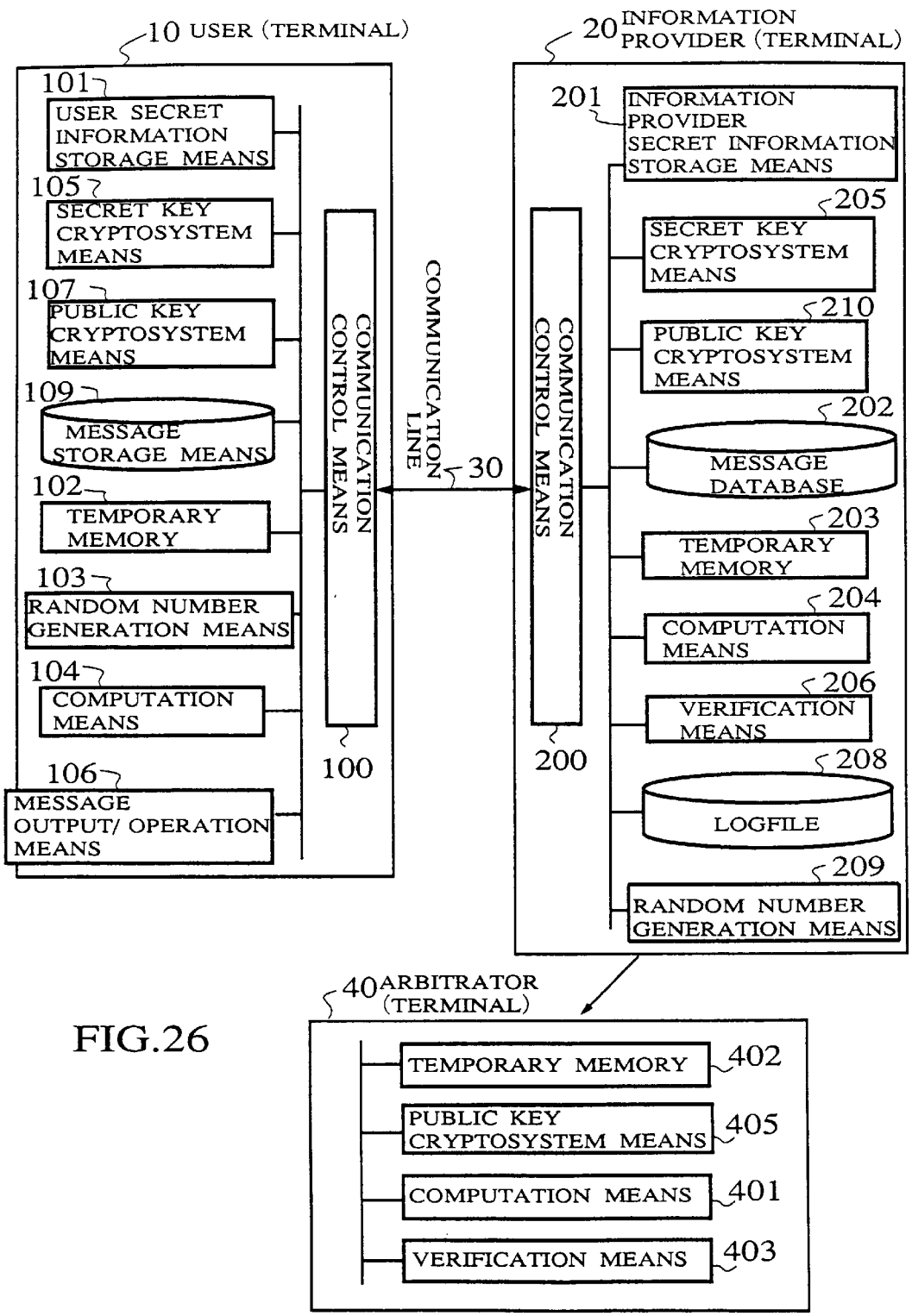
FIG. 26 is a block diagram showing an exemplary configuration of a message delivery system in the ninth embodiment of the present invention.

FIG. 26 is a block diagram showing a configuration of a message delivery system in the ninth embodiment of the present invention, in which 10 indicates a user (terminal) who receives a delivery of messages, where 100 is a communication control means for controlling a communication line 30, 101 is a user secret information storage means for storing a secret information of the user produced by a center, 105 is a secret key cryptosystem means for utilizing the secret key cryptosystem (DES, FEAL, for example), 197 is a public key cryptosystem means for utilizing the public key cryptosystem (RSA, for example), 109 is a message storage means for storing the message delivered from the information provider, 102 is a temporary memory for the user to temporarily store a necessary information, 103 is a random number generation means for the user to generate random numbers, 104 is a computation means for carrying out necessary computations, and 106 is a message output/operation means outputting or operating the requested message. 20 indicates the information provider (terminal) for providing messages, where 200 is a communication control means for controlling the communication line 30, 201 is an information provider secret information storage means for storing a secret information of the information provider, 205 is a secret key cryptosystem means for utilizing the secret key cryptosystem, 210 is a public key cryptosystem means for utilizing the public key cryptosystem, 202 is a message database in which the messages to be provided are stored, 203 is a temporary memory for the information provider to temporarily store a necessary information, 204 is a computation means for carrying out necessary computations, 206 is a verification means for verifying an authenticity of the message, 208 is a logfile for making a record management of a log data H as an evidence for proving later on the fact that the message has been delivered to the user, and 209 is a random number generation means for the information provider to generate random numbers. 30 indicates the communication line for connecting the user and the information provider by means of a communication. 40 indicates an arbitrator (terminal) for judging later on an authenticity of the log data H from a neutral standpoint, for the log data H which is recorded and managed by the information provider in the logfile 208, where 402 is a temporary memory for the arbitrator to temporarily store a necessary information, 405 is a public key cryptosystem means for utilizing the public key cryptosystem, 401 is a computation means for carrying out necessary computations, and 403 is a verification means for verifying an authenticity for the log data H about which the Judgement of the authenticity is requested.

Figure 27:
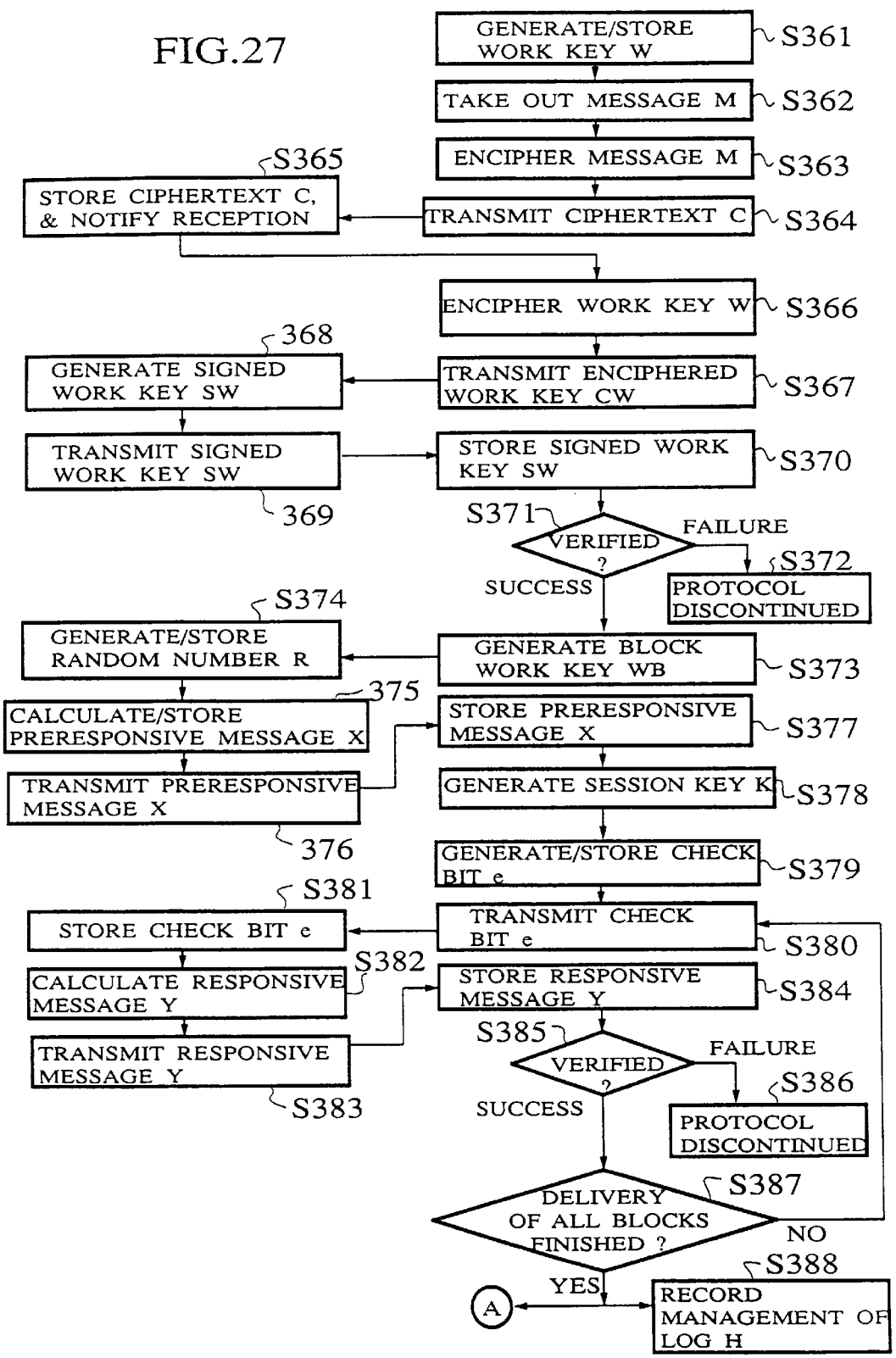
FIG. 27 is a flow chart showing a first half of an operation procedure concerning a message delivery, a delivery certification and a message take out for the message delivery system shown in FIG. 26.
Figure 28:
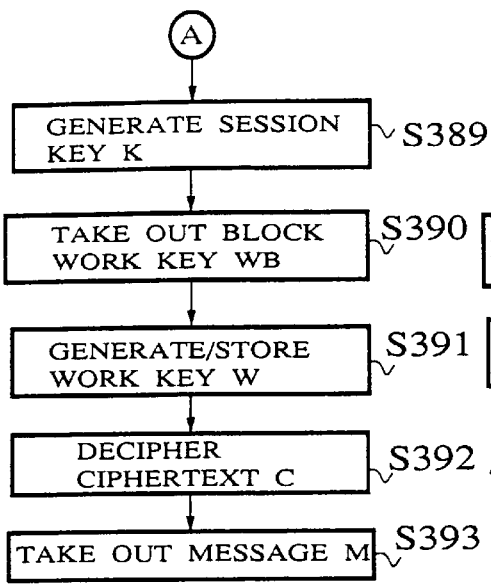
FIG. 28 is a flow chart showing a second half of an operation procedure concerning a message delivery, a delivery certification and a message take out for the message delivery system shown in FIG. 26.
Figure 29:
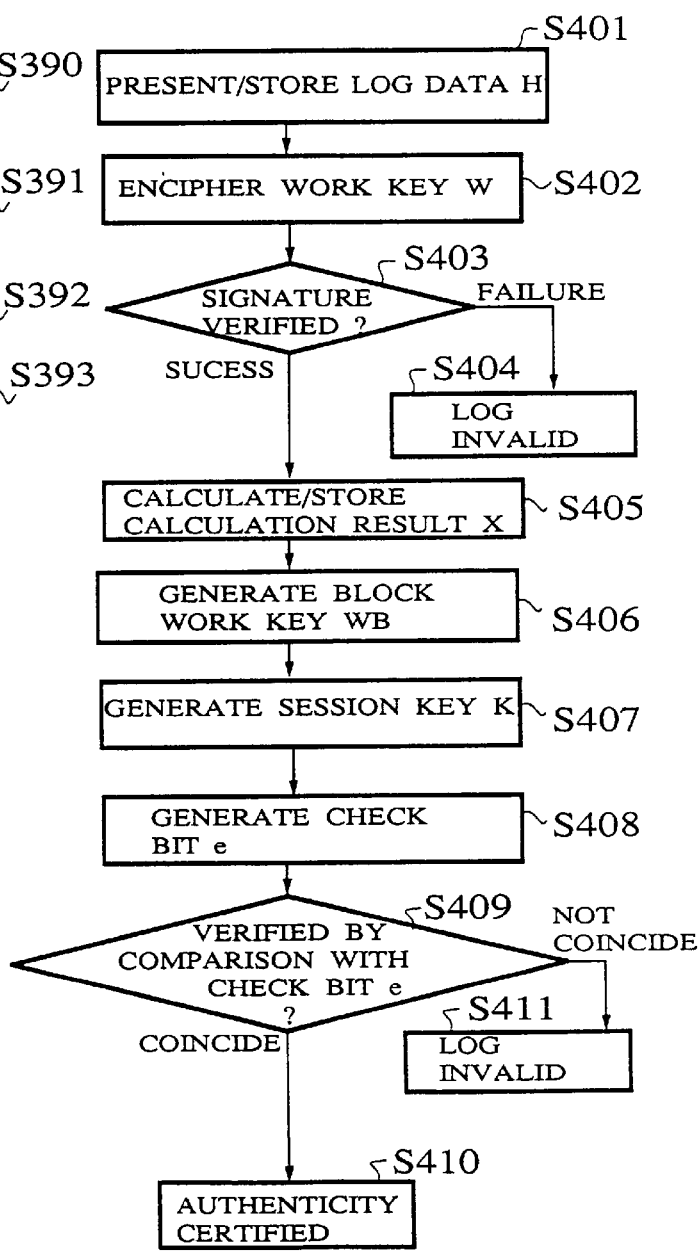
FIG. 29 is a flow chart showing an operation procedure concerning an arbitration for the message delivery system shown in FIG. 26.

In the following, an operation procedure for the message delivery step, the delivery certification step, and the message take out step will be explained according to the flow chart of FIG. 27 and FIG. 28, and the operation procedure for the arbitration will be explained according to the flow chart of FIG. 29.

Here, an alphabet letter other than the random number R, the prerespinsive message X, and the responsive message Y indicates the entire information, and an alphabet letter with a subscript indicates bit information for that information. For example the work key W indicates an entire work key formed in g bits length, and the work key $W_i$ (i=1, 2, ..., g) indicates the bit information for the i-th bit of the work key. Also, the subscript of the random number R, the prerespinsive message X, and the responsive message Y indicates one information among pieces of information of the identical type which are generated in plurality. For example, the random number $R_i$ (i=1, 2, ..., g) indicates that it is a random number information which is generated at the i-th order among the random numbers which are generated in g pieces.

(0) Preparation stage

A reliable center sets up p1, q1, ID, S, p2, q2, PU, and SU for each user, discloses N1, N2, ID, and PU among them as the public information of the user, and stores S and SU as the secret information of the user in the user secret information storage means 101 and secretly distributes it to the user. Here, each set of (p1, q1) and (p2. q2) is a set of mutually different large prime numbers, and N1=p1×q1, N2=p2×q2. Also, ID=$S^2$ (mod N1), PU×SU=1 (mod (p2−1)(q2−1)) hold. Note that it may be p1=p2, q1=q2.

In addition, p, q, PC, and SC are set up for each information provider, N and PC among them are disclosed as the public key of the information provider, and SC is stored as the secret key of the information provider in the information provider secret information storage means 201, and it is secretly distributed to the information provider. Here, p and q are mutually different large prime numbers, and N=pq. Also, PC×SC=1 (mod(p−1)(q−1)) holds.

(1) Message deliver step

The information provider arbitrarily generates the work key W of g bits length by the random number generation means 209, and stores it in the temporary memory 203 (S361). Here, in general, a value of g is greater than or equal to a key length of the secret key used in the secret key cryptosystem means 105 and 205. After that, the message M is taken out from the message database 202 (S362), and after it is enciphered into the ciphertext C=$E_W$(M) by the secret key cryptosystem means 205 with the work key W as the secret key (S363), the ciphertext C is transmitted to the user through the communication line 30 (S364).

After the ciphertext C is received/stored at the message storage means 109, the user notifies the fact of receiving to the information provider through the communication line 30 (S365).

Here, the communication line 30 is used for the transmission of the ciphertext C at S364, but it may obviously be fine to make it such that it is recorded on a physical medium such as a CD-ROM, and it is distributed to the public without using the communication line. In such a case, the operation of S365 is often omitted.

(2) Delivery Certification step

The information provider enciphers the work key W by the public key cryptosystem means 210 with the public key PC of the information provider (S366), and communicates the enciphered work key CW=$W^{PC}$ (mod N) to the user through the communication line 30 (S367).

The user makes the digital signature on the enciphered work key CW by the public key cryptosystem means 107 by using the secret information SU of the user (S368), and transmits the signed work key SW=$C^{SU}$ (mod N2) to the information provider through the communication line 30 (S369).

The information provider stores the signed work key SW in the temporary memory 203 (S370), and then, at the verification means 206, whether a signature verification formula CW=$SW^{PU}$ (mod N2) is satisfied or not is verified by using the public key PU of the user (S371). In a case this verification has failed, it regards the user as illegal, and the execution of the protocol is immediately discontinued (S372). Also, in a case the verification has succeeded, the work key W is divided into a plurality of blocks in arbitrary bit lengths at the computation means 204, to generate the block work keys WB (S373). Here, for the sake of the simplicity of the explanation, a number of divided blocks is set to be b, a bit length is set to be constant L for all the blocks, and the divided work keys are expressed as the block work keys $WB_{ij}$ (i=1, 2, . . . , L: J=1, 2, . . . , b). Namely, $WB_{ij}=W_{(i+L(j-1))}$, and it is going to be $WB_{11}=W_1$, $WB_{L1}=W_L$, $WB_{12}=W_{L+1}$, and $WB_{Lb}=W_g$, for example.

The user generates g pieces of random numbers $R_{ij}$ (i=1, 2, . . . , L: j=1, 2, . . . , b) by the random number generation means 103 and then stores them in the temporary memory 102 (S374), calculates a preresponsive message $X_{ij}=R_{ij}^2$ (mod N1) (i=1, 2, . . . , L: J=1, 2, . . . , b) by the computation means 104 for each and then stores it in the temporary memory 102 (S375), and transmits the preresponsive message $X_{ij}$ (i=1, 2, . . . , L: j=1, 2, . . . , b) to the information provider through the communication line 30 (S376).

The information provider stores the preresponsive message $X_{ij}$ (i=1, 2, . . . , L: j=1, 2, . . , b) in the temporary memory 203 (S377), and then generates the session key $K_{ij}=h(X_{ij}\|X_{Lj})$ (i=1, 2, . . . , L: j=1, 2, . . . , b) of g bits length according to the one-way random hash function h(·) in the computation means 204 (S378), and generates the check bits $e_{ij}$ (i=1, 2, . . . , L: j=1, 2, . . . , b) according to the function f(−) in the computation means 204 from the block work keys $WB_{ij}$ and the session key $K_{ij}$ (i=1, 2, . . . , L: j=1, 2, . . . , b) and stores it in the temporary memory 203 (S379). Here, as the function f, there is $e_{ij}=f(W_{ij}, K_{ij})=W_{ij}\oplus K_{ij}$ (i=1, 2, . . . , L: j=1, 2, . . . , b) for example. Note that $\oplus$ indicates an exclusive OR.

The processing from here on is for the J-th block, and the following processing is repeatedly carried out sequentially (b times) for each block from the first block to the b-th block.

The information provider transmits the check bits $e_{ij}$ (i=1, 2, . . . , L) to the user through the communication line 30 (S380).

The user stores the check bits $e_{ij}$ (i=1, 2, . . . , L) in the temporary memory 102 (S381), and then, at the computation means 104, for each bit i of the check bits $e_{ij}$, $Y_{ij}=R_{ij}$ if $e_{ij}=0$, or $Y_{ij}=S\times R_{ij}$ (mod N1) if $e_{ij}=1$, is calculated from the random number $R_{ij}$ and the secret information S of the user (S382), and transmitted as a responsive message $Y_{ij}$ (i=1, 2, . . . , L) to the information provider through the communication line 30 (S383).

The information provider stores the responsive message $Y_{ij}$ (i=1, 2, . . . , L) in the temporary memory 203 (S384), and then, at the verification means 206, whether a verification formula $Y_{ij}^2=X_{ij}$ (mod N1) if $e_{ij}=0$, or a verification formula $Y_{ij}^2=X_{ij}\times ID$ (mod N1) if $e_{ij}=1$, is satisfied or not is verified for each bit i, from the public information ID of the user, the preresponsive message $X_{ij}$, the responsive message $Y_{ij}$, and the check bits $e_{ij}$ (S385). In a case this verification has failed, it regards the user as illegal, and the execution of the protocol is immediately discontinued (S386), while in a case it has succeeded, it returns to S380, and the above processing is repeated until all the blocks are finished (S387). Then, in a case the verification has succeeded for all the blocks from the first block to the b-th block, the work key W, the signed work key SW, the check bits $e_{ij}$, and the responsive message $Y_{ij}$ (i=1, 2, . . . , L) are recorded and managed as the log data H in the logfile 208 (S388).

(3) Message take out step

The user generates the session key $K_{ij}=h(X_{1j}\|X_{2j}\| \ldots \|K_{Lj})$ (i=1, 2, . . . , L: j=1, 2, . . . , b) of g bits length according to the one-way random hash function h(·) in the computation means 104 from the preresponsive message $X_{ij}$ (i=1, 2, . . . , L: j=1, 2, . . . , b) (S389), and takes out the block work keys $WB_{ij}$ (i=1, 2, . . . , L: j=1, 2, . . . , b) according to an inverse function f'(·) of the third function f(·) in the computation means 104 from the check bits $e_{ij}$ and the session key $K_{ij}$ (i=1, 2, . . . , L: j=1, 2, . . . , b) (S390). Here, with respect to the function f(·) of $e_{ij}=f(W_{ij}, K_{ij})=W_{ij}\oplus K_{ij}$ (i=1, 2, . . . , L: j=1, 2, . . . , b) for example, the inverse function f'(·) is $W_{ij}=f'(e_{ij}, K_{ij})=e_{ij}\oplus K_{ij}$ (i=1, 2, . . . , L: j=1, 2, ..., b). Note that ⊕ indicates an exclusive OR. After that, the work key $W_i$ (i=1, 2, ..., g) is generated by using the block work keys $WB_{ij}$ (i=1, 2, ..., L: j=1, 2, ..., m) at the computation means 104, and stored in the message storage means 109 (S391). Finally, the ciphertext C stored in the message storage means 109 is deciphered by the secret key cryptosystem means 105 with the work key W as the secret key (S392), and the message $M=D_W(C)$ can be obtained from the message output/operation means 106 (S393).

(4) Arbitration

In a case the user claims later on that the requested message has not been received, the information provider presents the log data H recorded and managed in the logfile 208, and stores it in the temporary memory 402 of the arbitrator (S401).

The arbitrator generates the work key $CW=W^{PC}$ (mod N) in which the work key W is enciphered by the public key PC of the information provider at the public key cryptosystem means 405 (S402), and verifies whether the signed work key SW satisfies the signature verification formula $CW=SW^{PU}$ (mod N2) or not by using the public key PU of the user at the verification means 403 (S403). When the verification has failed, the log data H is considered as invalid (S404).

In a case the verification of the signature has succeeded, $X_{ij}=Y_{ij}^2$ (mod N1) if $e_{ij}=0$, or $X_{ij}=Y_{ij}^2/ID$ (mod N1) if $e_{ij}=1$ is calculated, at the computation means 401 for each bit i, from the public information ID of the user, and the check bits $e_{ij}$ and the responsive message $Y_{ij}$ in the log data H, and stored in the temporary memory 402 (S405), the block work keys $WB_{ij}$ (i=1, 2, ..., L: j=1, 2, ..., b) are generated from the work key W at the computation means 401 (S406). Next, the session key $K_{ij}=h(X_{1j}\|X_{2j}\|...\|X_{Lj})$ (i=1, 2, ..., L: j=1, 2, ..., b) of g bits length is generated according to the oneway random hash function h(·) in the computation means 401 from the calculation result $X_{ij}$ (i=1, 2, ..., L) (S407), the check bits $e_{ij}$ (i=1, 2, ..., L: J=1, 2, ..., b) are generated according to the function f(·) in the computation means 401 from the block work keys $W_{ij}$ and the session key $K_{ij}$ (i=1, 2, ..., L: J=1, 2, ..., b) (S408), and whether they coincide with the check bits $e_{ij}$ (i=1, 2, ..., L: j=1, 2, ..., b) in the log data H stored in the temporary memory 402 for all bits or not is checked at the verification means 403 (S409). When they coincide for all bits, it implies that the authenticity of the log data H is proven, and the fact that the user has received the message M is guaranteed (S410). Otherwise the log data H is considered as invalid (S411).

By using the above described message delivery method, the message M is transmitted or distributed by the physical medium to the user by being enciphered into the ciphertext C first, so that at a point at which the user acquired the ciphertext C, the message M is not going to be obtained. Then, at a point at which the protocol is finished normally, it implies that the user authentication according to the zero knowledge interactive proof protocol has been made normally, and besides it can be certified that the user has received the check bits e normally. Also, apart from the check bits e, the work key W is generated from the preresponsive message $X_{ij}$ (i=1, 2, ..., L: j=1, 2, ..., b) produced by the user himself, and the user can obtain the message M by deciphering the ciphertext C, so that the fact that the user has received the check bits e normally and the fact that the user has received the message M normally become equivalent. Therefore, the information provider can certify the fact that the message M has been delivered to the user accurately and surely.

In addition, the communication between the information provider and the user is repeatedly carried out as many times as a number b of divided blocks of the work key W, so that in a case the verification of the information provider failed in a middle, the communication subsequent to that is discontinued, and the remaining check bits are not transmitted. Namely, the check bits that can be learned by the user are limited only to those prior to the failure of the verification, so that the user who caused the failure of the verification of the information provider can only obtain a part of the information necessary for deciphering the ciphertext C, and as a result, it becomes impossible to generate the correct work key W. Consequently, not to mention a case in which the illegal user who does not know the secret information S of the user transmits the illegal responsive message, it is possible to eliminate a case in which such an illegal act as not transmitting the responsive message itself is made, such that the user illegally receives all the check bits e necessary in obtaining the message M and illegally deciphers/obtains the message M despite of the fact that the information provider cannot make a record management of the log data H for proving the fact that the information provider has delivered the message M to the user. Note that, in the above explanation, the bit length of the divided blocks has been set to be constant L for each block, but it may also be quite fine to change the bit length block by block, as in a case of 1 bit for the first block, 2 bits for the second blocks, 4 bits for the third blocks, etc. for example.

Next, the signed work key SW can be produced only by the user, and it is impossible for the information provider to illegally alter the work key W or the signed work key W. Also, in relation to the communication sequence comprising the work key W, the preresponsive message $X_{ij}$, the check bits $e_{ij}$, and the responsive message $Y_{ij}$ (i=1, 2, ..., L: j=1, 2, ..., b), they are mutually related by the verification formula in the zero knowledge interactive proof protocol and the one-way random hash function h(·), so that it is impossible to alter or forge the communication sequence by altering a part of these, etc. Therefore, by making a record management of the log data H, it can be presented to a neutral third party such as the arbitrator later on, as an evidence for the fact that the user has surely received the work key W for making it possible for the user to obtain the message M by deciphering the ciphertext C.

The above explanation is that by which it is possible to prove the fact that the information provider has delivered the message M to the user accurately and surely, and various manners of utilization are possible. For example, in a case the message M is a charged message such as the writings, etc., as the information provider transmits the message M to the user according to the above described message delivery method, the log data H recorded and managed by the information provider can be utilized as a proof information at a time of collecting the message fee such as a fee for using the copyright, and so on.

Also, it has been explained according to the Fiat Shamir scheme, but the present method is applicable to all the zero knowledge interactive proof protocols which base their safety on a difficulty of the factoring or a difficulty of the discrete logarithmic problem, etc., including the Extended Fiat Shamir scheme (Ohta, Okamoto, "An Extension of the Fiat-Shamir Scheme Based on Higher Degree Roots", the Electronic Information Communication Society, Technical Research Report ISEC88-13).

As explained in the above, according to the ninth embodiments of the present invention, in the message delivery method utilizing the zero knowledge interactive proof protocol, firstly, at the message delivery step, the message requested by the user is delivered to the user by being enciphered by the information provider, so that it is impossible for the user to take out the requested message itself at this point. Secondly, the operation of the protocol carried out at the delivery certification step itself is equivalent to the zero knowledge interactive proof protocol as the user authentication, so that similarly as in the zero knowledge interactive proof protocol, it is almost impossible for the illegal user to clear the verification of the information provider. Thirdly, in a case the delivery certification step is normally finished, it is equivalent to the fact that the zero knowledge interactive proof protocol is finished normally, so that the information provider can Judge that the user has correctly received the check bits and applied the appropriate processing. Fourthly, at the message take out step, if the check bits can be received correctly, the user can produce the work key, so that the requested message can be taken out by deciphering the message enciphered by said work key at this point. Consequently, due to these effects, in a case all the steps of the message delivery method are finished, the information provider can certify the fact that, after the requested message is provided in the enciphered state to the legitimate user, the information necessary for the user to decipher the enciphered message has delivered to the user, and the user has received it surely, so that the information provider can judge that the message requested by the user has delivered to the user surely.

Also, it is possible to make it such that the information provider cannot illegally alter the work key to hat is convenient to himself. In addition, the enciphered work key cannot be deciphered by anyone but the information provider, so that the work key is not going to be learned by the user at a time of signing.

Also, as it is impossible to forge the log, the information provider can acquire a valid evidence which can prove later on the fact that, after the requested message is provided in an enciphered state to the legitimate user, the information necessary for the user to decipher the enciphered message has delivered to the user, and the user has received it surely.

Also, it becomes possible to present the log as a valid evidence according to the need. In addition, an amount of information that must be recorded and managed as the evidence for the fact that the information provider has delivered the message can be reduced considerably compared with a scheme of Sakurai (Japanese Patent Application Laid Open No. 5-12321).

Also, in a case there arises a need to carry out the arbitration regarding a presence or an absence of the information providing between the information provider and the user, a neutral arbitration organization such as a court can judge which one of a claim of the information provider and a claim of the user is a proper one by checking the authenticity of the log as a valid evidence, Also, in a case the verification of the information provider failed in a middle of the delivery certification step due to the utilization by the illegal user, etc. for example, the execution of the protocol is immediately discontinued, and the blocks subsequent to the failure of the verification are not going to be transmitted to the user. Consequently, the user who caused the failure of the verification of the information provider can obtain only a part of the information necessary for deciphering the enciphered message, and as a result, it becomes impossible to generate the work key, so that it is possible to eliminate a case in which the illegal user illegally obtains the requested message.

Also, according to this embodiment, it becomes a system in which the information provider can certify that the information provider has delivered the requested message to the user surely, and the user has received it surely. Also, it is possible to use the zero knowledge interactive proof protocol independently as a user authentication method by which the information provider authenticates the user according to the need.

Also, it becomes a system which is made such that the random message can be utilized at a time of generating the work key.

Also, it becomes a system which has the information provider secret information storage means in which the information provider can store the information which is to be kept in secret.

Also, it becomes a system which is made such that the secret communication according to the public key cryptosystem can be made between the information provider and the user.

Also, it becomes a system which has the function for generating the session key, such that the message delivery utilizing the work key and the session key can be carried out.

Also, it becomes a system which is made such that the log as a valid evidence can be presented according to the need.

Also, it becomes a system which is made such that, by a neutral arbitration organization such as a court, it is possible to check the authenticity of the log as a valid evidence, and Judge which one of a claim of the information provider and a claim of the user is a proper one.

Also, it becomes a system in which the execution of the protocol is immediately discontinued when it is detected as the illegal user, such that it is possible to eliminate a case in which the illegal user illegally obtains the requested message.

It is to be noted that the present invention is not to be limited to the embodiments described above, and can be realized in various modifications within a range of not departing from its essence.

We claim:

1. A message delivery method in a system containing at least an information provider and a user for a case in which the user receives a message from the information provider, the method comprising:

(a) a step in which the information provider carries out a user authentication of the user according to a zero knowledge interactive proof protocol using check bits E generated according to a work key W and transmits to the user a ciphertext C and the check bits E, the ciphertext C containing a message M to be delivered to the user which is enciphered according to a secret key cryptosystem by using the work key W;

(b) a message take out process in which the user takes out the work key W by using at least the check bits E, and obtains the message M by deciphering the ciphertext C according to the secret key cryptosystem by using the work key W.

2. The message delivery method as described in claim 1, wherein the step (a) includes:

a delivery certification process comprising:

a step in which the user transmits a preresponsive message X to the information provider, which takes place prior to a response by the user to the message M, a step in which the information provider generates the work key W, and transmits the ciphertext C to the user, a step in which the information provider generates and transmits the check bits E to the user by using at least the work key W, a step in which the user produces and transmits to the information provider a responsive message Y in response to receiving of the message M, by using the preresponsive message X, the check bits E, and a secret information S of the user, and a step in which the information provider checks whether the responsive message Y is a correct response corresponding to the preresponsive message X, the check bits E, and a public information I of the user, and authenticates that the user knows the secret information S, without leaking the secret information S of the user, while certifying that the user has surely received the check bits E.

3. The message delivery method as described in claim 1, wherein the information provider generates the work key W according to a one-way random function by using at least the preresponsive message X and a random message Z.

4. The message delivery method as described In claim 3, further comprising a step in which the information provider carries out a record management of a log data H for the zero knowledge interactive proof protocol, the log data H comprising at least the random message Z, the check bits E, and the responsive message Y.

5. The message delivery method as described in claim 4, further comprising:

a step in which the information provider presents the log data H to an arbitrator, and a step in which the arbitrator calculates the preresponsive message X from the check bits E, the responsive message Y, and the public information I of the user, generates the work key W according to the one-way random function by using at least the preresponsive message X and the random message Z, produces the check bits E by using at least the work key W, checks whether the produced check bits E coincide with the check bits E contained in the log data H, and acknowledges that the information provider has authenticated the user and delivered the message M to the user when they coincide.

6. The message delivery method as described in claim 1, wherein the step (a) includes:

a message delivery process comprising:

a step in which the information provider generates the work key W, and transmits the ciphertext C to the user, and a delivery certification process comprising:

a step in which the user transmits a preresponsive message X to the information provider, which takes place prior to a response by the user to the message M, a step in which the information provider produces and transmits to the user the check bits E by using at least the work key W, a step in which the user produces and transmits to the information provider a responsive message Y in response to receiving of the message M, by using the preresponsive message X, the check bits E, and a secret information S of the user, and a step in which the information provider checks whether the responsive message Y is a correct response corresponding to the preresponsive message X, the check bits E, and a public information I of the user, and authenticates that the user knows the secret information S, without leaking the secret information S of the user, while certifying that the user has surely received the check bits E.

7. The message delivery method as described in claim 6, wherein the information provider generates the work key W according to a one-way random function by using at least a random message Z generated by himself.

8. The message delivery method as described in claim 7, wherein:

at said delivery certification process, the information provider generates a session key K according to the one-way random function by using at least the preresponsive message X, and generates and transmits to the user the check bits E by using at least the work key W and the session key K, and at said message take out process, the user generates the session key K according to the one-way random function by using at least the preresponsive message X, and takes out the work key W by using at least the check bits E and the session key K.

9. The message delivery method as described in claim 8, further comprising a step in which the information provider carries out a record management of a log data H for the zero knowledge interactive proof protocol, the log data H comprising at least the random message Z, the check bits E, and the responsive message Y.

10. The message delivery method as described in claim 9, further comprising a step in which the information provider presents the log data H to an arbitrator, and a step in which the arbitrator calculates the preresponsive message X from the check bits E, the responsive message Y, and the public information I of the user, generates the session key K according to the one-way random function by using at least the preresponsive message X and generates the work key W according to the one-way random function by using at least the random message Z, produces the check bits E by using at least the session key K and the work key W, checks whether the produced check bits E coincide with the check bits E contained in the log data H, and acknowledges that the information provider has authenticated the user and delivered the message M to the user when they coincide.

11. The message delivery method as described in claim 6, wherein the user transmits a request message R to the information provider, and the information provider generates the work key W according to a one-way random function by using at least the request message R and a random message Z generated by himself.

12. The message delivery method as described in claim 11, wherein a secret communication is carried out for the request message R to be transmitted from the user to the information provider.

13. The message delivery method as described in claim 11, wherein:

at said delivery certification process, the information provider generates a session key K according to the one-way random function by using at least the preresponsive message X, and generates and transmits to the user the check bits E by using at least the work key W and the session key K, and at said message take out process, the user generates the session key K according to the one-way random function by using at least the preresponsive message X, and takes out the work key W by using at least the check bits E and the session key K.

14. The message delivery method as described in claim 13, further comprising a step in which the information provider carries out a record management of a log data H for the zero knowledge interactive proof protocol, the log data H comprising at least the random message Z, the check bits E, the responsive message Y, and the request message R.

15. The message delivery method as described in claim 14, further comprising:

a step in which the information provider presents the log data H to an arbitrator, and a step in which the arbitrator calculates the preresponsive message X from the check bits E, the responsive message Y, and the public information I of the user, generates the session key K according to the one-way random function by using at least the preresponsive message X and generates the work key W according to the one-way random function by using at least the random message Z and the request message R, produces the check bits E by using at least the session key K and the work key W, checks whether the produced check bits E coincide with the check bits E contained in the log data H, and acknowledges that the information provider has authenticated the user and delivered the message M to the user when they coincide.

16. The message delivery method as described in claim 6, further comprising:

a step in which the Information provider transmits to the user a work key CW enciphered in a cryptosystem that cannot be deciphered by the user, a step in which the user transmits to the information provider a signed work key SW in which a digital signature is made on the enciphered work key CW, and a step in which the information provider verifies whether a signature of the signed work key SW is correct.

17. the message delivery method as described in claim 16, wherein:

at said delivery certification process, the information provider generates a session key K according to the one-way random function by using at least the preresponsive message X, and generates and transmits to the user the check bits E by using at least the work key W and the session key K, and at said message take out process, the user generates the session key K according to the one-way random function by using at least the preresponsive message X, and takes out the work key W by using at least the check bits E and the session key K.

18. The message delivery method as described in claim 17, further comprising a step in which the information provider carries out a record management of a log data H for the zero knowledge interactive proof protocol, the log data H comprising at least the work key W, the signed work key SW, the check bits E, and the responsive message Y.

19. The message delivery method as described in claim 18, further comprising:

a step in which the information provider presents the log data H to an arbitrator, and a step in which, after whether the signed work key SW is a correct signature for the work key W is verified, the arbitrator calculates the preresponsive message X from the check bits E, the responsive message Y, and the public information I of the user, generates the session key K according to the one-way random function by using at least the preresponsive message X, produces the check bits E by using at least the session key K and the work key W, checks whether the produced check bits E coincide with the check bits E contained in the log data H, and acknowledges that the information provider has authenticated the user and delivered the message M to the user when they coincide.

20. The message delivery method as described in claim 1, wherein a secret communication is carried out for the check bits E to be transmitted from the information provider to the user.

21. The message delivery method as described in claim 20, wherein a secret communication is carried out for at least either one of the preresponsive message X or the responsive message Y to be transmitted from the user to the information provider.

22. The message delivery method as described in claim 2 or 6, wherein the step (a) includes a step in which the check bits E are divided into a plurality of blocks in sizes of arbitrary bit lengths, and the delivery certification process is repeatedly carried out independently for each block.

* * * * *